United States Patent
Sjöberg et al.

(10) Patent No.: US 12,101,482 B2
(45) Date of Patent: *Sep. 24, 2024

(54) TILE PARTITIONS WITH SUB-TILES IN VIDEO CODING

(71) Applicant: Telefonaktiebolaget LM Ericsson (publ), Stockholm (SE)

(72) Inventors: Rickard Sjöberg, Stockholm (SE); Jack Enhorn, Kista (SE); Martin Pettersson, Vallentuna (SE); Mitra Damghanian, Upplands-Bro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,686

(22) Filed: Dec. 6, 2022

(65) Prior Publication Data

US 2023/0097014 A1 Mar. 30, 2023

Related U.S. Application Data

(63) Continuation of application No. 17/253,997, filed as application No. PCT/EP2019/066400 on Jun. 20, 2019, now Pat. No. 11,553,180.
(Continued)

(51) Int. Cl.
 *H04N 19/11* (2014.01)
 *H04N 19/119* (2014.01)
 (Continued)

(52) U.S. Cl.
 CPC .......... *H04N 19/119* (2014.11); *H04N 19/11* (2014.11); *H04N 19/124* (2014.11);
 (Continued)

(58) Field of Classification Search
 CPC ........ H04N 19/11; H04N 19/13; H04N 19/96; H04N 19/119; H04N 19/172; H04N 19/124; H04N 19/176; H04N 19/593
 See application file for complete search history.

(56) References Cited

U.S. PATENT DOCUMENTS 9,300,976 B2 3/2016 Fuldseth
9,712,837 B2 7/2017 Wang et al.
(Continued)

FOREIGN PATENT DOCUMENTS

CN 1555654 A 12/2004
CN 102656887 A 9/2012
(Continued)

OTHER PUBLICATIONS

He, Y. et al., "AHG12: On Rectangular Tile Group", Joint Video Experts Team (JVET) of ITU-T SG 16 WP 3 and ISO/IEC JTC 1/SC 29/ WG 11 13th Meeting, Marrakech, MA, Jan. 9, 2019, pp. 1-9, JVET-M0121, ITU.
(Continued)

*Primary Examiner* — Tsion B Owens
(74) *Attorney, Agent, or Firm* — Coats & Bennett, PLLC

(57) ABSTRACT

An encoder, a decoder, and methods for partitioning a picture from a sequence of video pictures into a layout having a plurality of flexible tiles or segments is disclosed. Each tile or segment comprises a single rectangular or square region. The encoder generates a partition structure and encodes the tiles according to the partition structure. The encoder also generates a bitstream comprising a plurality of coded segments and information indicating the partition structure used to partition the picture into the plurality of flexible tiles or segments, and sends the bitstream to the
(Continued)

decoder. Upon receipt, the decoder uses the coded segments and information in the bitstream to decode the plurality of coded segments.

26 Claims, 39 Drawing Sheets

Related U.S. Application Data

(60) Provisional application No. 62/688,301, filed on Jun. 21, 2018.

(51) Int. Cl.
*H04N 19/124* (2014.01)
*H04N 19/172* (2014.01)
*H04N 19/174* (2014.01)
*H04N 19/463* (2014.01)
*H04N 19/593* (2014.01)
*H04N 19/96* (2014.01)

(52) U.S. Cl.
CPC ......... *H04N 19/172* (2014.11); *H04N 19/174* (2014.11); *H04N 19/463* (2014.11); *H04N 19/593* (2014.11); *H04N 19/96* (2014.11)

(56) References Cited

U.S. PATENT DOCUMENTS

| | | | |
|---|---|---|---|
| 9,736,482 B2 | 8/2017 | Hendry et al. | |
| 9,762,912 B2 | 9/2017 | Zhu et al. | |
| 10,104,386 B2 | 10/2018 | Suehring et al. | |
| 10,419,752 B2 | 9/2019 | Lim et al. | |
| 10,523,933 B2 | 12/2019 | Wu et al. | |
| 10,609,414 B2 * | 3/2020 | Zhang | H04N 19/70 |
| 10,893,268 B2 | 1/2021 | Jun et al. | |
| 11,134,265 B2 | 9/2021 | Laroche | |
| 11,477,470 B2 | 10/2022 | Pettersson et al. | |
| 2003/0138052 A1 | 7/2003 | Dufour et al. | |
| 2009/0279601 A1 | 11/2009 | Strom et al. | |
| 2009/0320081 A1 | 12/2009 | Chui et al. | |
| 2012/0189049 A1 | 7/2012 | Coban et al. | |
| 2012/0263231 A1 | 10/2012 | Zhou | |
| 2012/0328004 A1 | 12/2012 | Coban et al. | |
| 2013/0016786 A1 | 1/2013 | Segall | |
| 2013/0101035 A1 | 4/2013 | Wang et al. | |
| 2013/0107973 A1 | 5/2013 | Wang et al. | |
| 2013/0114735 A1 | 5/2013 | Wang | |
| 2014/0086333 A1 | 3/2014 | Wang | |
| 2014/0119671 A1 | 5/2014 | Lim et al. | |
| 2014/0247875 A1 | 9/2014 | Hattori et al. | |
| 2015/0117538 A1 | 4/2015 | Sjöberg et al. | |
| 2016/0295200 A1 | 10/2016 | Bruls | |
| 2016/0353108 A1 * | 12/2016 | Zhang | H04N 19/139 |
| 2017/0034526 A1 | 2/2017 | Rapaka et al. | |
| 2017/0332084 A1 * | 11/2017 | Seregin | H04N 9/8045 |
| 2018/0098077 A1 | 4/2018 | Skupin et al. | |
| 2018/0139453 A1 | 5/2018 | Park et al. | |
| 2018/0249163 A1 | 8/2018 | Curcio et al. | |
| 2019/0132590 A1 | 5/2019 | Morigami et al. | |
| 2019/0273923 A1 | 9/2019 | Huang et al. | |
| 2019/0281217 A1 | 9/2019 | Kim | |
| 2020/0029080 A1 | 1/2020 | Kim et al. | |
| 2020/0260063 A1 | 8/2020 | Hannuksela | |
| 2020/0260071 A1 | 8/2020 | Hannuksela et al. | |
| 2020/0322587 A1 | 10/2020 | Oh et al. | |
| 2020/0336740 A1 | 10/2020 | Fang et al. | |
| 2020/0374505 A1 | 11/2020 | Kammachi Sreedhar et al. | |
| 2021/0195226 A1 | 6/2021 | Zhao et al. | |
| 2021/0211664 A1 | 7/2021 | Wang et al. | |
| 2021/0360234 A1 * | 11/2021 | Wang | H04N 19/176 |
| 2021/0385514 A1 | 12/2021 | Da Silva Pratas Gabriel et al. | |

FOREIGN PATENT DOCUMENTS

| | | | |
|---|---|---|---|
| CN | 104221388 A | 12/2014 | |
| CN | 105144720 A | 12/2015 | |
| CN | 105432082 A | 3/2016 | |
| CN | 105744272 A | 7/2016 | |
| CN | 106105209 A | 11/2016 | |
| CN | 107181960 A | 9/2017 | |
| CN | 107409212 A | 11/2017 | |
| EP | 3328081 A1 | 5/2018 | |
| EP | 3468186 A1 | 4/2019 | |
| GB | 2557430 A | 6/2018 | |
| RU | 2648571 C2 | 3/2018 | |
| WO | WO-2012119569 A1 * | 9/2012 | ............ H04N 19/11 |
| WO | 2013027407 A1 | 2/2013 | |
| WO | 2013063094 A1 | 5/2013 | |
| WO | 2014003428 A1 | 1/2014 | |
| WO | 2016026526 A2 | 2/2016 | |
| WO | 2016123476 A1 | 8/2016 | |
| WO | 2016180741 A2 | 11/2016 | |
| WO | 2017137444 A1 | 8/2017 | |
| WO | 2017172783 A1 | 10/2017 | |
| WO | 2017197434 A1 | 12/2017 | |
| WO | 2017212930 A1 | 12/2017 | |
| WO | 2019243541 A2 | 12/2019 | |

OTHER PUBLICATIONS

Bross, B. et al., "Versatile Video Coding (Draft 4)", Joint Video Experts Team (JVET) of ITU-T SG 16 WP 3 and ISO/IEC JTC 1/SC 29/ WG 11 13th Meeting, Marrakech, MA, Jan. 9, 2019, pp. 1-244, JVET-M1001-v2, ITU.

Sjöberg, R. et al., "Flexible Tiles", Joint Video Experts Team (JVET) of ITU-T SG 16 WP 3 and ISO/IEC JTC 1/SC 29/WG 11 11th Meeting, Ljubljana, SI, Jul. 10, 2018, pp. 1-10, JVET-K0260-v2, ITU.

Hannuksela, M. et al., "Design Goals for Tiles", Joint Video Experts Team (JVET) of ITU-T SG 16 WP 3 and ISO/IEC JTC 1/SC 29/WG 11 11th Meeting, Ljubljana, SI, Jul. 10, 2018, pp. 1-8, JVET-K0300-v1, ITU.

Wang, Y. et al., "Tile Groups", Joint Collaborative Team on Video Coding (JCT-VC) of ITU-T SG16 WP3 and ISO/IEC JTC1/SC29/WG11 8th Meeting, San José, USA, Feb. 1, 2012, pp. 1-8, JCTVC-G0520, ITU.

Sjöberg, R. et al., "Tile groups for VVC", Joint Video Experts Team (JVET) of ITU-T SG16 WP 3 and ISO/IEC JTC 1/SC 29/ WG 11 12th Meeting, Macao, CN, Oct. 3, 2018, pp. 1-4, JVET-L0415-v1, ITU.

Richardson, I., "Chapter 6: H.264/MPEG4 Part 10", H.264 and MPEG-4 Video Compression: Video Coding for Next-Generation Multimedia, Jan. 1, 2003, pp. 159-223, John Wiley & Sons, Ltd.

Bross, B. et al., "High Efficiency Video Coding (HEVC) Text Specification Draft 10 (for FDIS & Last Call)", Joint Collaborative Team on Video Coding (JCT-VC) of ITU-T SG 16 WP 3 and ISO/IEC JTC 1/SC 29/WG 11 12th Meeting, Geneva, CH, Jan. 14, 2013, pp. 1-310, JCTVC-L1003_v34, ITU.

Sjöberg, R. et al., "Flexible Tiles", Joint Video Experts Team (JVET) of ITU-T SG 16 WP 3 and ISO/IEC JTC 1/SC 29/WG 11 11th Meeting, Ljubljana, SI, Jul. 10, 2018, pp. 1-7, JVET-K0260-v1, ITU.

Wu, Y. et al., "Motion-Constrained Tile Sets SEI Message", Joint Collaborative Team on Video Coding (JCT-VC) of ITU-T SG 16 WP 3 and ISO/IEC JTC 1/SC 29/WG 11 13th Meeting, Incheon, KR, Apr. 18, 2013, pp. 1-4, JCTVC-M0235-v1, ITU.

Wiegand, T., "Draft Text of Final Draft International Standard for Advanced Video Coding (ITU-T Rec. H.264 | ISO/IEC 14496-10 AVC)", International Organization for Standardisation Coding of Moving Pictures and Audio, ISO/IEC JTC 1/SC 29/WG 11 N5555, Mar. 1, 2003, pp. 1-242, ITU.

Skupin, R. et al., "HEVC Tile Based Streaming to Head Mounted Displays", 2017 14th IEEE Annual Consumer Communications & Networking Conference (CCNC), Jan. 8, 2017, pp. 1-3, IEEE.

(56) References Cited

OTHER PUBLICATIONS

Sanchez, Y. et al., "Random Access Point Period Optimization for Viewport Adaptive Tile Based Streaming of 360 Video", 2017 IEEE International Conference on Image Processing (ICIP), Sep. 17, 2017, pp. 1-5, IEEE.

Puri, A. et al., "Video Coding Using the H.264/MPEG-4 AVC Compression Standard", Signal Processing: Image Communication, vol. 19 No. 9, Oct. 1, 2004, pp. 793-849, Elsevier.

Sánchez, Y. et al., "Compressed Domain Video Processing for Tile Based Panoramic Streaming Using HEVC", 2015 IEEE International Conference on Image Processing (ICIP), Sep. 27, 2015, pp. 2244-2248, IEEE.

International Telecommunication Union, "High efficiency video coding", Series H: Audiovisual and Multimedia Systems: Infrastructure of audiovisual services—Coding of moving video, Dec. 1, 2016, pp. 83-84, 352, ITU-T H.265, ITU.

Sullivan, G. et al., "Standardized Extensions of High Efficiency Video Coding (HEVC)", IEEE Journal of Selected Topics in Signal Processing, vol. 7 No. 6, Dec. 1, 2013, pp. 1001-1016, IEEE.

\* cited by examiner

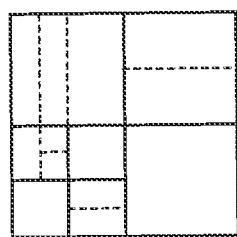 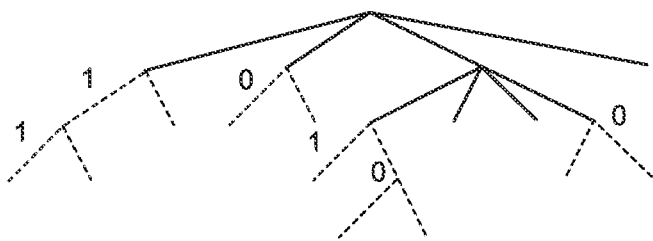
FIG. 1
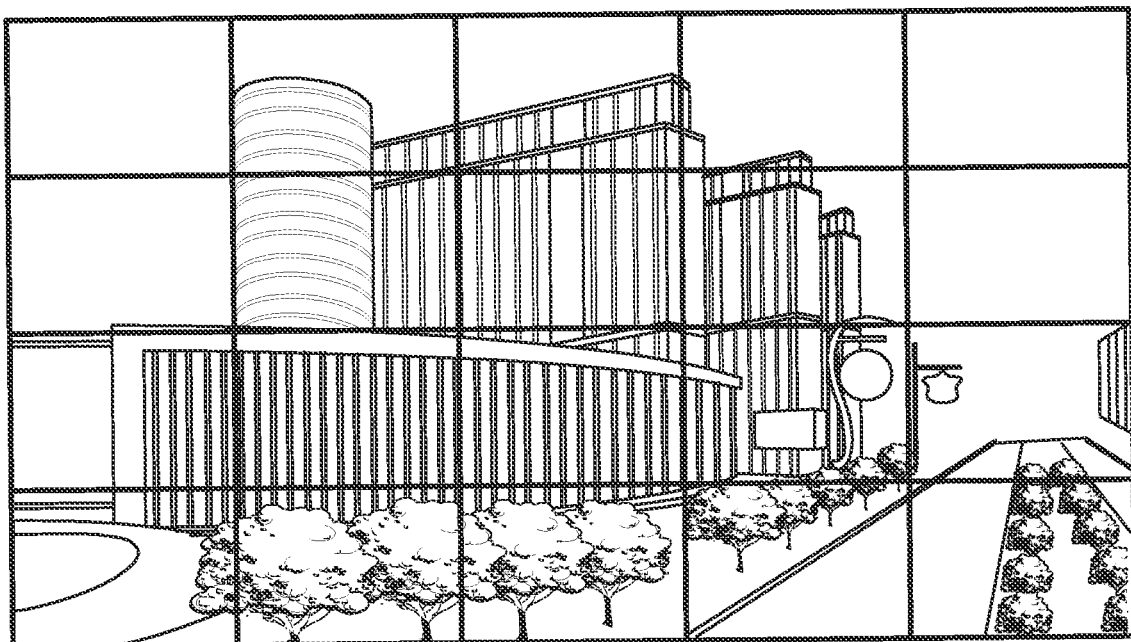
FIG. 2
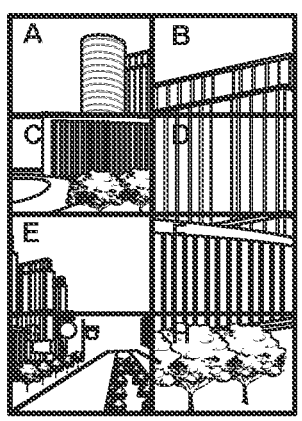 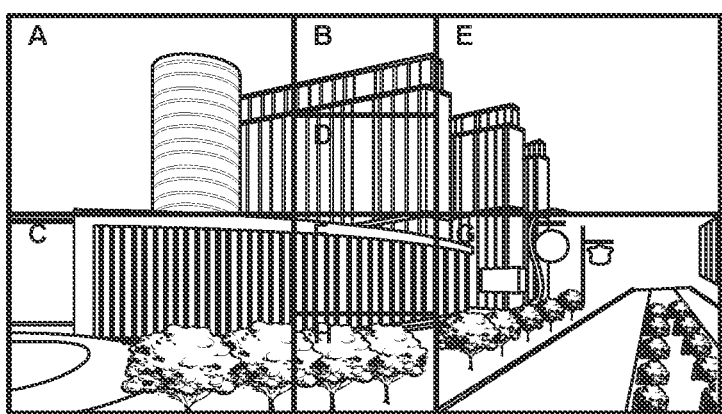
FIG. 3A  FIG. 3B

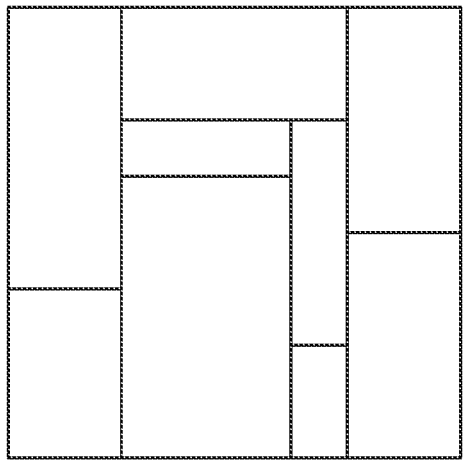
FIG. 17A
FIG. 17B
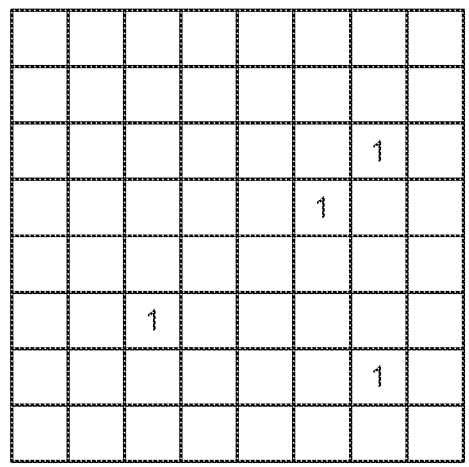
FIG. 17C

EXEMPLARY TILING STRUCTURE

SET OF ALL T-JUNCTIONS

SET OF T-JUNCTIONS AFTER REMOVING REDUNCANT T-JUNCTIONS

| Case | Comment | Options | Required signaling |
|---|---|---|---|
|  | Indicates that the unit or sub-tile being scanned starts a new tile |  | None |
|  | Positioning indicates that the unit or sub-tile being scanned can either be in an existing tile A or starts a new tile. |  | 1 flag<br>Set flag to:<br>0 to indicate that the unit or sub-tile being scanned is in an existing tile A<br>1 to indicate that the unit or sub-tile being scanned starts a new tile N |
|  | Positioning indicates that the unit or sub-tile being scanned can either be in an existing tile A or starts a new tile. |  | 1 flag<br>Set flag to:<br>0 to indicate that the unit or sub-tile being scanned is in an existing tile A<br>1 to indicate that the unit or sub-tile being scanned starts a new tile N |
| 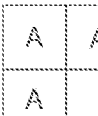 | Positioning can only indicate that the unit or sub-tile being scanned is in tile A | 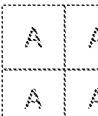 | None |
| 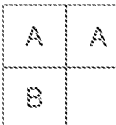 | Positioning indicates that the unit or sub-tile being scanned can either be in an existing tile B or starts a new tile.<br><br>In this case, the unit or sub-tile being scanned cannot be in tile A |  | 1 flag<br>Set flag to:<br>0 to indicate that the unit or sub-tile being scanned is in an existing tile B<br>1 to indicate that the unit or sub-tile being scanned starts a new tile N |
| 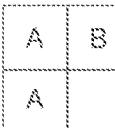 | Positioning indicates that the unit or sub-tile being scanned can either be in an existing tile B or starts a new tile.<br><br>In this case, the unit or sub-tile being scanned cannot be in tile A. | 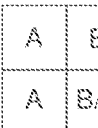 | 1 flag<br>Set flag to:<br>0 to indicate that the unit or sub-tile being scanned is in an existing tile B<br>1 to indicate that the unit or sub-tile being scanned starts a new tile N |
| 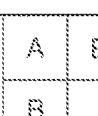 | This case cannot occur because there is no rule for copying from top-right | | N/A |
|  | Positioning indicates that the unit or sub-tile being scanned can either be in an existing tile B, an existing tile C, or starts a new tile.<br><br>In this case, the unit or sub-tile being scanned cannot be in tile A | 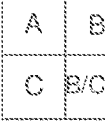 | Disambiguator bit is needed |

FIG. 37

| Case | Options | ctu_status | Set flag value to | ctu_status | Set flag value to |
|---|---|---|---|---|---|
| A | A \| A/N | Copy from left | 0 | New tile | 1 |
| A | A / A/N | Copy from above | 0 | New tile | 1 |
| A A / B | A A / B B/N | Copy from left | 0 | New tile | 1 |
| A B / A | A B / A B/N | Copy from above | 0 | New tile | 1 |
| A B / C | A B / C B/C/N | Copy from left or Copy from above (disambiguator bit is needed) | 0 | New tile | 1 |

FIG. 38

TILE PARTITIONS WITH SUB-TILES IN VIDEO CODING

RELATED APPLICATIONS

The present application is a continuation of U.S. patent application Ser. No. 17/253,997, which was filed on Dec. 18, 2020, which is a national stage application of PCT/EP2019/066400, which was filed Jun. 20, 2019, and claims benefit of U.S. Provisional Application 62/688,301, which was filed Jun. 21, 2018, the disclosures of each of which are incorporated herein by reference in their entirety.

TECHNICAL FIELD

The present disclosure relates generally to picture encoding and decoding techniques, and more particularly, to the encoding and decoding of picture segments with subsegments.

BACKGROUND

High Efficiency Video Coding (HEVC) is a block based video codec standardized by both the ITU-T and the Moving Picture Experts Group (MPEG) that utilizes both spatial and temporal prediction techniques. Spatial prediction reduces spatial redundancy and is achieved using intra (I) prediction from within the same frame of a current picture. Temporal prediction reduces temporal redundancy and is achieved using inter (P) or bi-directional inter (B) prediction on a block level using previously decoded reference pictures. Regardless of the particular type of prediction technique, however, the resultant differences between the original pixel data and the predicted pixel data, referred to as the "residual," is transformed into the frequency domain and quantized. Quantizing the transformed residuals, the level of which is determined by the quantization parameter (QP), facilitates the control of a tradeoff between bitrate and the quality of the video.

The transformed and quantized residual is then entropy coded before being transmitted to a decoder together with the necessary prediction parameters. The prediction parameters, which are also entropy encoded, include prediction mode and motion vectors. Upon receipt, the decoder performs entropy decoding, inverse quantization, and inverse transformation to obtain the residual. The decoder then reconstructs the image from the residual using an intra-prediction or inter-prediction technique.

Both MPEG and ITU-T are working on a successor to HEVC within the Joint Video Exploratory Team (JVET). The name of this video codec is Versatile Video Coding (VCC). The HEVC video coding standard includes different tools to divide a picture (e.g., into slices or tiles). Tiles, for instance, divide a picture into rectangular spatially independent regions. However, the partitioning always spans across the entire picture, from left to right and top to bottom respectively. A picture parameter set (PPS) is used to specify the thickness of the rows and the widths of the columns in terms of coding tree units.

SUMMARY

Embodiments herein are useful for encoding and decoding a picture using a flexible partitioning, for instance, partitioning that would reduce the costs of transmission of coded segments of the picture. For example, one or more embodiments enable a partition structure where each picture segment of the partition structure comprises one or more subsegments in which each of the subsegments comprises a plurality of units. By providing a size of both the subsegment and the unit, the size of a picture segment that comprises subsegments can be expressed with less code words thereby saving costs of transmission of a corresponding coded segment.

One or more embodiments include a method of decoding a picture. The method comprises receiving a bitstream comprising a plurality of coded segments, and information associated with the plurality of coded segments. The method further comprises deriving, from the information in the bitstream, a partition structure that divides the picture into a plurality of picture segments. Each picture segment corresponds to one of the plurality of coded segments and comprises one or more subsegments. Further, at least one picture segment comprises at least two subsegments. Each subsegment of the partition structure further comprises a plurality of units and each of the plurality of units with each unit corresponding to a region of the picture. The method further comprises deriving, from the information in the bitstream, the size of a subsegment of the partition structure and the size of a unit of the partition structure. Then, the method further comprises decoding the plurality of coded segments received in the bitstream in accordance with the partition structure. The derivation of any intra prediction mode for a second unit of a given one of the picture segments depends on a derived intra prediction mode for a first unit of the given one of the picture segments and is independent of any intra prediction mode for units of any other picture segments.

One or more embodiments of the present disclosure also include a corresponding method of encoding a picture that can be used in conjunction with, or separately, from methods for decoding a picture. In one embodiment, a method of encoding a picture comprises defining a partition structure that divides a picture into picture segments. Each picture segment of the partition structure comprises one or more subsegments with at least one picture segment comprising at least two subsegments. Each subsegment of the partition structure comprises a plurality of units with each unit corresponding to a region of the picture. The method further comprises encoding the picture segments in accordance with the partition structure to generate a plurality of coded segments. Each coded segment corresponds to one of the picture segments of the partition structure. Further, each coded segment is independent such that any derivation of any intra prediction mode for a second unit of a given one of the picture segments depends on a derived intra prediction mode for a first unit of the given one of the picture segments and is independent of any intra prediction mode for units of any other picture segments. The method further comprises generating a bitstream comprising the plurality of coded segments and information indicating the partition structure used to divide the picture into the picture segments. The information indicates a size of a unit of the partition structure and a size of a subsegment of the partition structure.

One or more embodiments of the present disclosure also provide a decoder circuit configured to receive a bitstream comprising a plurality of coded segments, and information associated with the plurality of coded segments. The decoder circuit is further configured to derive, from the information in the bitstream, a partition structure that divides the picture into a plurality of picture segments, wherein each picture segment corresponds to one of the plurality of coded segments and comprises one or more subsegments, with at least one picture segment comprising at least two subsegments.

Further, each subsegment comprises a plurality of units with each unit corresponding to a region of the picture. The decoder circuit is further configured to derive, from the information in the bitstream, a subsegment size of a subsegment of the partition structure, and a unit size of a unit of the partition structure. The decoder circuit is then further configured to decode the plurality of coded segments received in the bitstream in accordance with the partition structure. In these embodiments, derivation of an intra prediction mode for a second unit of a given one of the picture segments depends on a derived intra prediction mode for a first unit of the given one of the picture segments, and is independent of any intra prediction mode for units of any other picture segments.

One or more embodiments of the present disclosure also provides a decoder comprising communications circuitry configured to receive a bitstream comprising a plurality of coded segments, and information associated with the plurality of coded segments, a memory configured to store instructions, and processing circuitry operatively connected to the memory and the communications circuitry. The processing circuitry is configured to execute the instructions stored in the memory whereby the decoder is configured to derive, from the information in the bitstream, a partition structure that divides the picture into a plurality of picture segments, wherein each picture segment corresponds to one of the plurality of coded segments and comprises one or more subsegments, with at least one picture segment comprising at least two subsegments. Further, each subsegment comprises a plurality of units with each unit corresponding to a region of the picture. By executing the instructions, the processing circuitry further configures the decoder to derive, from the information in the bitstream, a subsegment size of a subsegment of the partition structure, and a unit size of a unit of the partition structure. By executing the instructions, the processing circuitry further configures the decoder to decode the plurality of coded segments received in the bitstream in accordance with the partition structure. In these embodiments, derivation of an intra prediction mode for a second unit of a given one of the picture segments depends on a derived intra prediction mode for a first unit of the given one of the picture segments, and is independent of any intra prediction mode for units of any other picture segments.

One or more embodiments of the present disclosure further provide an encoder circuit configured to define a partition structure that divides a picture into a plurality of picture segments. Each picture segment comprises one or more subsegments with at least one picture segment of the partition structure comprising at least two subsegments. Further, each subsegment comprises a plurality of units, with each unit corresponding to a region of the picture. The encoder circuit is further configured to encode the picture segments in accordance with the partition structure to generate a plurality of coded segments. Each coded segment corresponds to one of the picture segments of the partition structure. Further, each coded segment is independent such that derivation of an intra prediction mode for a second unit of a given one of the picture segments depends on a derived intra prediction mode for a first unit of the given one of the picture segments, and is independent of any intra prediction mode for units of any other picture segments. The encoder circuit is further configured to generate a bitstream comprising the plurality of coded segments and information indicating the partition structure used to divide the picture into the picture segments and transmit the bitstream. In these embodiments, the information indicates a unit size of a unit of the partition structure and a subsegment size of a subsegment of the partition structure.

One or more embodiments of the present disclosure further provide an encoder comprising a memory configured to store instructions and processing circuitry operatively connected to the memory. The processing circuitry is configured to execute the instructions stored in the memory whereby the encoder is configured to define a partition structure that divides a picture into a plurality of picture segments. Each picture segment comprises one or more subsegments with at least one picture segment of the partition structure comprising one or more subsegments. Further, each subsegment comprises a plurality of units, with each unit corresponding to a region of the picture. By executing the instructions, the processing circuit further configures the encoder to encode the picture segments in accordance with the partition structure to generate a plurality of coded segments. Each coded segment corresponds to one of the picture segments of the partition structure. Further, each coded segment is independent such that derivation of an intra prediction mode for a second unit of a given one of the picture segments depends on a derived intra prediction mode for a first unit of the given one of the picture segments, and is independent of any intra prediction mode for units of any other picture segments. By executing the instructions, the processing circuit further configures the encoder to generate a bitstream comprising the plurality of coded segments and information indicating the partition structure used to divide the picture into the picture segments and transmit the bitstream. In these embodiments, the information indicates a unit size of a unit of the partition structure and a subsegment size of a subsegment of the partition structure.

BRIEF DESCRIPTION OF THE DRAWINGS

FIG. 1 illustrates an example of partitioning a CTU into CUs using QTBT.

FIG. 2 illustrates an example tile partitioning.

FIGS. 3A-3B illustrates an example tiling structure with high resolution and low resolution tiles.

FIG. 17A-17C illustrate a tile partition of the picture illustrated in FIG. 14 and corresponding ctu_status bits according to one embodiment of the present disclosure.

FIG. 37 is a table illustrating example status flags showing whether the positioning of a sub-tile being scanned indicates that the sub-tile starts a new tile, and the values (if any) to which to set the status flags according to one embodiment of the present disclosure.

FIG. 38 is a table illustrating signaling details for determining a status in cases where the CTU status is ambiguous according to one embodiment of the present disclosure.

DETAILED DESCRIPTION

Figure 4:
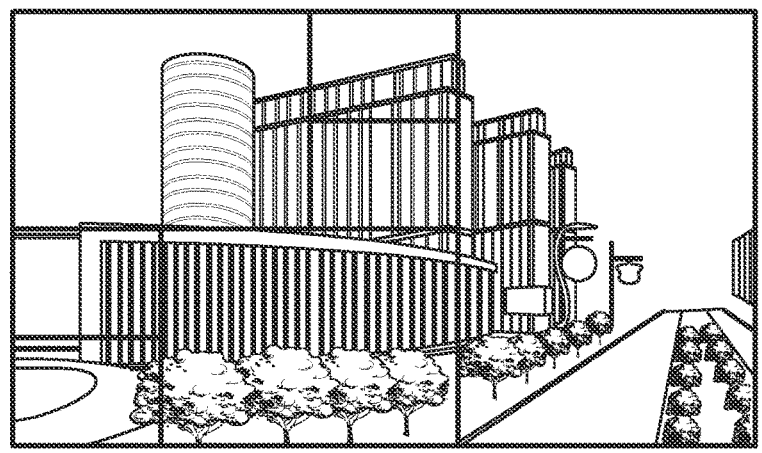
FIG. 4 illustrates an example of a tile structure that is not supported in HEVC.

Quad Tree and Binary Tree (QTBT) Structure

As previously stated, HEVC is a block based video codec standardized by ITU-T and MPEG that utilizes both temporal and spatial prediction. HEVC uses a block structure where each top level coding block, i.e. the largest block in the coding block partitioning referred to herein as the Coding Tree Unit (CTU), can be partitioned by a Quad Tree (QT) structure. This partitioning produces coding block partitions, referred to herein as coding units (CUs). The CUs can then be further partitioned, recursively, into smaller equally sized CUs with the quad tree structure down to an 8×8 block size.

The block structure in the current version of Versatile Video Coding (VVC) is different than the block structure in HEVC. Particularly, the block structure in VVC is referred to as Quad Tree plus Binary Tree plus Ternary Tree block structure (QTBT+TT). A CU in QTBT+TT can have either square or rectangular shapes. A coding tree unit (CTU) is first partitioned by a quad tree structure as in HEVC. Then it is further partitioned with equally sized partitions either vertically or horizontally in a binary structure to form coding blocks (also referred to as coding units or CUs). A block could thus have either a square or rectangular shape.

The depth of the quad tree and the binary tree can be set by the encoder in the bitstream. An example of dividing a CTU using QTBT+TT is illustrated in FIG. 1. The TT allows the CU to be divided into three partitions instead of two equally sized partitions. This increases the possibility of using a block structure that better fits the content structure in a picture.

Context Adaptive Binary Arithmetic Coding (CABAC)

Context Adaptive Binary Arithmetic Coding (CABAC) is an entropy coding tool used in HEVC and VVC. CABAC is configured to encode binary symbols, which keeps complexity low and allows modelling of probabilities for bits of a symbol that are more frequently used. The probability models are selected adaptively based on local context, since coding modes are usually well correlated locally.

Slices

The concept of slices in HEVC divides the picture into independently coded slices, where each slice is read in raster scan order in units of CTUs. Different coding types could be used for slices of the same picture. For example, a slice could either be an I-slice, P-slice or B-slice. However, the main purpose of slices is to enable resynchronization in case of a loss of data.

Tiles

The HEVC video coding standard also includes a tool called "Tiles" that divides a picture into rectangular, spatially independent regions. Using tiles, a picture in HEVC can be partitioned into rows and columns of samples where any given tile is located at an intersection of a given row and a given column. FIG. 2 shows an example of a tile partitioning using four (4) rows of tiles and five (5) columns of tiles resulting in a total of twenty (20) tiles for the picture. As seen in FIG. 2, the tiles in HEVC are always aligned with CTU boundaries.

The tile structure is signaled in the Picture Parameter Set (PPS) by specifying the thicknesses of the rows and the widths of the columns. Individual rows and columns can have different sizes, but the partitioning always span across the entire picture, from left to right and top to bottom respectively.

The PPS syntax used for specifying the tile structure in HEVC is listed in Table 1. As seen in Table 1, a flag (i.e., the tiles_enabled_flag) indicates whether tiles are used or not used. If the tiles_enabled_flag is set, the number of tiles columns (i.e., num_tile_columns_minus1) and rows (i.e., num_tile_rows_minus1) are specified. The uniform spacing flag is a flag that specifies whether the column widths and row heights are explicitly signaled, or whether a pre-defined method to space the tile borders evenly should be used. If explicit signaling is indicated, the column widths are signaled one-by-one followed by the row heights. The column width and row height information is signaled in CTU units. Finally, the flag loop_filter_across_tiles_enabled_flag specifies whether in-loop filters across tile boundaries are turned on or off for all tile boundaries in the picture.

TABLE 1

Tile syntax in HEVC

|  | Descriptor |
|---|---|
| pic_parameter_set_rbsp( ) { | |
| ... | |
|   tiles_enabled_flag | u(1) |
| ... | |
|   if( tiles_enabled_flag ) { | |
|     num_tile_columns_minus1 | ue(v) |
|     num_tile_rows_minus1 | ue(v) |
|     uniform_spacing_flag | u(1) |
|     if( !uniform_spacing_flag ) { | |
|       for( i = 0; i < num_tile_columns_minus1; i++ ) | |
|         column_width_minus1[ i ] | ue(v) |
|       for( i = 0; i < num_tile_rows_minus1; i++ ) | |
|         row_height_minus1[ i ] | ue(v) |
|     } | |
|     loop_filter_across_tiles_enabled_flag | u(1) |
|   } | |
| ... | |

Similar to slices, there is no decoding dependency between tiles of the same picture. This includes intra prediction, context selection and motion vector prediction. One exception, however, is that in-loop filtering dependencies are generally allowed between tiles. Those dependencies can, however, be disabled by setting the loop_filter_across_tiles_enabled_flag appropriately.

In contrast to slices, tiles do not require as much header data. The header overhead per tile comprises the signaling of bit-stream offsets, which are present in the slice header and indicate the starting point of all tiles in a picture. A decoder decodes the starting points to enable splitting the coded picture into coded tiles in order to distribute them for parallel decoding. In HEVC, the inclusion of bit-stream offsets in the slice header is mandatory when tiles are enabled. However, the combination of tiles and slices is restricted in HEVC. Particularly, either all CTUs in a tile belong to the same slice or all CTUs belong to the same tile.

Bit-stream offsets can also allow the extraction of tiles and stitching of tiles to re-constitute the tiles into an output stream. This requires some encoder side constraints to make the tiles temporally independent. One constraint restricts motion vectors so that motion compensation for a tile only uses samples included in spatially co-located tiles of previous pictures. Another constraint restricts temporal motion vector prediction (TMVP) such that this process is made temporally independent. For complete independence, the deblocking of boundaries between tiles must be disabled via the previously described loop_filter_across_tiles_enabled_flag. However, disabling deblocking can introduce visible lines between tiles. Therefore, some implementations disable deblocking while other implementations do not.

Tiles are sometimes used for 360-degree video that is intended for consumption using head-mounted display (HMD) devices. The field-of-view when using today's HMD devices is limited to around 20% of a full sphere. This means that only 20% of the full 360-degree video is consumed by the user. Typically, the entire 360-degree video sphere is made available to the HMD device, which then crops out the part that is rendered for the user. That part, i.e. the part of the sphere the user sees, is called the viewport. A well-known optimization of resources is to make the HMD device video system aware of head movements and the direction the user is looking so that fewer resources are spent on processing video samples that are not rendered to the user. The resources can be, for example, bandwidth from a server to a client or the decoding capability of the device. For future HMD devices, where the field of view will be larger than is currently possible, a non-uniform resource allocation would still be beneficial. Particularly, the human vision system demands a higher image quality in the central vision area (about 18° horizontal view), while a lower demand is placed on the image quality in the peripheral region (about 120° or more for a comfortable horizontal view). Therefore, non-uniform resource allocation would be helpful to meet the demands of the human vision system with more resources being allocated in the central vision area as compared to the peripheral region.

Optimizing resources to the Region of Interest (RoI) is another use case for tiles. RoI can be specified in the content or extracted by methods such as eye tracking. One method of using head movements to reduce the amount of required resources is to use tiles. This method first encodes the video sequence multiple times using tiles. The tile partitioning structure in some embodiments is the same for each of these encodings, but the video sequence is encoded at different video qualities. This produces at least one high-quality encoding for the video sequence and one low-quality encoding for the video sequence. This means that for each tile at a particular point in time, there are at least one high-quality tile representation and at least one low-quality tile representation. The difference between a high-quality tile and a low-quality tile can be that the high-quality tile is encoded at a higher bitrate than the low-quality tile, or that the high-quality tile is of higher resolution than the low-quality tile.

FIGS. 3A-3B illustrate an example of high-quality tiles having higher resolution than low-quality tiles. Particularly, FIG. 3A illustrates a picture that just has been decoded by a decoder. In this context, pictures showing the output from the decoder (i.e., the decoded pictures) are pictures shown in the compressed domain. In this example, all 8 tiles A-H in the compressed domain are of equal spatial size. Then, after the picture is decoded, but before the picture is rendered, the tiles A-H are scaled and arranged spatially. Pictures that have been prepared for rendering (i.e., after scaling and re-arrangement) are pictures to be shown in the output domain. The output domain, seen in FIG. 3B, illustrates the picture as it is rendered or presented to the user.

As seen in FIGS. 3A-3B, tiles B, D, F, and H are high-quality tiles since they are of higher resolution in the output domain. Tiles A, C, E, and G, however, are low-resolution tiles since the scaling step decreases the actual resolution.

Besides illustrating how tiles have different resolutions, FIGS. 3A-3B also illustrate that tiles in the compressed domain (FIG. 3A) do not need to be spatially ordered in the same way as they are ordered in the output domain (FIG. 3B). Given that the tiles are both spatially and temporally independent, the spatial placement of tiles in the compressed domain is not vital.

There are multiple elements that increase bit-costs when enabling tiles in HEVC. First, prediction across tiles is disabled, which means that motion vectors and intra modes are not predicted across tiles. The use of tiles also disables quantization parameter (QP) prediction and context selection. Second, CABAC is initialized for each tile, which means that CABAC adaptation is impaired. Third, bitstream offsets must be signaled for each tile. Fourth, the tile partitioning structure needs to be specified in the PPS. Finally, CABAC is flushed after each tile and the coded data has to be byte-aligned.

Figure 5:
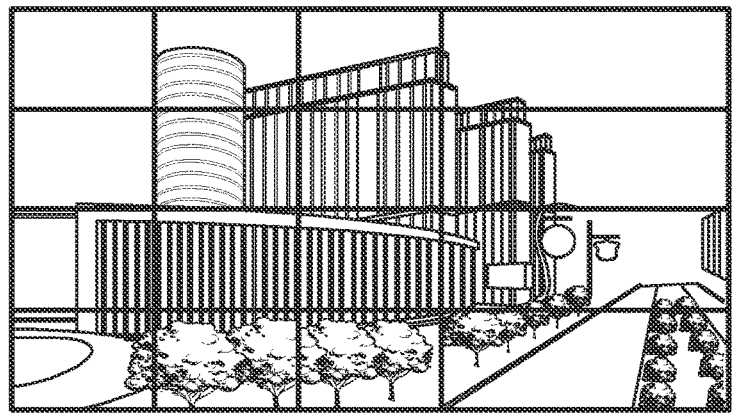
FIG. 5 illustrates an example tile structure that can be supported in HEVC.

Tiles are useful; however, there are some considerations that need to be addressed. For example, in its current form, HEVC restricts tiles to ensure that they span across the entire picture. This limits the flexibility of tiles, however. For example, FIG. 4 illustrates an example of a tile structure that is not supported by the current implementation of HEVC. In order to virtually support such a tile structure, one can specify the partition structure in HEVC seen in FIG. 5. However, the tile structure seen in FIG. 5 comprises more tile boundaries. This can harm compression efficiency and can cause unnecessary tiling artifacts. Additionally, if the tiles are to be completely spatially independent, HEVC in its current form only allows for either enabling or disabling the in-loop filtering dependencies for all tile boundaries of a picture. Therefore, unnecessary in-loop filtering restrictions will occur with conventional HEVC solutions because they do not support flexible tile partitions.

Embodiments of the present disclosure address these issues by providing flexible tile partitioning methods. It will be obvious to one of ordinary skill in the art that one or more embodiments are useful for other partitioning applications (e.g., to partitioning involving slices). Thus, embodiments provide flexible partitioning of picture segments that comprise units corresponding to a region of a partitioned picture. These picture segments are therefore in one or more embodiments described as tiles and the partition structure referred to as a tiling structure, but the teachings are applicable to other types of picture segments (e.g., slices).

It should be noted that some embodiments refer to the term "unit." A unit is, for instance, a rectangular area of a picture (e.g. coding tree units or coding units) such that a tile consists of one or multiple units. Further, some embodiments refer to the term "subsegment" or "sub-tile" or "sub-tile units" interchangeably. Each subsegment is also for instance, a rectangular area of a picture (e.g. coding tree units or coding units) such that a tile consists of one or multiple subsegments. Thus, a size of a subsegment or unit is sometimes referred to as a spatial size. In the context of a picture segment that is a tile, a subsegment is referred to as a sub-tile. One of ordinary skill in the art will appreciate that teachings applicable to a sub-tile are applicable to other subsegments and thus the term sub-tile and subsegment are used interchangeably herein. A subsegment in one or more embodiments includes a plurality of units. However, in one or more embodiments a subsegment comprises a single unit. In those cases, one of ordinary skill in the art will appreciate that teachings applicable to a unit are also applicable to a subsegment that comprises a single unit.

Methods described herein provide more freedom for an encoder to partition pictures into tiles. In one embodiment, each tile comprises a single rectangular area, and the width and height of each tile is signaled to a decoder in a bitstream.

Upon receipt, the decoder is configured to decode the individual width and height values for each tile from the bitstream.

In another embodiment, the picture is divided into units, with each unit being assigned a tile identity (ID) that identifies which particular tile the unit is assigned to. Further, in one or more embodiments the picture is divided into subsegments which each comprise a unit or a plurality of units. Each subsegment is assigned a tile ID that identifies which particular tile the subsegment is assigned to. This latter embodiment is beneficial as it supports flexible tile partitions having non-rectangular tiles, as well as partitions in a checkerboard pattern.

Embodiments of the present disclosure enable the use of more flexible tile partitions for various use cases, such as 360-degree video. Further, when compared with fixed tile partitions, the bit cost associated with flexible tile partitions is lower. Specifically, the number of tiles is higher with the use of conventional tile partitioning, and each tile comes at a cost (e.g. the processing associated with CABAC flush and adaptation reset, bit-stream offsets, etc.). The flexible tile partitioning of the present embodiments, however, uses fewer tiles thereby reducing bit costs.

The present embodiments also enable flexible CPU load balancing for parallel processing where an encoder can, for example, analyze an input picture and select a tile partitioning that splits the picture into as few tiles as possible (to reduce bit cost) while filling the available number of cores equally. Moreover, embodiments of the present disclosure also facilitate increased control over in-loop filters as compared to conventional methods that to make traditional tiles more flexible.

The present embodiments are even more beneficial for demanding use cases, such as Multi-View (MV) video coding, for example, where the bandwidth or decoding capability is a major bottleneck. In such cases, the present embodiments enable better resource allocation. In applications where the region of interest (RoI) is specified, the embodiments of the present disclosure also provide a more flexible resource allocation.

The flexible tile partitioning embodiments of the present disclosure use larger tiles than do conventional tiling methods. Because of the larger tile size, the present embodiments also contribute to the quality of a picture by putting fewer limitations on the intra motion vectors. Further the flexible tile partitioning methods of the present disclosure removes unnecessary partitioning lines between tiles. Such line removal reduces the cost of filtering with respect to lines between the tiles.

Embodiments of the present disclosure partition a picture from a sequence of video pictures into tiles with a more flexible tile layout than can be provided by conventional means, e.g. HEVC. This includes configuring an encoder to generate the partition structure and tiles for encoding, as well as a decoder to decode the partition structure and tiles. In some embodiments, the flexible tile partitioning method of the present disclosure co-exists with the processing of HEVC in its conventional form. Thus, as previously described, the tiles_enabled_flag in the bitstream can be used to specify whether the traditional tile partitioning scheme should be used, or whether the flexible tile partitioning scheme according to the present embodiments should be used.

Figure 6A:
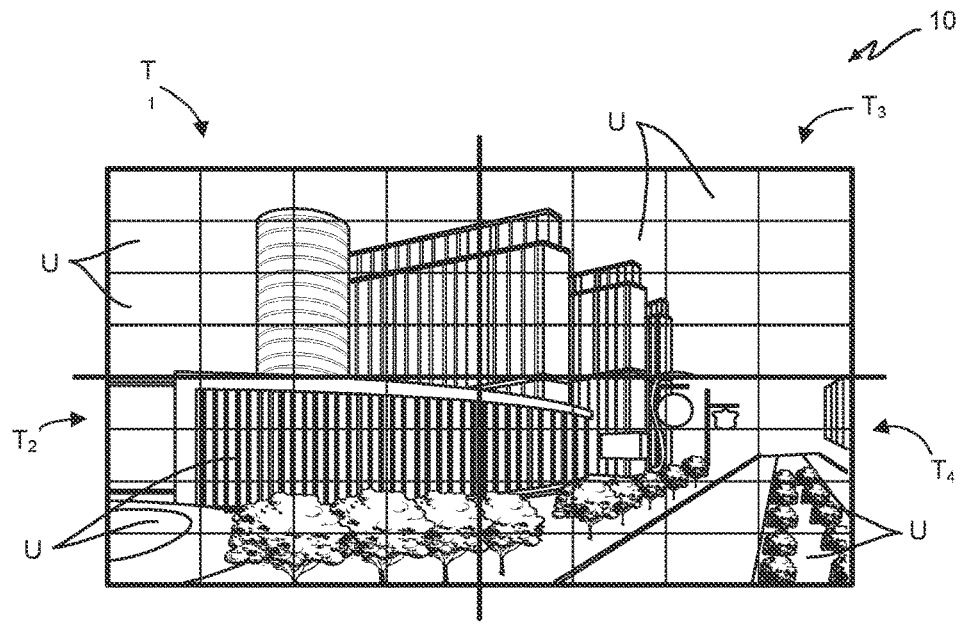
FIG. 6A illustrates an example partitioning illustrating units and picture segments.
Figure 6B:
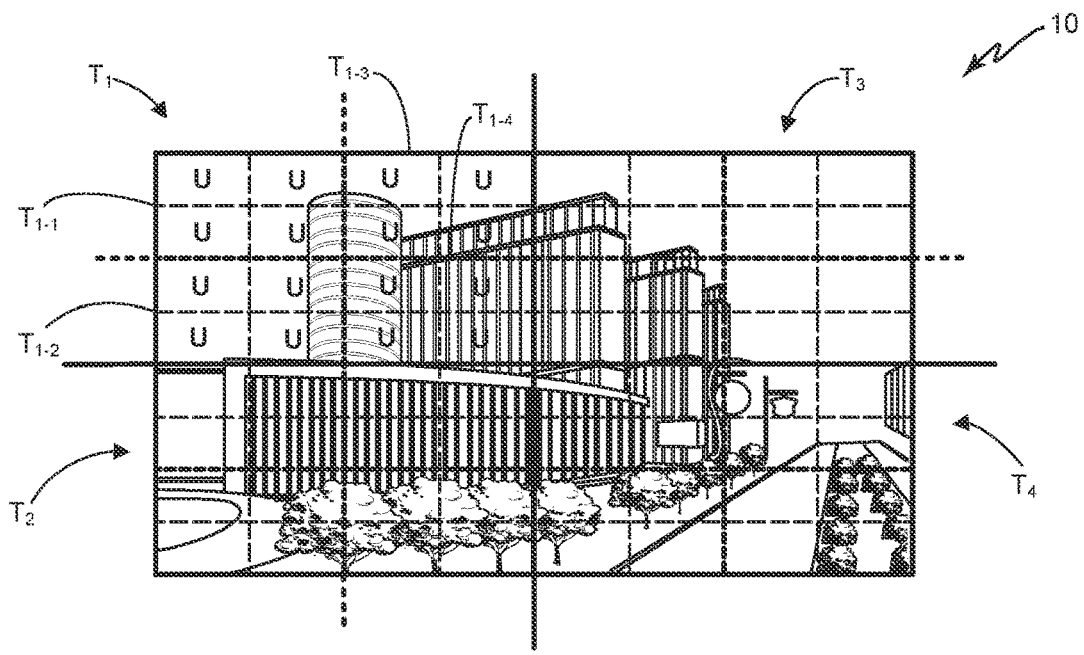
FIG. 6B illustrates an example partitioning illustrating units, subsegments, and picture segments.

FIG. 6A illustrates an example in which a picture 10 is partitioned into four (4) tiles or "segments" $T_1$, $T_2$, $T_3$, $T_4$ (collectively, "T") (as shown by the solid black lines), with each tile or segment $T_1$, $T_2$, $T_3$, $T_4$ comprising 16 units U. This provides a total of 64 units U for the picture 10. FIG. 6B illustrates picture 10 in which segments $T_1$, $T_2$, $T_3$, $T_4$ are further partitioned into 16 subsegments (e.g., $T_{1-1}$, $T_{1-2}$, $T_{1-3}$, $T_{1-4}$) as shown by the solid black lines and dotted lines. Each subsegment comprises 4 units U.

The flexible tile structure is signaled in a bitstream. For example, the encoder signals the flexible tile structure in a parameter set such as the sequence parameter set (SPS) or picture parameter set (PPS). However, as those of ordinary skill in the art will appreciate, the present disclosure is not limited to signaling the flexible tile structure in a parameter set. Although the embodiments herein describe the tile structure as being signaled in the PPS, this is for illustrative purposes only and this information can be signaled in other ways.

General Description

Figure 7:
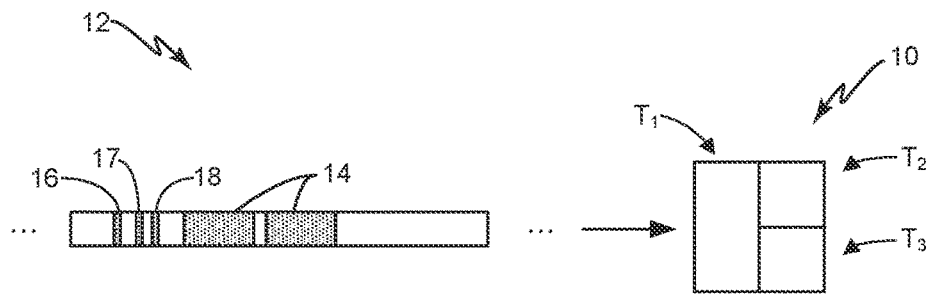
FIG. 7 illustrates an example bitstream according to one embodiment of the present disclosure.
Figure 8:
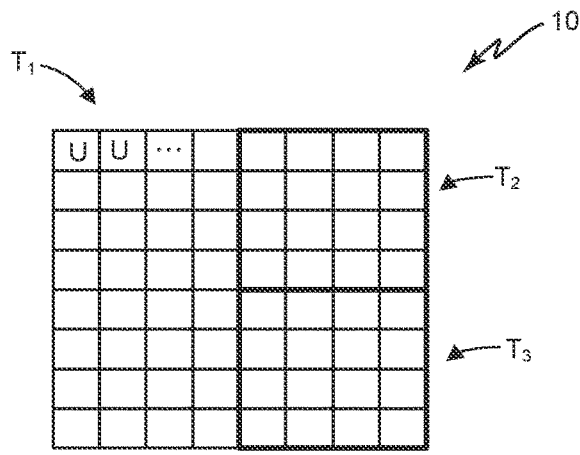
FIG. 8 illustrates a picture partitioned into 64 units according to one embodiment of the present disclosure
Figure 11B:
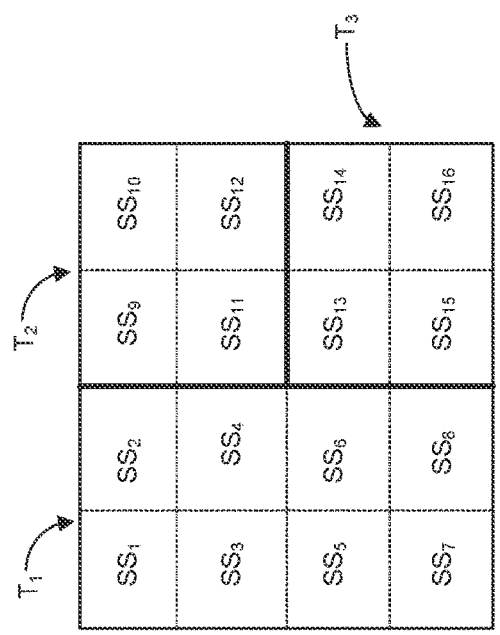
FIGS. 11A-11C illustrate a picture partitioned according to a partition structure, with FIG. 11A illustrating the units, and FIG. 11B illustrating subsegments or sub-tiles and FIG. 11C illustrating the segments or tiles, according to one embodiment of the present disclosure.
Figure 11C:
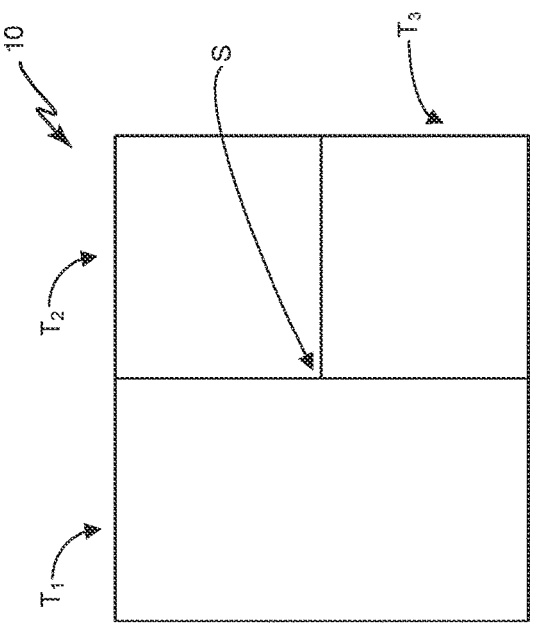
Figure 11A:
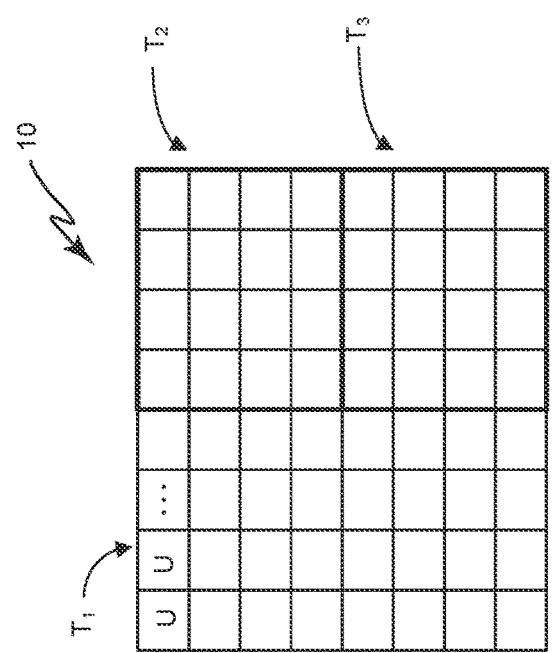

FIG. 7 shows a bitstream 12 that is decoded into a picture 10. FIG. 8 shows picture 10 partitioned into 64 units U. FIGS. 11A-C shows another example picture 10 with 64 units U shown in FIG. 11A that also uses subsegments (e.g., $T_{1-1}$, $T_{1-2}$, $T_{1-3}$, $T_{1-4}$) as shown in FIG. 11B. One example of a unit U is a macroblock known from H.264. Another example of a unit U is a CTU known from HEVC.

As seen in FIG. 7, bitstream 12 comprises one or more coded segments T and one or more code words 16, 17, 18. The one or more codewords 16 comprises information that specifies the number of bytes or bits in the bitstream comprising the data needed for decoding each of the coded segments T. The one or more codewords 17 carry information specifying a spatial size of the units U. The one or more codewords 18 carry information specifying a spatial size of a subsegment. As an example, the spatial size of the units U is 64 luma samples horizontally and 64 luma samples vertically; however, as those of ordinary skill in the art will appreciate, the present disclosure is not limited to these sizes and shapes of units U. Other unit sizes and shapes, including irregularly-shaped units (e.g., units not shaped as squares), are also possible according to the embodiments of the present disclosure.

As seen in FIGS. 7-8, picture 10 has been spatially partitioned into three segments $T_1$, $T_2$, $T_3$ using a partition structure. The information defining the partition structure was derived from information in the bitstream 12. For example, the coded segments 14 from the bitstream 12 are decoded to derive the sample values of a corresponding decoded segment in the picture 10. Additionally, the size and/or position of the coded segment 14 can be parsed from the one or more codewords 16 in the bitstream 12. As previously stated, one embodiment of the present disclosure utilizes the one or more codewords 16 to carry information specifying the number of bytes or bits in the bitstream that comprise information needed to decode the coded segment 14. Alternatively, however, embodiments of the present disclosure can utilize the one or more codewords 16 to carry information needed to derive the locations or positions of the coded segment 14 in the bitstream 12.

As seen in FIG. 8, the boundaries of each segment $T_1$, $T_2$, $T_3$ are aligned with the boundaries of the unit U. This means that each segment $T_1$, $T_2$, $T_3$ comprises an integer number of units U, and that each unit U is associated with one segment T. For example, as seen in FIG. 8, the two rightmost segments $T_2$, $T_3$ comprise 16 units each, while the leftmost segment $T_1$ comprises 32 units.

Figure 9:
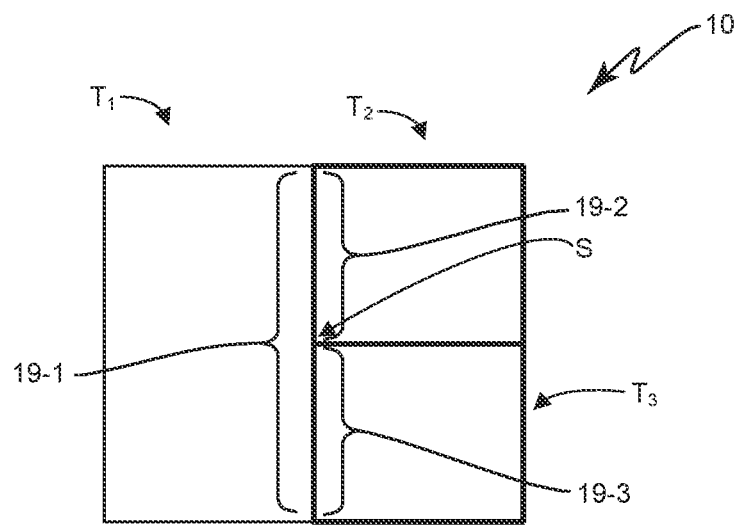
FIG. 9 illustrates an example three segment partition structure according to one embodiment of the present disclosure.

FIG. 9 illustrates an embodiment in which picture 10 is partitioned using the same partition structure S illustrated in FIG. 8. However, for clarity's sake, FIG. 9 does not illustrate the units U. As seen in FIG. 9, one side 19-1 of a first segment $T_1$ borders the sides 19-2, 19-3 of two or more neighboring or adjacent segments $T_2$, $T_3$, respectively.

Figure 10:
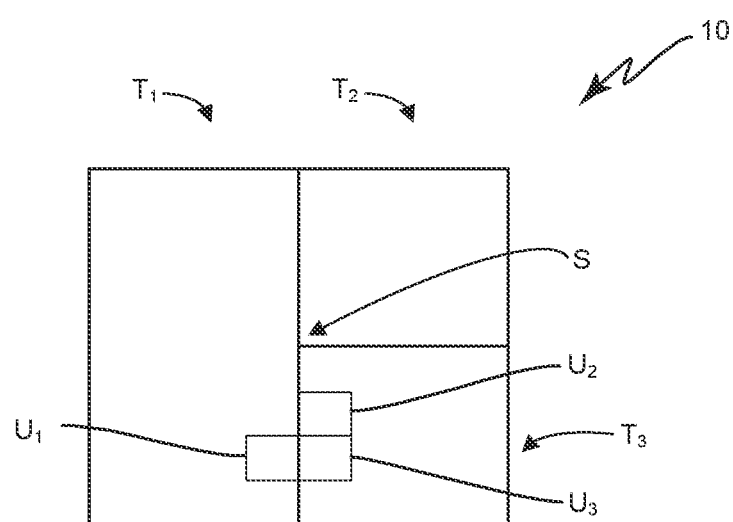
FIG. 10 illustrates a picture that has been partitioned using a partition structure illustrated in FIGS. 8 and 9 according to one embodiment of the present disclosure.

FIG. 10 illustrates picture 10 that has been partitioned using the same partition structure S illustrated in FIGS. 8 and 9. As seen in FIG. 10, picture 10 comprises three segments $T_1$, $T_2$, $T_3$. All segments $T_1$, $T_2$, $T_3$ of FIG. 10 comprise one or more units U; however, for clarity sake, FIG. 10 illustrates segments $T_1$ and $T_3$ as comprising a subset of the units U. Specifically, segment $T_1$ comprises unit $U_1$ while the neighboring or adjacent segment $T_3$ comprises units $U_2$, $U_3$. Each of the segments $T_1$, $T_2$, $T_3$ are independent with respect to each other. This means that the boundaries of the segments $T_1$, $T_2$, $T_3$ are handled similar to picture boundaries when decoding the units U. This affects the derivation process of elements during decoding such as e.g. the derivation of intra prediction modes and the derivation of quantization parameter values.

Intra prediction modes (e.g., intra (B) prediction mode and intra (P) prediction mode) are used and signaled for units that only use predictions from previously decoded samples of a current picture for sample prediction. It is common that the derivation of the intra prediction mode in a particular unit $U_2$ depends on previously derived intra prediction modes in other units $U_3$. With segments being independent, the derivation of the intra prediction mode in a particular unit $U_2$ only depends on previously derived intra prediction modes in units $U_3$ that belong to the same current segment $T_3$ and does not depend on any intra prediction mode in any unit, such as unit $U_1$, that is associated with a different segment, such as segment $T_1$. Thus, the partition structure S of FIG. 10 makes the intra prediction modes in the units $U_1$ in a first segment $T_1$ unavailable for the derivation of the intra prediction mode for units $U_2$, $U_3$ in second, different segment $T_3$.

Unit $U_1$ in the first segment $T_1$ could, however, be used for derivation of an intra prediction mode in another unit, but only if that other unit was in the same segment $T_1$. Thus, the segment boundaries have the same or similar effect on intra mode derivation as a picture boundary for the units $U_2$, $U_3$ in second segment $T_3$. In other words, the derivation of an intra prediction mode for a first unit $U_2$ of a picture segment $T_3$ may depend on a derived intra prediction mode for a second unit $U_3$ of the picture segment $T_3$.

The quantization parameter (QP) value is also well known in the art. The QP value for a unit U, for example, is typically derived using previously derived QP values. One derivation process known in the art is to first derive a predicted QP value from the bitstream 12, and then add a delta QP value to the predicted QP value. Because the segments $T_1$, $T_2$, $T_3$ are independent of each other, the derivation of the QP value in a particular unit, such as unit $U_2$ of segment $T_3$, for example, can only depend on previously derived QP values in units that are in the same segment $T_3$. The derivation of a QP value in a particular given unit $U_2$, $U_3$ does not depend on any QP values associated with any other unit that is in a different segment, such as unit $U_1$ in segment $T_1$. This means that the partition structure S in FIG. 10 makes the QP values in units $U_1$ in a first segment $T_1$ unavailable for the derivation of the QP value for the units $U_2$, $U_3$ in a second, different segment $T_1$.

The QP value in some units U could be used for the derivation of a QP value in another unit U, but only if that other unit was in the same segment $T_1$. Thus, the segment boundaries have the same or similar effect on QP value derivation as a picture boundary for the units $U_2$, $U_3$ in second segment $T_3$.

FIGS. 11A-11C illustrate the same picture 10 partitioned according to the partition structure S but includes the use of subsegments $SS_1$-$SS_{16}$, as shown in FIG. 11B. FIG. 11A illustrates the units U. As previously described, the spatial size of the units is signaled in the bitstream 12 as one or more code words 17. FIG. 11B shows subsegments $SS_1$-$SS_{16}$, each of which comprises an integer number of units U greater than 1. Thus, each subsegment $SS_1$-$SS_{16}$ comprises at least two units U, and each unit U belongs to one subsegment only. The spatial size of the subsegments $SS_1$-$SS_{16}$ is signaled in the bitstream 12 as one or more code words 18. The spatial size of the subsegments (21) is expressed in terms of units. In the example in FIG. 11B, the spatial size of the subsegments is 2 units horizontally and 2 units vertically. It should be noted that subsegments can be rectangular such that the width and height differ. The information carried in the one or more code words (24) may consist of one height value and one width value. The information can be regarded as one subsegment size (i.e. a value pair), or be regarded as independent width and height values. The code words (24) are decoded by a decoder from the bitstream 12 and used to derive the size of the subsegments.

FIG. 11C illustrates segments $T_1$, $T_2$, $T_3$ and the partition structure S of picture 10. Each segment $T_1$, $T_2$, $T_3$ comprises at least one unit U. Segments $T_1$, $T_2$, $T_3$ comprise an integer number of subsegments $SS_1$-$SS_{16}$ greater than 0. Thus, each segment $T_1$, $T_2$, $T_3$ comprises at least one subsegment $SS_1$-$SS_{16}$, and each subsegment $SS_1$-$SS_{16}$ belongs to one segment $T_1$, $T_2$, $T_3$ only. It can be noted that if all segments $T_1$, $T_2$, $T_3$ comprise a single subsegment, the subsegments in one or more embodiments are redundant and need not be included in information signaled as part of the partition structure S. Therefore, subsegments are useful where there is at least one segment $T_1$, $T_2$, $T_3$ in a picture 10 that includes more than one subsegment $SS_1$-$SS_{16}$. The spatial size of the segments $T_1$, $T_2$, $T_3$ is expressed in terms of subsegments $SS_1$-$SS_{16}$, which means that the size of the subsegments $SS_1$-$SS_{16}$ is used when deriving the spatial sizes of the segments $T_1$, $T_2$, $T_3$ and/or the spatial partition structure S. In the example in FIGS. 11A-11C, the spatial size of two segments $T_2$, $T_3$ is 2 subsegments horizontally and 2 subsegments vertically, and the spatial size of one segment $T_1$ is 2 subsegments horizontally and 4 subsegments vertically.

It should be noted that segments $T_1$, $T_2$, $T_3$ in some embodiments can be rectangular such that the width and height of the segments differ. In other embodiments, segments $T_1$, $T_2$, $T_3$ are non-rectangular and expressed by allocating each unit U and/or subsegment SS to one segment (e.g., subsegment $T_1$. Such an allocation are used to represent, for example, "chessboard segments," in which some of the segments $T_1$, $T_2$, $T_3$ represent white squares on a chessboard, while other segments $T_1$, $T_2$, $T_3$ represent the black squares on the chessboard. A segment (e.g., segment $T_1$) can, in some embodiments, be equivalent to a tile or slice. A subsegment can, in some embodiments, be equivalent to a sub-tile.

First Embodiment

As was seen in FIG. 9, a picture 10 or a part of a picture 10 in a video stream is divided into a spatial partition structure S, where the partition structure S comprises at least three segments $T_1$, $T_2$, $T_3$. Each segment $T_1$, $T_2$, $T_3$ comprises units U, with at least one of the segments $T_1$, $T_2$, $T_3$ comprising two or more units U. The spatial size of the units U is signaled in, and decoded from, the one or more codewords 17 of the bitstream 12. Additionally, the one or more code words 16 indicating the size or position of at least one coded segment T in the bitstream 12 are parsed from the bitstream 12.

At least one segment $T_1$ has at least one side 19-1 that borders the sides 19-2, 19-3 of two or more than one neighboring segments $T_2$, $T_3$. Additionally, the segments $T_1$, $T_2$, $T_3$ are independent with respect to each other such that the derivation of any intra prediction mode for any unit U in a first segment $T_1$ only depends on previously derived intra prediction modes in units U that are also in the first segment $T_1$. The derivation of any intra prediction mode for a unit U in the first segment $T_1$ does not depend on any intra prediction mode in any unit U that is in a second, different segment $T_2$. Such segments are referred to herein as "flexible tiles" or simply just "tiles" and are different from HEVC tiles which are arranged in as strict columns and rows defined with respect to a single unit. That is, with HEVC, no tiles in the picture have one side that borders more than one neighboring segment. Rather, a given side of a given tile in HEVC borders only one side of one other adjacent tile. Flexible tiles can also include optional subsegments that are the same thing as flexible sub-tiles or more simply expressed as sub-tiles. It should be noted that the present disclosure uses the terms segments, flexible tiles, and tiles interchangeably. However, within the context of these embodiments, the terms "flexible tile" and "tile" are defined to be the same as a segment, and all are different than HEVC tiles, as previously described.

Figure 12A:
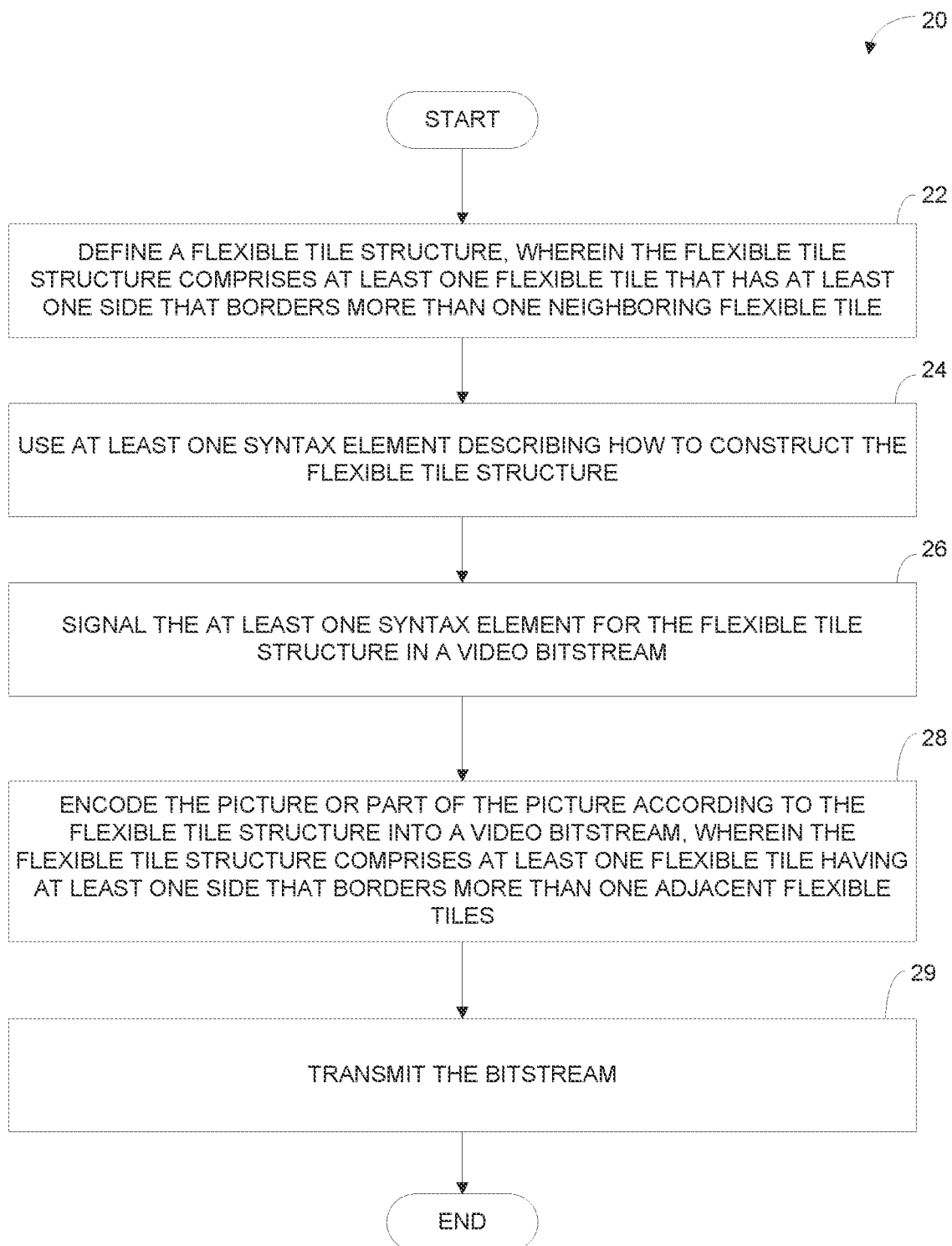
FIG. 12A is a flow diagram illustrating a method for encoding a picture or part of a picture using flexible tiles in accordance with a first embodiment of the present disclosure.

FIG. 12A is a flow diagram illustrating a method 20 for encoding a picture or part of a picture using flexible tiles in accordance with a first embodiment of the present disclosure.

Method 20 is implemented at an encoder and begins with the encoder defining a flexible tile structure for the picture (box 22). The flexible tile structure comprises at least one flexible tile having at least one side that borders two or more adjacent flexible tiles. The encoder then defines at least one syntax element to describe how to construct the flexible tile structure (box 24). The at least one syntax element comprises one or more properties that describe the flexible tiles, or the syntax element comprises means to derive properties for the flexible tiles. Such properties comprise, for example, an identifier, a width, a height, and a position that describe how to assign and/or access the individual flexible tiles. The encoder then signals the at least one syntax element for the flexible tile structure in a video bitstream (box 26), and encodes the picture or part of the picture according to the flexible tile structure into the video bitstream (box 28). The flexible tile structure comprises at least one flexible tile having at least one side that borders more than one adjacent flexible tile.

Figure 12B:
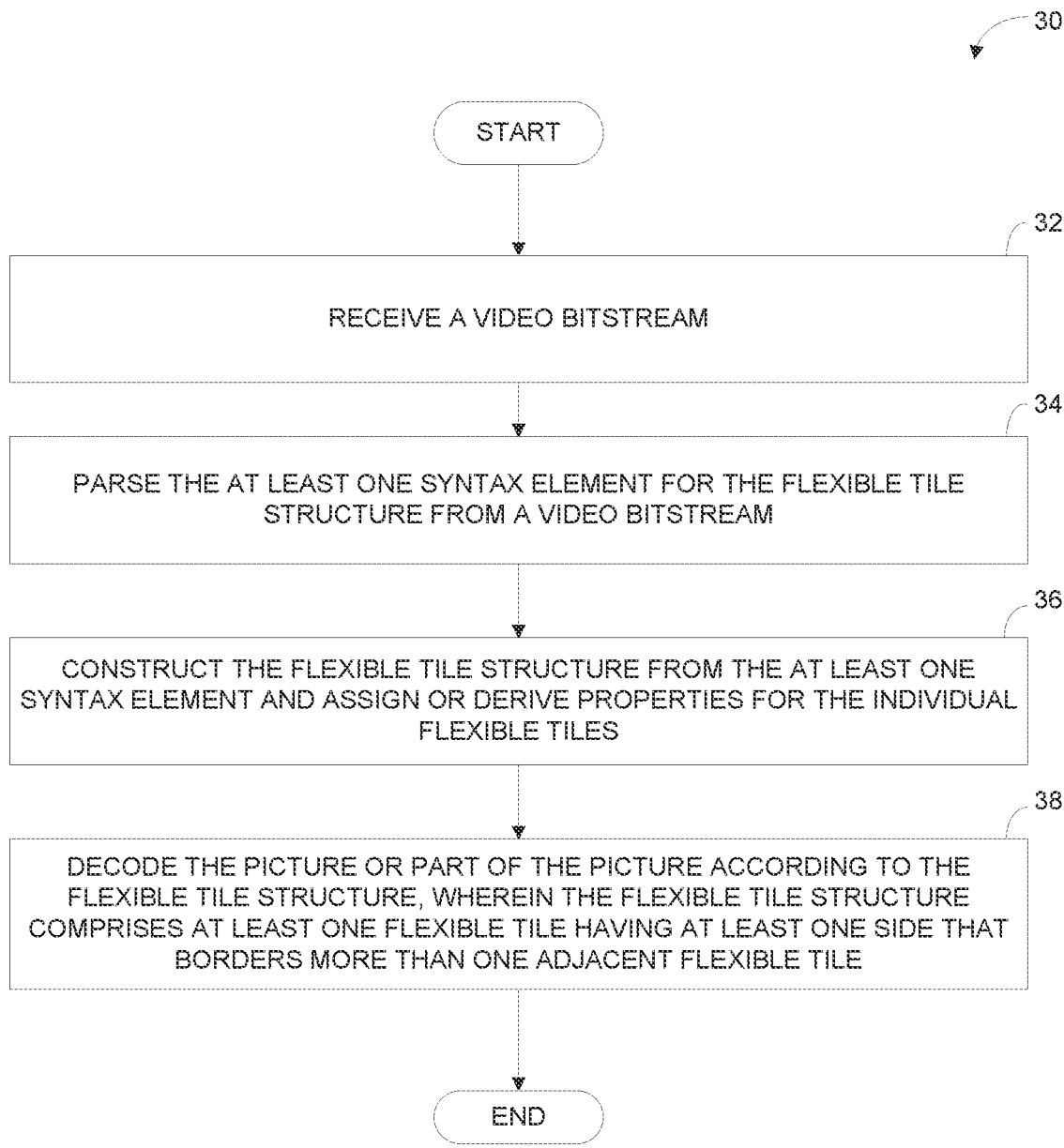
FIG. 12B is a flow diagram illustrating a method for decoding a picture or part of a picture that was encoded using flexible tiles in accordance with the first embodiment of the present disclosure.

FIG. 12B is a flow diagram illustrating a method 30 for decoding a picture or part of a picture that was encoded using flexible tiles in accordance with the first embodiment of the present disclosure.

As seen in FIG. 12B, method 30 begins with the decoder receiving a video bitstream (box 32) and parsing the at least one syntax element for the flexible tile structure from a video bitstream received from the encoder (box 34). The decoder can then construct the flexible tile structure from the at least one syntax element, and assign or derive properties for the individual flexible tiles (box 36). The properties include an identifier, a width, a height, and a position that can be used for assigning and/or accessing the flexible tiles. The decoder then decodes the picture or part of the picture according to the flexible tile structure (box 38). As stated previously, the flexible tile structure comprises at least one flexible tile having at least one side that borders corresponding sides of more than one adjacent flexible tile.

Second Embodiment-Specifying Tile Width and Height

In a first embodiment, the flexible tiles are scanned in a pre-defined order, and a tile width and tile height are specified for each tile. In one or more embodiments, the pre-defined order is a raster scan order, e.g. along the units (e.g., the CTUs), and the tile size is specified in units. Alternatively, the pre-defined order is a raster scan order along the subsegments, and the tile size is specified in terms of subsegments.

Figure 13A:
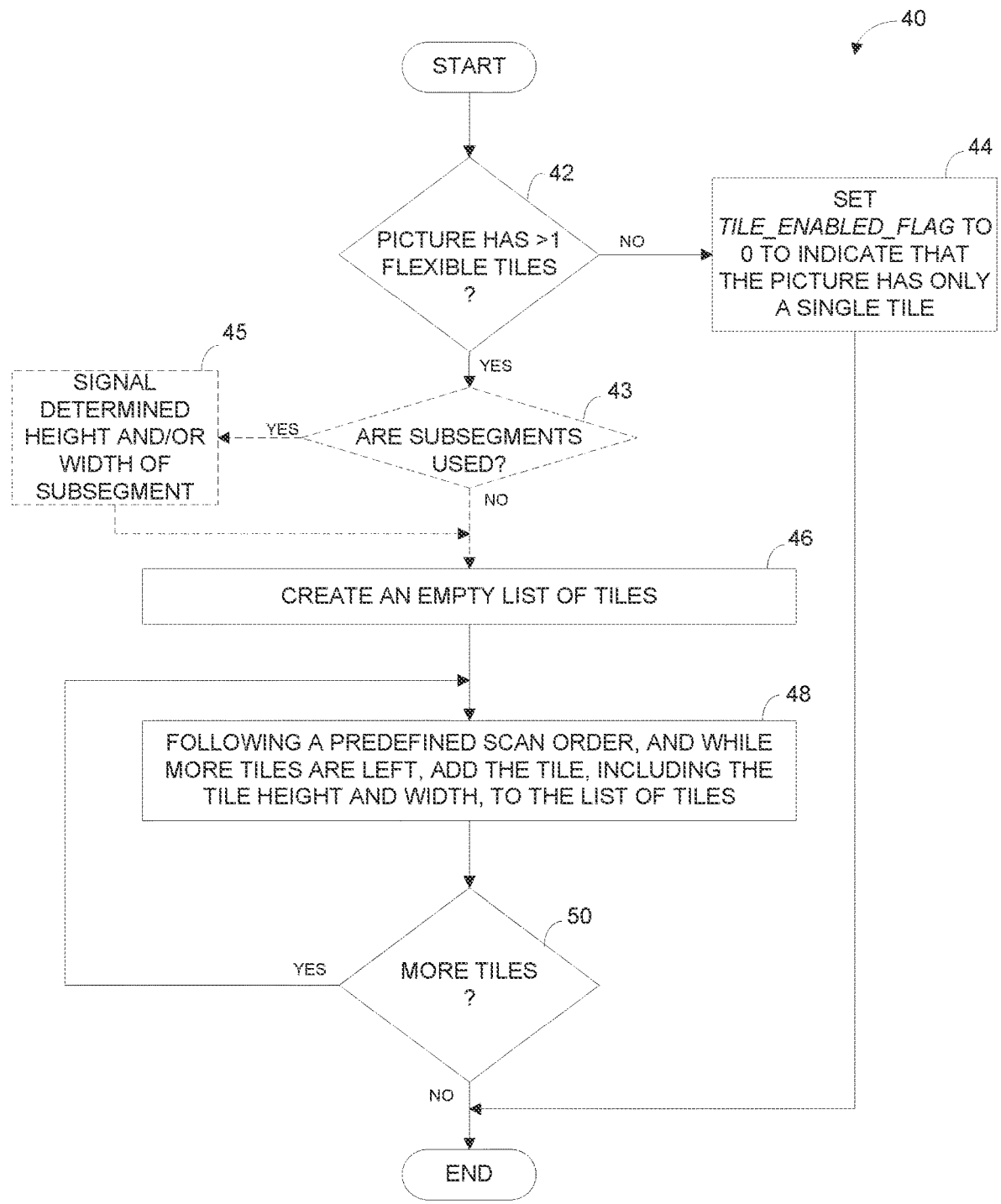
FIG. 13A is a flow diagram illustrating a method by which the encoder constructs and signals the flexible tiles according to one embodiment of the present disclosure.

FIG. 13A is a flow diagram illustrating a method 40 by which the encoder constructs and signals the flexible tiles.

As seen in method 40, the encoder first determines whether the picture has one tile or multiple tiles (box 42). If the picture has only one tile, the encoder sets the tile_enabled_flag equal to 0 to indicate that the picture has only a single tile (box 44) and ends the process. Otherwise, if the picture has more than one flexible tile, the encoder creates an empty list of tiles (box 46). Optionally, the method includes a step (box 43) of determining whether subsegments are used for any of the tiles. If no, the method carries on with the encoder creating an empty list of tiles (box 46). If the partition structure includes subsegments (box 45), the height and or width of a sub-tile is determined and signaled in the bitstream. The subsegment height and/or width can be predefined. Following a predefined scan order, the encoder adds the flexible tile to the list, including the information identifying the height and width of the flexible tile (box 48) (e.g., expressed in terms of units or subsegments if subsegments are used). The encoder continues to add flexible tiles to the list as long as the picture has more flexible tiles (box 50).

Figure 13B:
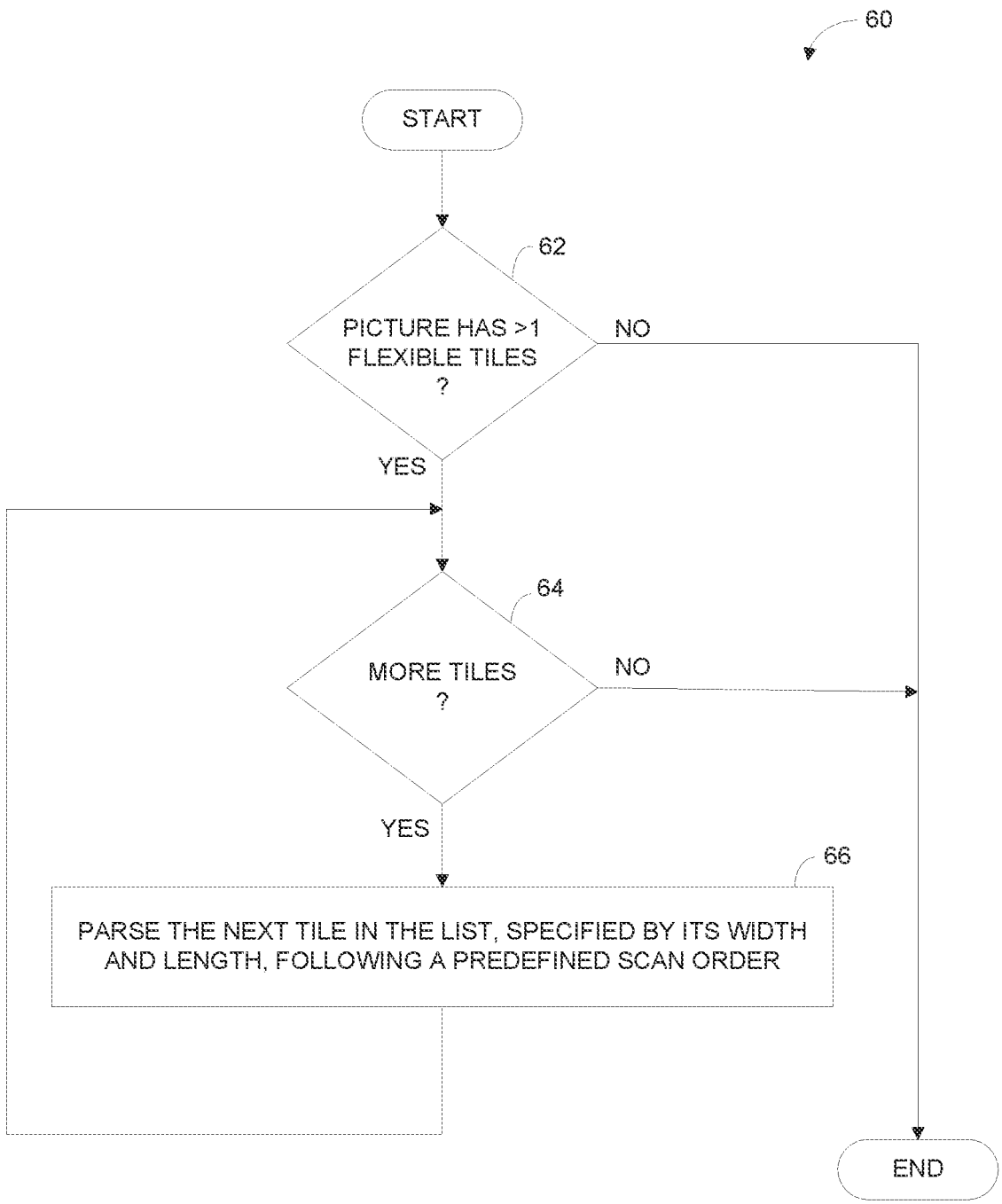
FIG. 13B is a flow diagram illustrating a method by which the decoder parses and constructs the flexible tiles according to one embodiment of the present disclosure.

FIG. 13B is a flow diagram illustrating a method 60 by which the decoder parses and constructs the flexible tiles.

As seen in method 60, the decoder first determines whether the picture has one tile or multiple tiles (box 62). If the tile_enabled_flag is set to 0, indicating that the picture has only one flexible tile with the identified width and height, the method ends. Otherwise, while there are still flexible tiles in the list (box 64), the decoder parses the next tile in the list, specified by its width and length following the predefined scan order (box 66). If optional subsegments are part of the partition structure and not predefined, the decoder optionally parses the sub-tile height and/or width from the bitstream. This can occur at various points in the method 13B as (e.g., after it is determined there is more than one tile).

Table 2 identifies an example syntax for use in one or more embodiments of the present disclosure. The syntax could be implemented on top of the currently existing HEVC video coding specification.

TABLE 2

An example tile syntax

| | Descriptor |
|---|---|
| pic_parameter_set_rbsp( ) { | |
| ... | |
|   tiles_enabled_flag | u(1) |
|   if( tiles_enabled_flag ) { | |
|     flexible_tiles_enabled_flag | u(1) |
|     if( flexible_tiles_enabled_flag ) { | |
|       sub-tile_width_minus1 | ue(v) |
|       sub-tile_height_minus1 | ue(v) |
|       while( read_more_tiles( ) ) { | |
|         tile_width_minus1[ i ] | ue(v) |
|         tile_height_minus1[ i ] | ue(v) |
|       } | |
|     } | |
|     ... | |
|   } | |
| ... | |

Semantics for the Syntax Elements in Table 2 tiles_enabled_flag: This flag can be set to a value of 1 or 0. When set to 1, this flag specifies that there is more than one tile in each picture referring to the PPS. When set to 0, this flag specifies that there is only one tile in each picture referring to the PPS.

flexible_tiles_enabled_flag: This flag can be set to a value of 1 or 0. When set to 1, this flag specifies that flexible tiles are used to partition pictures, referring to the PPS, into tiles. flexible_tiles_enabled_flag equal to 0 specifies that flexible tiles are not used to partition pictures referring to the PPS into tiles.

sub-tile_width_minus1 plus 1 specifies the width of the sub-tile unit in coding tree units. sub-tile_width_minus1 shall be in the range of 0 to PicWidthInCtbsY−1, inclusive sub-tile_height_minus1 plus 1 specifies the height of the sub-tile unit in coding tree units. sub-tile_height_minus1 shall be in the range of 0 to PicHeightInCtbsY−1, inclusive tile_width_minus1[i] plus 1 specifies the width of the i-th tile in units of sub-tile width units.

tile_height_minus1[i] plus 1 specifies the height of the i-th tile in units of sub-tile height units.

read_more_tiles( ) is specified as follows:

If there are at least one CTU in the picture that is not assigned to a tile, the return value of read_more_tiles( ) is equal to TRUE.

Otherwise, the return value of read_more_tiles( ) is equal to FALSE

In one embodiment, the decoder invokes the following function prior to parsing the first tile_width_minus1 syntax element in a PPS:

```
tile_id = 0
i = 0
for( y= 0; y < PicHeightInCtbsY; y++ )
    for( x = 0; x < PicWidthInCtbsY; x++ )
        CTU_tile_assignment[ y ][ x ] = "no tile"
```

In one embodiment, the decoder invokes the following function after parsing the first tile_height_minus1 syntax element in a PPS.

```
for( tile_coordinate_y = 0; tile_coordinate_y < PicHeightInCtbsY;
tile_coordinate_y++ )
    for( tile_coordinate_x = 0; tile_coordinate_x < PicWidthInCtbsY;
    tile_coordinate_x++ )
        if( CTU_tile_assignment[ tile_coordinate_y ][ tile_coordinate_x ]
        == "no tile")
            break
for( y = 0; y <= tile_height_minus1; y++ )
    for( x = 0; x <= tile_width_minus1; x++ )
        CTU_tile_assignment[ tile_coordinate_y+y][tile_coordinate_x+x]
        = tile_id
tile_id++
i++
```

In one embodiment, the syntax elements tile_width_minus1 and tile_height_minus1 are restricted such that all of the following conditions must hold prior to CTU_tile_assignment [tile_coordinate_y+y][tile_coordinate x+x]=tile_id:
1. the tile_coordinate_y+y must be less than PicHeightInCtbsY;
2. tile_coordinate x+x must be less than PicWidthInCtbsY; and
3. CTU_tile_assignment[tile_coordinate_y+y][tile_coordinate x+x] must be equal to "no tile."

Figure 14:
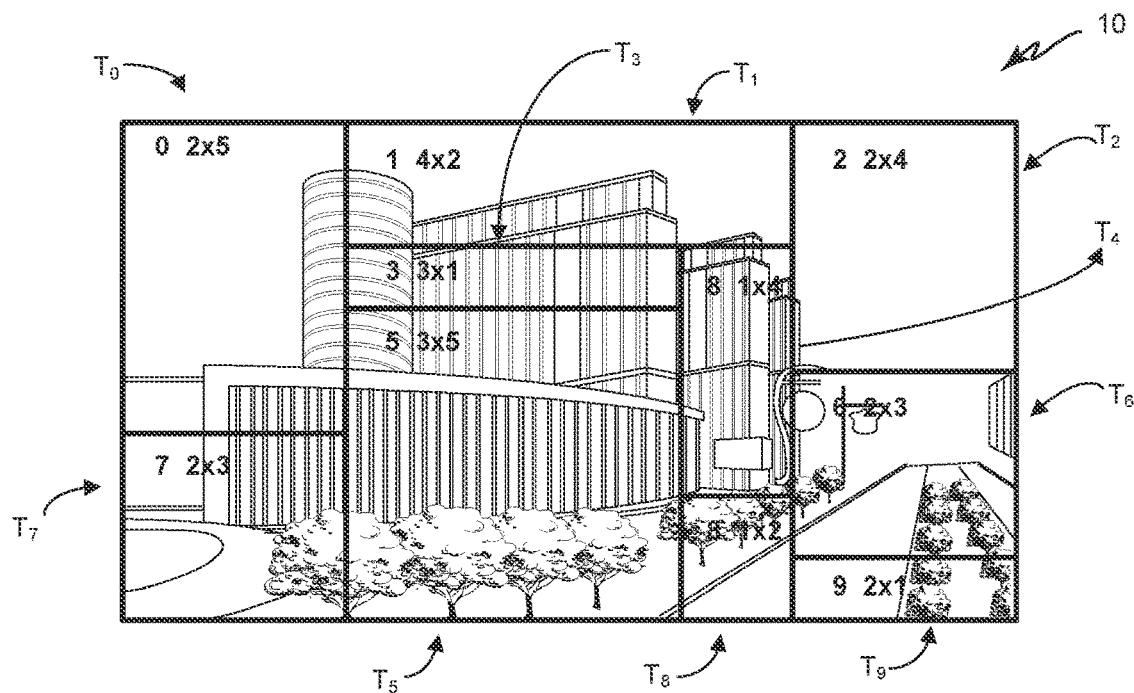
FIG. 14 illustrates an example tile partition where 10 tiles are used to partition the picture according to one embodiment of the present disclosure.

FIG. 14 illustrates an example tile partition where 10 tiles $T_0 \ldots T_9$ are used to partition the picture 10. The numbers seen in each tile of FIG. 14 represent a tile number (i.e., an integer 0, 1, 2, ... ) followed by the width and height of the tile in CTUs (e.g., 4×2). Using the example syntax of Table 2 above, the tile partition is expressed by a total of 63.

Figure 15:
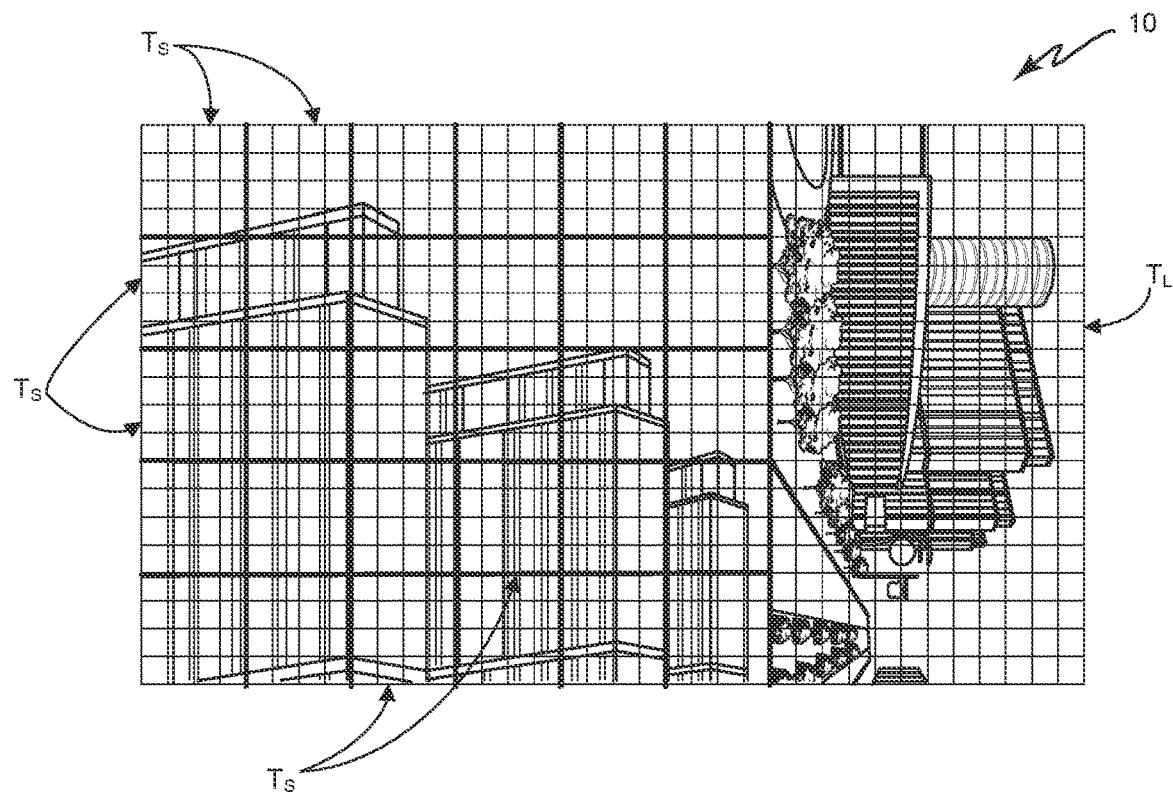
FIG. 15 illustrates an example tile partition in which a picture having a size of 2048×1280 is partitioned into 26 tiles according to one embodiment of the present disclosure.

FIG. 15 shows another example tile partition a picture 10 having a size of 2048×1280 is partitioned into 26 tiles. As seen in FIG. 15, not all tiles are the same size and shape. Rather, there is one large sized tile $T_L$ and a plurality of smaller tiles $T_S$. The large rectangular tile $T_L$ in FIG. 15 is a flexible tile as it has one side that borders the sides of more than one of the smaller tiles $T_S$. Additionally, the picture comprises 32×20=640 CTUs, each of which has a size of 64×64 luma samples. Such a tile partition is used for 360 video streaming where some smaller tiles $T_S$ are used to cover the viewport and a single large tile IL covers the full sphere in lower resolution.

Using the example syntax in Table 2 above, the tile partition of FIG. 15 can be expressed by a total of 267 bits. One bit for the tiles_enabled_flag=1 indicating that flexible tiles are used. Then the 25 smaller tiles $T_S$ are signaled with 10 bits each, and the large tile IL is signaled with 16 bits using tile_width_minus1=11 (7 bits) and tile_height_minus1=19 (9 bits). If the tile size is used, the result would be 1+tile size (5+5)+25*2+(3+5)=69 bits.

Figure 36A:
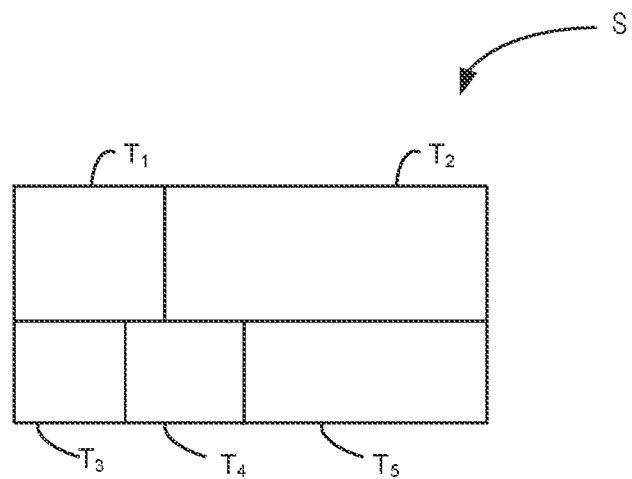
FIGS. 36A-36C illustrate a picture partitioned according to a partition structure, with FIG. 36A illustrating the segments or tiles, and FIG. 36B illustrating subsegments or sub-tiles and FIG. 36C illustrating units, according to one embodiment of the present disclosure.
Figure 36B:
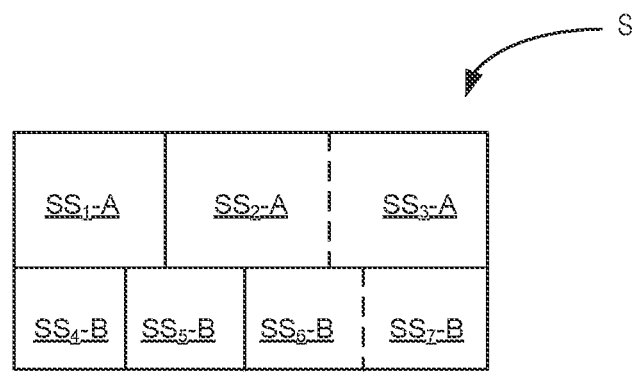
Figure 36C:
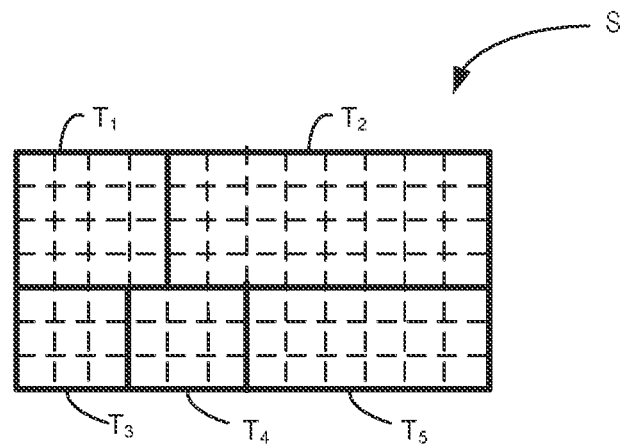

In a variant of this embodiment shown in FIGS. 36A-36C, more than one sub-tile size is defined. FIG. 36A shows an example partition structure S with 5 segments or tiles $T_1 \ldots T_5$. FIG. 36B shows that the example partition structure S has 7 subsegments or sub-tiles $SS_1 \ldots SS_7$ of two different types A and B. FIG. 36C shows that the example partition structure S with 5 segments or tiles $T_1 \ldots T_5$ and 84 units or CTUs. Each sub-tile size is specified in CTU units.

For each tile, the width and height is specified in one of those previously defined sub-tile units and the information about which sub-tile size is used is sent together with the width and height of that specific tile. In the following example, illustrated in FIGS. 36A-36C, two sub-tiles of different sizes are used: one of 4×4 CTUs named sub-tile A and one of 3×3 CTUs named sub-tile B. Then:

height and width of tile $T_1$ is specified in sub-tile unit A as 1×1.

height and width of tile $T_2$ is specified in sub-tile unit A as 1×2.

height and width of tile $T_3$ is specified in sub-tile unit B as 1×1.

height and width of tile $T_4$ is specified in sub-tile unit B as 1×1.

height and width of tile $T_5$ is specified in sub-tile unit B as 1×2.

When a tile can be specified in more than one sub-tile unit, the sub-tile unit that gives the smaller unit count in that tile is preferably chosen by the encoder for specifying the width and height of that tile.

Third Embodiment—Specify Tile Height and Width Using Subtiles and a Flag for Tile Size Copy In a preferred embodiment, the tile partition structure is conveyed by signaling the height and width of tiles, optionally using sub-tile units. The tiles consist of an integer number of sub-tiles where the sub-tiles consist of an integer number of coding units such as CTUs. The spatial size of the coding units or sub-tiles is signaled in the bitstream (e.g., in terms of coding units).

For example, a CTU unit size is signaled in the bitstream to have a size of 64×64 luma samples. Then a sub-tile unit size is signaled to have a width of 4 and a height of 2. That means that the sub-tile has a width of 256 luma samples and a height of 128 luma samples since the sub-tile unit size is signaled using the CTU unit size. One tile then is signaled to have a width of 2 and a height of 1, which means that the tile has a width of 512 luma samples and a height of 128 luma samples. Using a sub-tile unit is beneficial when the widths of all tiles have a greatest common divisor larger than 1 CTU width and/or when the heights of all tiles have a greatest common divisor larger than 1 CTU height. Expressing the height and width of a tile can with sub-tiles be done using smaller values which can be done using fewer bits in the bitstream.

Further in this embodiment, a flag is used to specify whether or not a current tile size is identical to the closest previously signaled tile size. If the flag has one value, the tile size for the current tile is copied from a previous tile. If the flag has another value, the height and width of the tile is explicitly signaled using the height and width of the coding unit or sub-tile. As described in more detail below, the decoder decodes this flag and, based on its value, determines whether or not the current tile size is identical to the closest previously signaled tile size.

In one variant of this embodiment, the number of tiles in the picture is decoded first. Then there is a loop over the known number of tiles for which the size is decoded. Optionally, the size of the last tile is not signaled since the size of that last tile is given by the remaining area of the picture.

In another variant of this embodiment, the number of tiles in the picture is not signaled. Instead, the decoder continues decoding tile sizes until the decoder determines that all the necessary tile sizes have been decoded. When all necessary tile sizes have been decoded, the decoder stops decoding tile sizes and proceeds decoding other data from the bitstream. One way to determine whether all necessary tile sizes have been decoded is to determine whether all CTUs in the picture are in a tile for which the tile size has been decoded. Another way to determine whether all necessary tile sizes have been decoded is to determine whether the tiles corresponding to the decoded tile sizes jointly cover the entire picture.

In yet another variant of this embodiment, an optional codeword is signaled to convey the number of times a tile is being copied to the next tile position. For example, a first tile size is equal to 128×128. Then there can be one or more codewords in the bitstream that specifies whether that tile size:

1) is not copied to any other tile, which means that the next tile size is signaled explicitly using a width and height; or 2) is copied to the next tile; or 3) is copied to the next n tiles, where the number of times to copy is signaled.

Figure 16A:
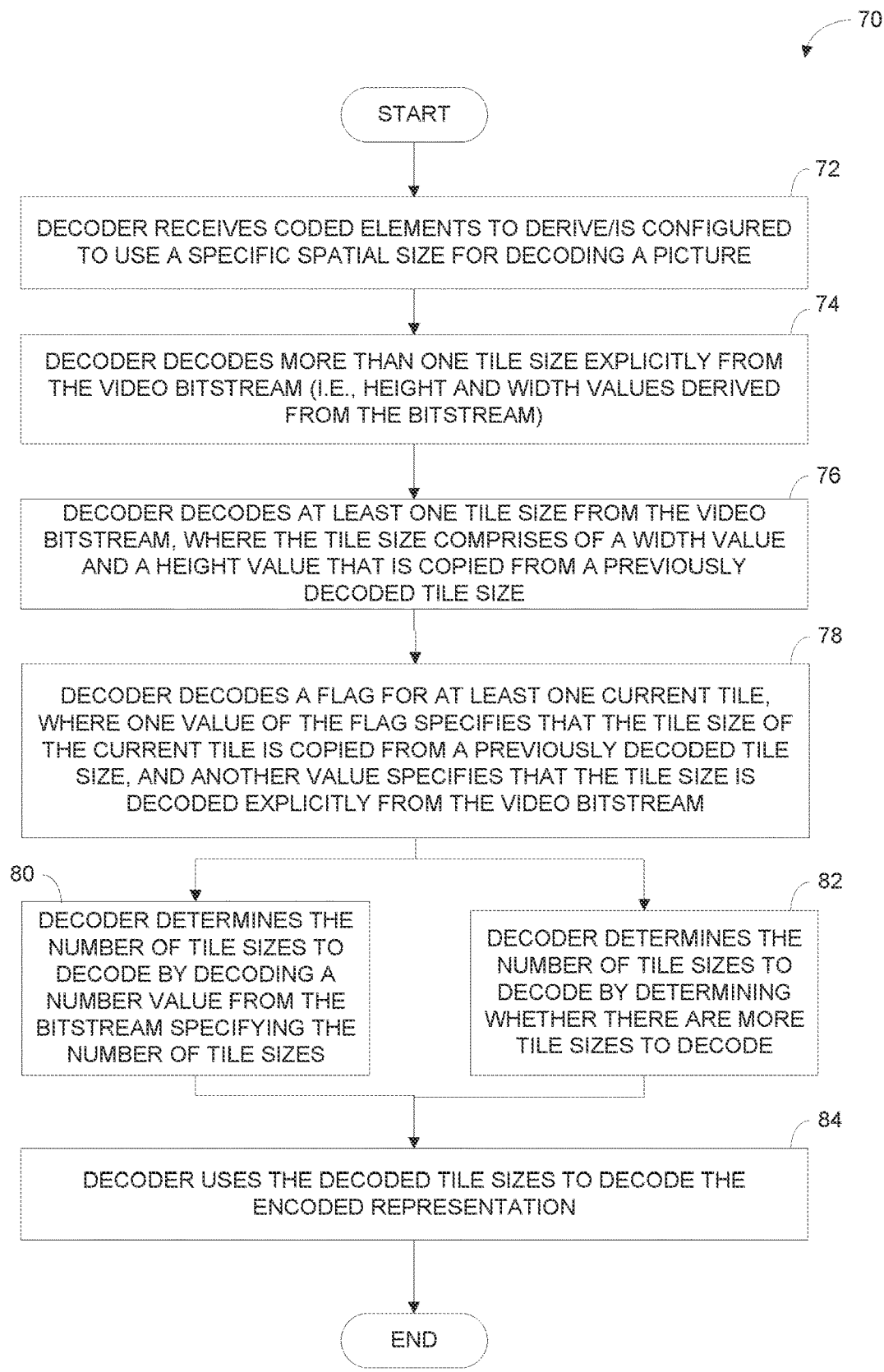
FIG. 16A illustrates a method implemented at a decoder for decoding an encoded representation of a picture of a video bitstream according to one embodiment of the present disclosure.

As seen in FIG. 16A, a decoder is configured to decode an encoded representation of a picture of a video bitstream using one or more of the following aspects.

Particularly, as seen in method 70, the decoder receives coded elements from which to derive a specific spatial size for decoding the picture (box 72). The spatial size is one of units and/or sub-tiles. For instance, the decoder derives a sub-tile width and a sub-tile height to use for decoding tile sizes, where the sub-tile width and height are conveyed as two integer numbers of a derived unit size. Alternatively, the decoder is configured to use a specific spatial unit size and or sub-tile size to decode the picture. The decoder decodes more than one tile size explicitly from the video bitstream (box 74). In these cases, the tile size comprises a width value that is derived from the bitstream as an integer number of the unit width or sub-tile width, as well as a height value that is derived from the bitstream as an integer number of the unit height or sub-tile height. In one embodiment, the decoder decodes at least one tile size from the video bitstream, wherein the tile size comprises a width value and a height value that is copied from a previously decoded tile size (box 76). In one embodiment, the decoder is configured to decode a flag for at least one current tile (box 78). In these cases, one value could indicate that the tile size of the current tile is copied from a previously decoded tile size, while another value indicates that the tile size should be explicitly decoded from information in the bitstream. In one embodiment, the decoder determines the number of tile sizes to decode by decoding a number value from the bitstream specifying the number of tile sizes (box 80). In one embodiment, the decoder determines the number of tile sizes to decode by determining whether there are additional tile sizes to decode (box 82). Particularly, in these cases, the decoder can determine whether all CTUs in the picture are in a tile for which a tile size has been decoded. Alternatively, the decoder can determine whether the tiles corresponding to the decoded tile sizes jointly cover the entire picture. Regardless of the particular manner in which the decoder decodes the tile sizes, the decoder configured according to this embodiment uses the decoded tile sizes to decode the encoded representation of the picture.

Figure 16B:
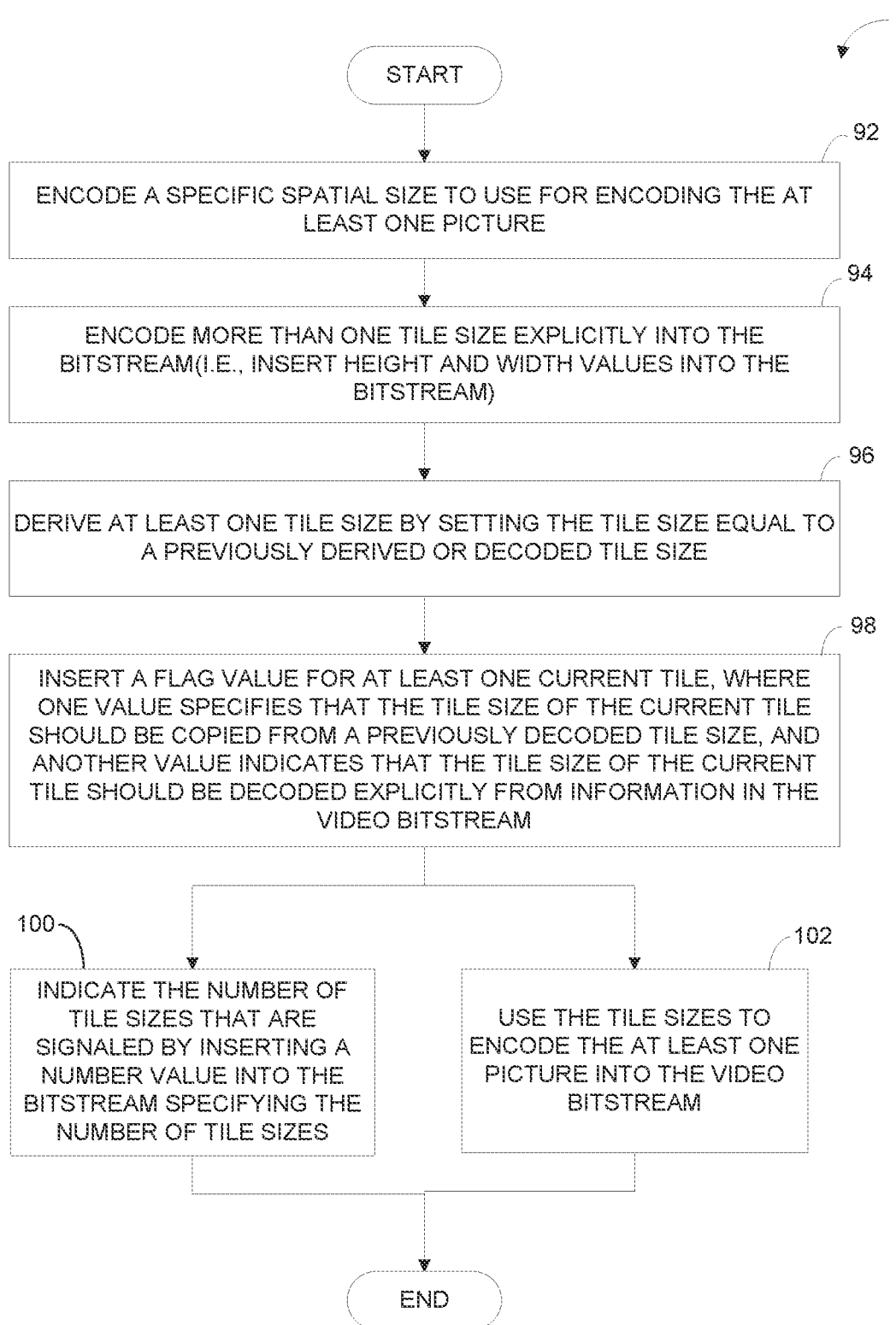
FIG. 16B illustrates a method implemented at an encoder for encoding a representation of the picture of a video bitstream according to one embodiment of the present disclosure.

As seen in FIG. 16B, an encoder is configured according to this embodiment to encode a representation of the picture of a video bitstream using one or more of the following aspects.

Particularly, as seen in method 90, the encoder can, in one embodiment, be configured to encode a specific spatial size to use for encoding the at least one picture (box 92). For instance, the spatial size is a spatial size of a unit or a sub-tile. In one or more embodiments, the encoder encodes a specific sub-tile width and/or a sub-tile height to use for encoding tile sizes by inserting one coded integer sub-tile width value and/or one coded integer sub-tile height value into the bitstream. The values are in terms of the spatial unit size. In one embodiment, the encoder can be configured to encode more than one tile size explicitly into the bitstream (box 94). In these cases, the encoder can be configured to encode each tile size by inserting one coded integer tile width value indicating the width of the units or sub-tiles, and one coded integer tile height value into the bitstream indicating the height of the units or subtiles. In one embodiment, the encoder can also be configured to derive at least one tile size by setting the tile size equal to a previously derived or decoded tile size (box 96). In one embodiment, the encoder can also be configured to insert a flag value for at least one current tile (box 98). In these embodiments, one value could be used to specify to the decoder that the tile size of the current tile should be copied from a previously decoded tile size, or the encoder could insert the tile size explicitly into the bitstream so that the decoder can derive the tile size explicitly. In one embodiment, the encoder can also be configured to indicate the number of tile sizes that are signaled by inserting a number value specifying the number of tile sizes into the bitstream. Regardless of the particular manner in which the encoder encodes the information, the encoder is configured to use the tile sizes to encode the at least one picture into the video bitstream.

Table 3 identifies an example syntax for use in this embodiment of the present disclosure. The syntax could be implemented on top of the currently existing HEVC video coding specification.

TABLE 3

Example syntax

| | Descriptor |
|---|---|
| pic_parameter_set_rbsp( ) { | |
| ... | |
|   tiles_enabled_flag | u(1) |
|   if( tiles_enabled_flag ) { | |
|     flexible_tiles_enabled_flag | u(1) |
|     if( flexible_tiles_enabled_flag ) { | |
|       number_of_tiles_in_picture_minus2 | ue(v) |
|       sub-tile_width_minus1 | ue(v) |
|       sub-tile_height_minus1 | ue(v) |
|       for ( i=0; i < number_of_tiles_in_picture_minus2+2 ; i++ ) { | |
|         if ( i > 0 ) | |
|           use_previous_tile_size_flag | u(1) |
|         if ( use_previous_tile_size_flag == 0 ) { | |
|           tile_width_minus1 [i] | ue(v) |
|           tile_height_minus1 [i] | ue(v) |
|         } | |
|       } | |
|     } | |
|   ... | |
| } | |

Example Semantics for the Syntax Elements in Table 3 tiles_enabled_flag equal to 1 specifies that there is more than one tile in each picture referring to the PPS. tiles_enabled_flag equal to 0 specifies that there is only one tile in each picture referring to the PPS. It is a requirement of bitstream conformance that the tiles_enabled_flag value shall be the same for all PPSs that are activated within a CVS.

flexible_tiles_enabled_flag equal to 1 specifies that flexible tiles are used to partition pictures referring to the PPS into tiles. flexible_tiles_enabled_flag equal to 0 specifies that flexible tiles are not used to partition pictures referring to the PPS into tiles. If flexible_tiles_enabled_flag is equal to 1, the value of the variable tile_id and the value of the two-dimentional array CTU_tile_assigment are specified as follows:

```
tile_id = 0
for( y= 0; y < PicHeightInCtbsY; y++ )
    for( x = 0; x < PicWidthInCtbsY; x++ )
        CTU_tile_assignment[ x ][ y ] = "no tile"
``` number_of_tiles_in_picture_minus2 plus 2 specifies the number of tiles in a picture. number_of_tiles_in_picture_minus2 shall be in the range of 0 to PicSizeInCtbsY−2, inclusive.

subtile_width_minus1 plus 1 specifies the width of the subtile unit in coding tree units. subtile_width_minus1 shall be in the range of 0 to PicWidthInCtbsY−1, inclusive subtile_height_minus1 plus 1 specifies the height of the subtile unit in coding tree units. subtile_height_minus1 shall be in the range of 0 to PicHeightInCtbsY−1, inclusive use_previous_tile_size_flag equal to 1 specifies that the size of the current tile is equal to the size of the previous tile. use_previous_tile_size_flag equal to 0 specifies that the size of the current tile is not equal to the size of the previous tile. When not present, the value of use_previous_tile_size_flag is inferred to be equal to 0.

When use_previous_tile_size_flag is equal to 1, the value of the i'th element of the arrays tile_height_minus1 and tile_width_minus1 are derived as follows:

tile_height_minus1[$i$]=tile_height_minus1[$i-1$]

tile_width_minus1[$i$]=tile_width_minus1[$i-1$]

tile_width_minus1[i] plus 1 specifies the width of the i-th tile in tile units.

tile_height_minus1[i] plus 1 specifies the height of the i-th tile in tile units.

The value of the variable tile_id and the value of the two-dimentional array CTU_tile_assigment are derived as follows:

```
for( tile_coordinate_y = 0; tile_coordinate_y < PicHeightInCtbsY;
tile_coordinate_y++ )
    for( tile_coordinate_x = 0; tile_coordinate_x < PicWidthInCtbsY;
    tile_coordinate_x++ )
        if( CTU_tile_assignment[ tile_coordinate_x ][ tile_coordinate_y ]
        == "no tile")
            break
    for( ctu_y = 0 ; ctu_y < ( tile_height_minus1[ i ] + 1 ) * (
    subtile_height_minus1 + 1 ) &&
        (tile_coordinate_y + ctu_y ) < PicHeightInCtbsY ; ctu_y++ )
        for( ctu_x = 0 ; ctu_x < ( tile_width_minus1[ i ] + 1 ) * (
        subtile_width_minus1 + 1 ) &&
            (tile_coordinate_x + ctu_x ) < PicWidthInCtbsY ; ctu_x++ )
            CTU_tile_assignment[ tile_coordinate_x + ctu_x ][
            tile_coordinate_y + ctu_y ] =
                tile_id
    tile_id++
```

It is a requirement of bitstream conformance that all of the following conditions be true prior to the assignment of CTU_tile_assignment[tile_coordinate_x+ctu_y][tile_coordinate_y+y] to the value tile_id:
1. The value of tile_coordinate_y+ctu_y shall be less than PicHeightInCtbsY;
2. The value of tile_coordinate_x+ctu_x shall be less than PicWidthInCtbsY; and
3. The value of CTU_tile_assignment[tile_coordinate_x+ctu_x][tile_coordinate_y+ctu_y] shall be equal to "no tile"

In one embodiment, conditions 1 and 2 above are optional.

Further, the derivation of the variable tile_id and the value of the two-dimensional array CTU_tile_assigment as specified in the semantics of tile_height_minus1[i] are executed for each value of i. This means that derivation is performed after each loop of the variable i, even in cases:
1. where the use_previous_tile_size_flag is not present;
2. when the use_previous_tile_size_flag is equal to 0; and
3. when use_previous_tile_size_flag is equal to 1.

Similarly, the three bitstream conformance conditions shall be true for any assignment done in any loop.

In one embodiment, it is required that the break statement is reached for each loop; for each value of i that is.

In one embodiment, it is required that after all assignments of CTU_tile_assigment, CTU_tile_assignment[x][y] shall not be equal to "no tile" for any x ranging from 0 to PicWidthInCtbsY−1 inclusive and any y ranging from 0 to PicHeightInCtbsY−1 inclusive.

Fourth Embodiment—Status Flags

In a fourth embodiment, the present disclosure provides a method for determining whether a given unit, e.g., unit U, or sub-tile, e.g. sub-tile SS, does or does not begin a new tile. For instance, the size of the sub-tile and or units is defined and then scanned in a predefined order (e.g., raster scan order) for encoding or decoding.

For example, in one embodiment, the sub-tile is defined as being the same size as a unit (e.g., a CTU) or a rectangular set of units, and then scanned in raster scan order. In raster scanning, scanning is conducted horizontally left-to-right at a steady rate, then blanks and rapidly moves back to the left, where it turns back on and sweeps out the next line such that the vertical position steadily increases. Of course one of ordinary skill in the art will appreciate that when raster scan order is described as an example in this embodiment and other embodiments, other predefined scanning orders could be used (e.g., scanning horizontally right-to-left or scanning initially vertically).

Regardless of the particular scanning order, in one or more embodiments for each sub-tile, there is a sequence of flags in the order, each one specifying whether a given sub-tile starts a new tile or not. In one or more embodiments, no flag is sent for a given sub-tile when another sub-tile positioned above and to the left belongs to the same tile. In such cases, it can be inferred that both the given sub-tile and the other sub-tile are positioned in the same tile. One or more embodiments herein are described with reference to a sub-tile. However, one of ordinary skill in the art will appreciate that the teachings are applicable to specify whether a given sub-tile or unit starts a new tile or not (e.g., in the case where a sub-tile is a unit or sub-tiles are not employed for a given picture). Similarly, one of ordinary skill in the art will appreciate that one or more embodiments specified with respect to a unit are applicable to scanning sub-tiles in a predefined order.

FIG. 37 graphically illustrates an example embodiment of status flags to show whether the positioning of a sub-tile being scanned indicates that the sub-tile starts a new tile, and the values (if any) to set the flag indicating whether the unit starts a new tile. A similar status flag system can be used to show whether a given unit starts a new tile or not.

For all cases shown in FIG. 37, except for the ambiguous case in the last row (i.e., whether the sub-tile being scanned is in tile B, tile C, or starts a new tile), one flag and the known status of other previously scanned sub-tiles (i.e., the sub-tiles positioned to the left and top of the sub-tile being scanned, if they exist) is sufficient with which to specify the correct status of the sub-tile currently being scanned. To remove the ambiguity in the case shown in the last row of FIG. 37, the present disclosure introduces a disambiguator bit. For example, in one embodiment, all the disambiguator bits in the defined scanning order are placed into a disambiguator array. The array is then explicitly signaled to the decoder.

Table 5 provides a first example syntax for use with this embodiment. The syntax shown in Table 5 could be implemented on top of the currently existing HEVC video coding specification. Additionally, for illustrative purposes only, the size of a sub-tile is equal to the size of the CTU. Of course one of ordinary skill in the art will appreciate that a sub-tile could be several units or CTUs or the syntax could apply to a unit.

TABLE 5

| First example syntax | |
|---|---|
| | Descriptor |
| pic_parameter_set_rbsp( ) { | |
| ... | |
| tiles_enabled_flag | u(1) |
| if( tiles_enabled_flag ) { | |
|   tiles_status_flag_enabled | u(1) |
|   if( tiles_status_flag_enabled ) { | |
|     while( read_more_tiles( ) ) { | |
|       if (exist(tileIdAboveLeft) && exist(tileIdAbove) | |
|       && exist(tileIdLeft) && | |
|         !( tileIdAboveLeft == tileIdAbove == | |
|         tileIdLeft ) ) { | |
|         ctu_status[i] | u(1) |
|       if ( exist( tileIdAboveLeft ) && exist( | |
|       tileIdAbove ) && | |
|         exist( tileIdLeft ) ) && | |
|         ( tileIdAboveLeft != tileIdAbove != | |
|         tileIdLeft ) ) { | |
|         ctu_status_disambiguator_flag[i] | u(1) |
|       } | |
|       if ( ctu_status[i] ) | |
|         set_new_id( ) | |
|       } else { | |
|         copy_id ( ) | |
|       } else if ( !exist(tileIdAboveLeft) && | |
|         !exist(tileIdAbove) && | |
|         !exist(tileIdLeft) ) { | |
|         set_new_id( ) | |
|       } else if ( tileIdAboveLeft == tileIdAbove == | |
|       tileIdLeft ) { | |
|         copy_id( ) | |
|       } | |
|       assign_ctu_to_tile( ) | |
|     } | |
|   } | |
| } | |
| ... | |

Semantics for the Syntax Elements in Table 5 tiles_enabled_flag: This flag is set to 1 to specify that there is more than one tile in each picture referring to the PPS. This flag is set to 0 to specify that there is only one tile in each picture referring to the PPS.

tiles_status_flag_enabled This flag is set to 1 to specify that the tiling structure is signalled using the status flag method. This flag is set to 0 to specify that the tiling structure is not signalled using the tiles status flag method.

ctu_status[i] This is set to 0 to specify that the tile ID for the current CTU is copied from an available neighboring tile using copy_id ( ) This is set to 1 to specify that a new tile ID is set for the current CTU using set_new_id( ).

As seen in FIG. 37, there are some instances where the CTU statuses remain undetermined (e.g., those in rows 2, 3, 5, 6, and 8 of FIG. 37). In these cases, the status can be determined as specified by the signaling details seen in FIG. 38.

ctu_status_disambiguator_flag: This flag comprises the dismabiguator bit that is used together with ctu_status to determine the status of the CTU when needed. The length of this bitstream equals the number of disambiguitor bits in the ctu_status. The ctu_status_disambiguator_flag is set if and only if the value of the ctu_status_flag is 0. In these cases, when the disambiguator_bit=0, the ctu_status should be copied from the unit on the left. When the disambiguator_bit=1, the ctu_status should be copied from the unit above.

exist ( ) This function indicates whether a tile ID exists for a neighboring block with a tile ID (tileIdAboveLeft, tileId-Above, or tileIdLeft).

set_new_id ( ) This function sets a new tile ID for the current CTU.

copy_id ( ) This function copies the tile ID from a neighboring block according to the details provided in FIG. 37.

assign_ctu_to_tile( ) This function assigns a given CTU to an explicit tile ID using the ctu_status and ctu_status_disambiguator_flags. It also assigns the given CTU the status of a neighbor CTU positioned on the immediate left of the given CTU, immediately above the given CTU, and immediately above and to the left (i.e., diagonally) of the given CTU, if they exist.

read_more_tiles( ) This function is read in a predefined scanning order, such as raster scan order, as follows:

IF there is at least one CTU in the picture that is not assigned to a tile, set the return value of read_more_tiles( ) to TRUE;

ELSE set the return value of read_more_tiles( ) to FALSE

In one aspect of this embodiment, the tile ID is signaled when a new tile is signaled. The tile ID is a new tile ID or a previously defined tile ID. Signaling the tile ID in this manner allows for a more flexible tile structure with non-rectangular or discontinuous tiles.

Bit Count

FIGS. 17A-17C illustrate, according to one embodiment, the ctu_status bits (FIG. 17B) for the tile partition (FIG. 17A) of the picture seen in FIG. 14. In this embodiment, cells that are empty indicate that no bit for that CTU is signaled in ctu_status. The "?" indicator signifies that a disambiguator bit is needed. FIG. 17C illustrates the corresponding ctu_status disamboguator bits.

Table 7 provides a second example syntax for use with this embodiment. The syntax shown in Table 7 would replace the first example syntax seen in Table 5 and could be implemented on top of the currently existing HEVC video coding specification. Additionally, for illustrative purposes only, the size of a unit is equal to the size of the CTU.

TABLE 7

Second Example Syntax

| | Descriptor |
|---|---|
| pic_parameter_set_rbsp( ) { | |
| ... | |
|   tiles_enabled_flag | u(1) |
|   if( tiles_enabled_flag ) { | |
|     tile_id = 0 | |
|     for( y = 0 ; y < PicHeightInCtbsY ; y++ ) { | |
|      for( x = 0 ; x < PicWidthInCtbsY ; x++ ) { | |
|       if ( y + x == 0 ) { | |
|        CTU_tile_assignment[ x ][ y ] = tile_id | |
|        tile_id++ | |
|       } else if( y == 0 ) { | |
|        previous_tile = CTU_tile_assignment[ x − 1 ][ y ] | |
|        tile_flag | u(1) |
|       } else if( x == 0 ) { | |
|        previous_tile = CTU_tile_assignment[ x ][ y − 1 ] | |
|        tile_flag | u(1) |
|       } else if( CTU_tile_assignment[ x ][ y − 1 ] == CTU_tile_assignment[ x − 1 ][ y ] && CTU_tile_assignment[ x ][ y − 1 ] == CTU_tile_assignment[ x − 1 ][ y−1 ] ) { | |
|        CTU_tile_assignment[ x ][ y ] = CTU_tile_assignment[ x ][ y − 1 ] | |
|       } else if( CTU_tile_assignment[ x ][ y − 1 ] == CTU_tile_assignment[ x − 1 ][ y−1 ] ) { | |
|        previous_tile = CTU_tile_assignment[ x − 1 ][ y ] | |
|        tile_flag | u(1) |
|       } else if( CTU_tile_assignment[ x − 1 ][ y ] == CTU_tile_assignment[ x − 1 ][ y−1 ] ) { | |
|        previous_tile = CTU_tile_assignment[ x ][ y − 1 ] | |
|        tile_flag | u(1) |
|       } else { | |
|        tile_flag1 | u(1) |
|        if( !tile_flag1 ) | |
|         tile_flag2 | u(1) |
|       } | |
|      } | |
|     } | |
|   } | |
| } | |
| ... | |

Semantics for the Syntax Elements in Table 7 tiles_enabled_flag: This flag is set to 1 to indicate that multiple tiles in each picture refer to the PPS. This flag is set to 0 to indicate that only a single tile in each picture refers to the PPS.

tile_flag: This flag indicates whether the tile ID of a current CTU is set equal to the tile ID of a neighboring CTU or starts a new tile.

When tile_flag is equal to 0, the value of CTU_tile_assignment[x][y] is specified as follows:

CTU_tile_assignment[x][y]=previous_tile;

When tile_flag is equal to 1, the value of CTU_tile_assignment[x][y] and tile_id are specified as follows:

CTU_tile_assignment[x][y]=tile_id;

tile_id=tile_id+1;

tile_flag1: This flag indicates whether the tile ID of a current CTU is set equal to the tile ID of a neighboring CTU or starts a new tile.

When tile_flag1 is set to 1, the value of CTU_tile_assignment[x][y] and tile_id are specified as follows:

CTU_tile_assignment[x][y]=tile_id;

tile_id=tile_id+1;

tile_flag2: This flag indicates whether the tile ID of a current CTU is set to equal the tile ID of the CTU immediately above the current CTU, or immediately to the left of the current CTU.

When tile_flag2 is set to 0, the value of CTU_tile_assignment[x][y] is set to the value of the CTU to the left of the current CTU as follows:

CTU_tile_assignment[x][y]=CTU_tile_assignment[x][y−1];

When tile flag2 is set to 1, the value of CTU_tile_assignment[x][y] is set to the value of the CTU immediately above the current CTU as follows:

CTU_tile_assignment[x][y]=CTU_tile_assignment[x−1][y];

Fifth Embodiment—Copy Size Tile Mode

In a fourth embodiment, the present disclosure provides a method for scanning the tiles similar to that provided by the first embodiment above. However, this fifth embodiment includes one or more of the following additional features. In particular, this embodiment also allows:
1. The use of traditional tiles in a "traditional tile mode" and the use of flexible tiles in a "flexible tile mode." The determination of mode to operate in is signaled, for example, using a flag, such as a flexible_tiles_enabled_flag; and/or
2. Sub-tiles can be used. The granularity of the sub-tiles can be signaled explicitly. Another words granularity is used herein to specify a size of the sub-tile. For instance, the size of a sub-tile is specified in an x and y coordinate system or with respect to a unit size. The granularity in one or more embodiments is explicitly signaled. Alternatively, it could be predefined.
3. A particular size specification for a tile. For example, this embodiment cold specify using the size of a latest tile for a current tile, or the size of a tile to the immediate the left or above the current tile. The specified size is applied to the current tile or to all remaining tiles, for example, by signaling a mode value.

Figure 18A:
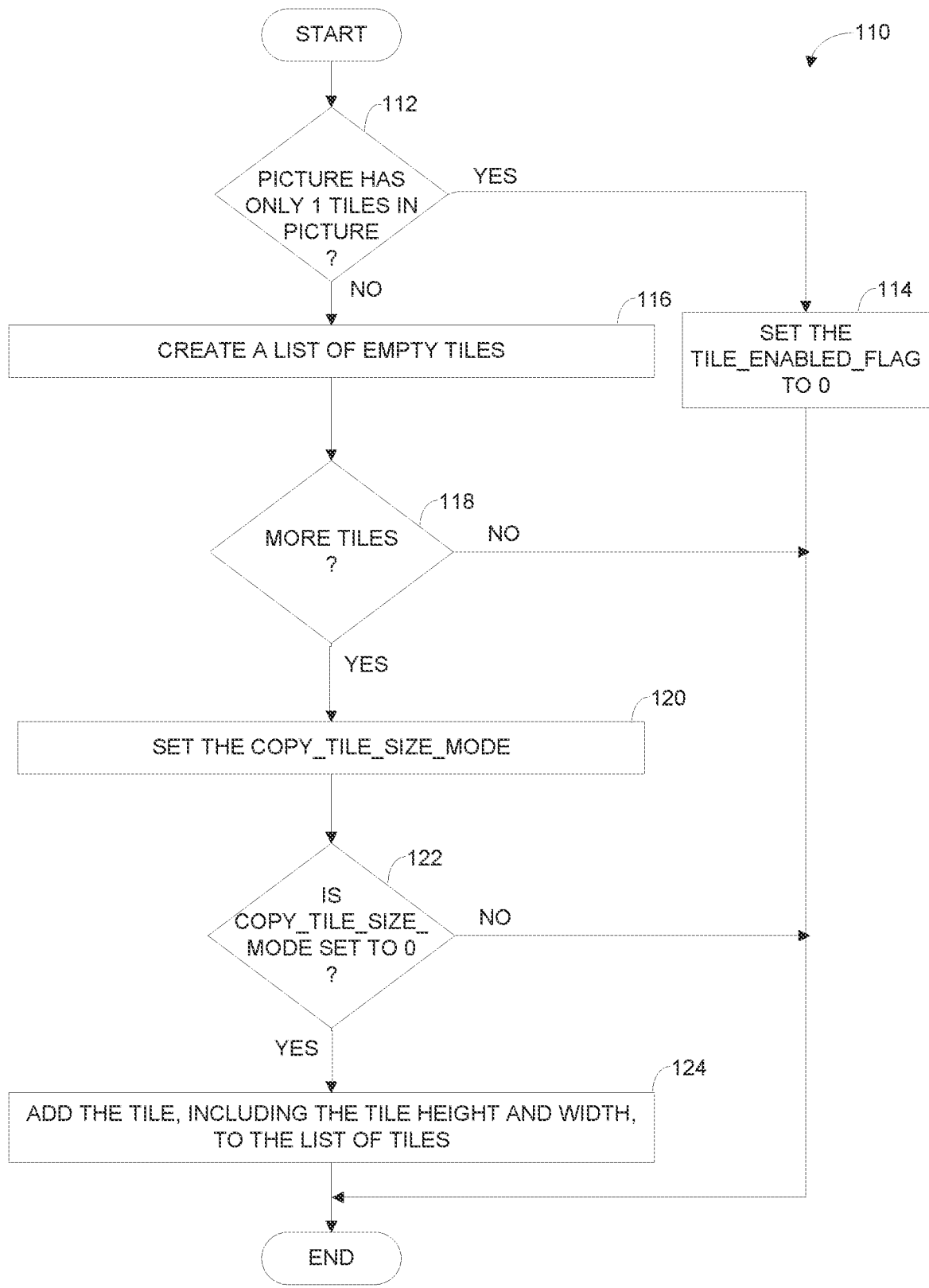
FIG. 18A is a flow diagram illustrating a method implemented at an encoder for constructing and signaling the tiles according to one embodiment of the present disclosure.

FIG. 18A is a flow diagram illustrating a method 110 for constructing and signaling the tiles according to this embodiment. The method 110 is implemented by an encoder and beings with the encoder determining whether a picture has only one tile (box 112). If so, the encoder sets the tile_enabled_flag equal to 0 (box 114) before ending method 110. However, if the encoder determines that the picture has a plurality of tiles, the encoder creates an empty list of tiles (box 116). Then, while tiles remain and following a predefined scan order (box 118), the encoder sets the copy_tile_size_mode (box 120). If the copy_tile_size_mode is set to 0 (box 122), the encoder adds the tile, including the tile height and width, to the list of tiles (box 124). The process then ends. Optionally the partition structure employs sub-tiles, which in one or more embodiments is explicitly indicated as for example in the method 110 of FIG. 18A. If sub-tiles are used, a flag can be used (e.g., set to 1) to signal the use of sub-tiles and the granularity can be signaled as described herein. Otherwise a flag can be set to 0 and the granularity of a unit (e.g., a CTU) is used instead. The sub-tiles indication and granularity can be signaled before or after the signaling of setting the tile_enabled_flag.

Figure 18B:
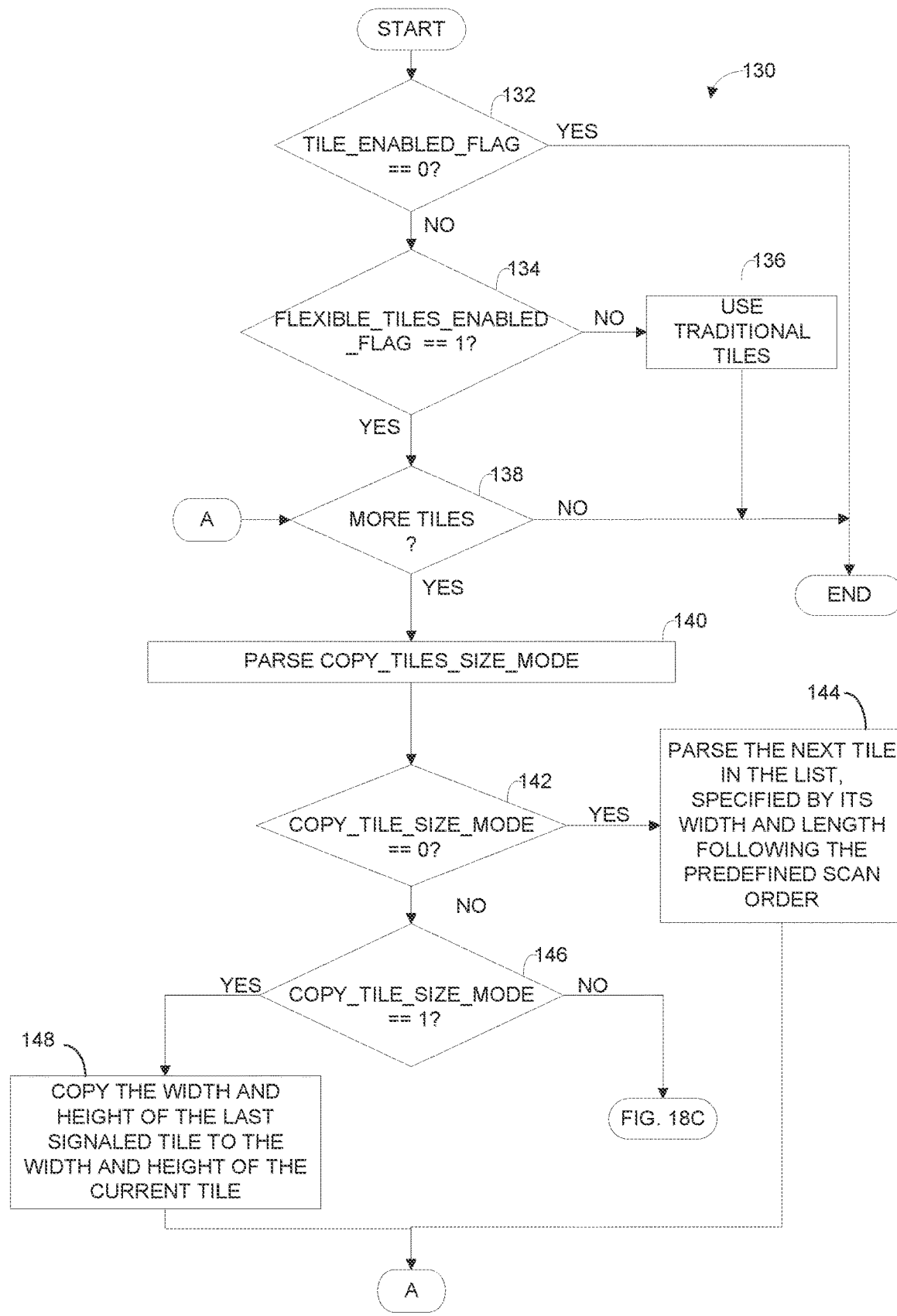
FIG. 18B illustrates a method implemented at a decoder for parsing and constructing the tiles sent by the encoder according to one embodiment of the present disclosure.

Regarding the decoder, it parses and constructs the tiles sent by the encoder. In this embodiment, the decoder perform these functions according to the method 130 illustrated in FIGS. 18B-18C. As seen in FIG. 18B, the decoder determines whether the tile_enabled_flag is set to 0 (box 132). If so, the decoder will know that the picture comprises only a single tile, and therefore, method 130 ends. Otherwise, the decoder determines whether the flexible_tiles_enabled_flag was set to 1 (box 134). If not, the decoder performs its decoding functions using traditional tiles (box 136). If the decoder determines that the flexible_tiles_enabled_flag was not set to 1, however, the decoder begins processing the tiles. Optionally, the decoder also determines whether sub-tiles are employed (as by an indication described above). If sub-tiles are employed, the decoder further determines the granularity of the sub-tiles. While tiles remain to be processed (box 138), the decoder parses the copy_tiles_size_mode value (box 140) and uses that value to determine the width and height of the current tile (i.e., the tile currently being processed) (e.g., with respect to the granularity of the sub-tile).

Particularly, if copy_tile_size_mode is equal to 0 (box 142), the decoder parses the next tile in the tile list that was created by the encoder, specified by its width and length following the predefined scan order (box 144).

If copy_tile_size_mode is equal to 1 (box 146), the decoder copies the width and height of the last signaled tile to the width and height of the current tile (box 148).

Figure 18C:
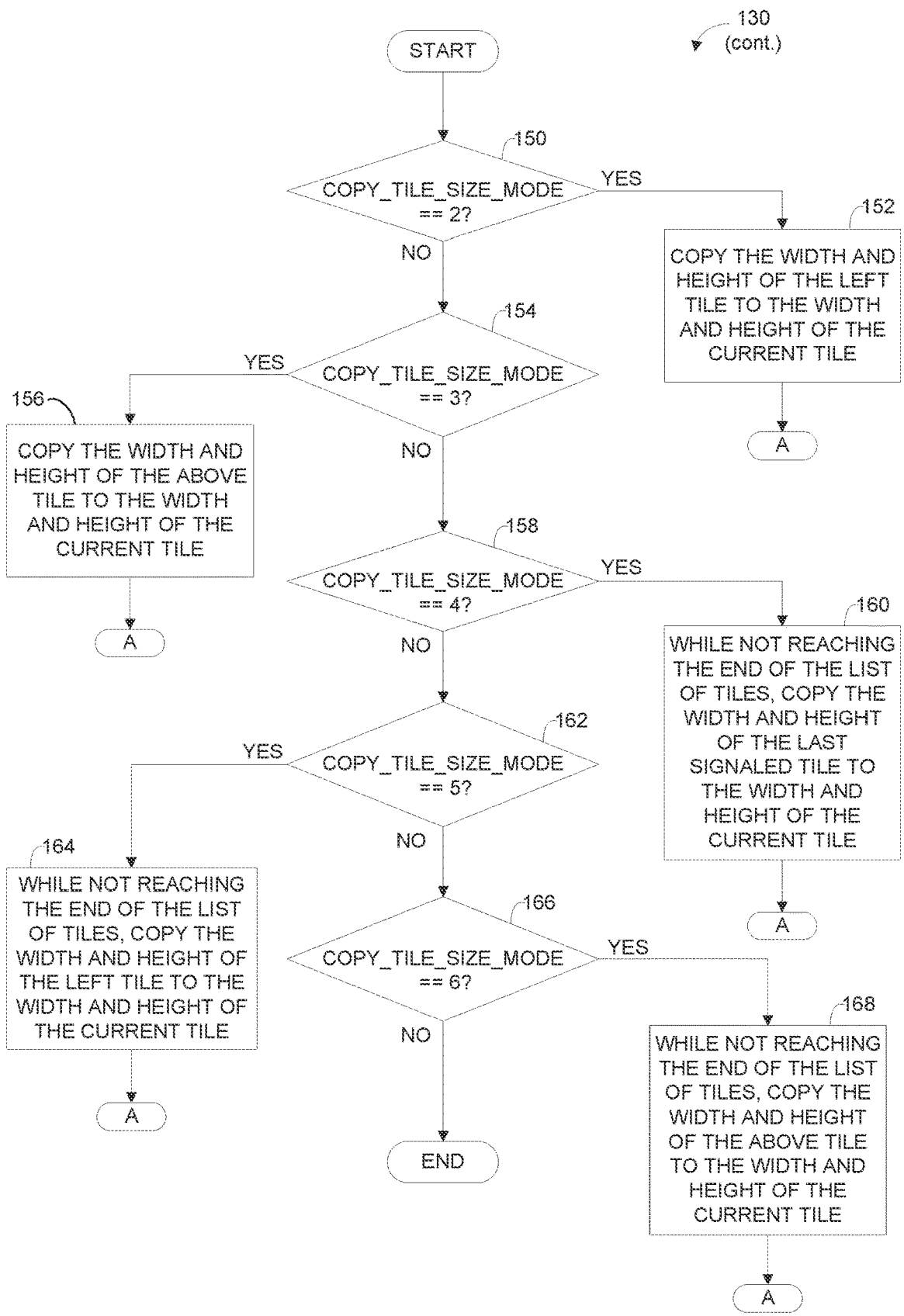
FIG. 18C illustrates a method of copying a tile size according to one embodiment of the present disclosure.

Turning to FIG. 18C, if copy_tile_size_mode is equal to 2 (box 150), the decoder copies the width and height of the left tile to the width and height of the current tile (box 152).

If copy_tile_size_mode is equal to 3 (box 154), the decoder copies the width and height of the tile immediately above the tile currently being processed to the width and height of the tile currently being processed (box 156).

If copy_tile_size mode is equal to 4, and while not at the end of the list of tiles (box 158), the decoder copies the width and height of the last signaled tile to the width and height of the current tile (box 160).

If copy_tile_size mode is equal to 5, and while not at the end of the list of tiles (box 162), the decoder copies the width and height of the tile to the immediate left of the current tile, and copies those values to the width and height of the current tile (box 164).

If copy_tile_size mode is equal to 6, and while not at the end of the list of tiles (box 166), the decoder copies the width and height of the tile immediately above the current tile to the width and height of the current tile (box 168).

Table 8 provides example syntax for use with this embodiment. The syntax shown in Table 8 could be implemented on top of the currently existing HEVC video coding specification.

TABLE 8

| Example Tile syntax | |
|---|---|
| | Descriptor |
| pic_parameter_set_rbsp( ) { | |
| ... | |
|   tiles_enabled_flag | u(1) |
| ... | |
|   if( tiles_enabled_flag ) { | |
|     flexible_tiles_enabled_flag | u(1) |
|     if( flexible_tiles_enabled_flag ) { | |
|       sub_tiles_flag | u(1) |
|       if( sub_tiles_flag ) { | |
|         tile_horizontal_granularity | ue(v) |
|         tile_vertical_granularity | ue(v) |
|       } | |
|       while( read_more_tiles( ) ) { | |
|         copy_tile_size_mode // | ue(v) |
|         can be done with flag+mode | |
|         if( copy_tile_size_mode == 0) { | |

TABLE 8-continued

Example Tile syntax

| | Descriptor |
|---|---|
|     tile_width_minus1 [i] | ue(v) |
|     tile_height_minus1 [i] | ue(v) |
|   } | |
|   if( copy_tile_size_mode == 1 ) { | |
|     copy_from_last_signaled_tile( ) | |
|   } | |
|   if( copy_tile_size_mode == 2 ) { | |
|     copy_from_left_tile( ) | |
|   } | |
|   if( copy_tile_size_mode == 3 ) { | |
|     copy_from_above_tile( ) | |
|   } | |
|   if( copy_tile_size_mode == 4 ) { | |
|     while( read_more_tiles( ) ) { | |
|       copy_from_last_signaled_tile( ) | |
|     } | |
|   } | |
|   if( copy_tile_size_mode == 5 ) { | |
|     while( read_more_tiles( ) ) { | |
|       copy_from_left_tile( ) | |
|     } | |
|   } | |
|   if( copy_tile_size_mode == 6 ) { | |
|     while( read_more_tiles( ) ) { | |
|       copy_from_above_tile( ) | |
|     } | |
|   } | |
| } else { | |
|   num_tile_columns_minus1 | ue(v) |
|   num_tile_rows_minus1 | ue(v) |
|   uniform_spacing_flag | u(1) |
|   if( !uniform_spacing_flag ) { | |
|     for( i = 0; i < num_tile_columns_minus1; i++ ) | |
|       column_width_minus1[ i ] | ue(v) |
|     for( i = 0; i < num_tile_rows_minus1; i++ ) | |
|       row_height_minus1[ i ] | ue(v) |
|   } | |
| } | |
| loop_filter_across_tiles_enabled_flag | u(1) |
| } | |
| ... | |

Semantics for the Syntax Elements in Table 8 tiles_enabled_flag: When this flag is 1, it indicates that there multiple tiles in each picture referring to the PPS. When this flag is 0, it indicates that each picture referring to the PPS has only a single tile.

flexible_tiles_enabled_flag: When this flag is 1, it indicates that flexible tiles are defined. When this flag is 0, it indicates that the tiles are defined without using flexible tiles syntax.

sub_tiles_flag: When this flag is set to 1, it indicates that sub-tiles are used.

tile_horizontal_granularity: This value specifies the tile horizontal granularity in units of coding tree units.

tile_vertical_granularity: This value specifies the tile vertical granularity in units of coding tree units.

copy_tile_size_mode: This value indicates how the decision about the current tile size should be made. Specifically:

A copy_tile_size mode equal to 0 indicates that the tile size is explicitly signaled.

A copy_tile_size mode equal to 1 indicates that the last signaled size is used

A copy_tile_size mode equal to 2 indicates that the tile size to the left of the top/left sample of the current tile is used A copy_tile_size mode equal to 3 indicates that the tile size above the top/left sample of the current tile is used A copy_tile_size mode equal to 4 indicates that the last signaled tile is used for all remaining tiles A copy_tile_size mode equal to 5 indicates that the tile to the left of the top/left sample of the current tile is used for all remaining tiles A copy_tile_size mode equal to 6 indicates that the tile above the top/left sample of the current tile is used for all remaining tiles.

copy_from_last_signaled_tile( ): This is a function that copies the width and length of the last signaled tile to the width and length of the current tile.

copy_from_above_tile( ): This is a function that copies the width and length of the tile above the current tile to the width and length of the current tile.

copy_from_left_tile ( ) This is a function that copies the width and length of the tile to the left of the current tile to the width and length of the current tile.

Sixth Embodiment—Tile IDs Using Subtiles

In this embodiment, the present disclosure provides a method for partitioning a picture into sub-tiles, and then scanning the sub-tiles in a pre-defined scanning order. During this process, a tile identifier (tile id) is specified for each sub-tile. The pre-defined order is in raster scan order as described above and the subtile size is equal to the size of one CTU unit or the sub-tile size is specified to be a different size (e.g., using explicit code words). Of course one of ordinary skill in the art will understand that a title identifier alternatively or additionally could also be specified for a unit.

Figure 19A:
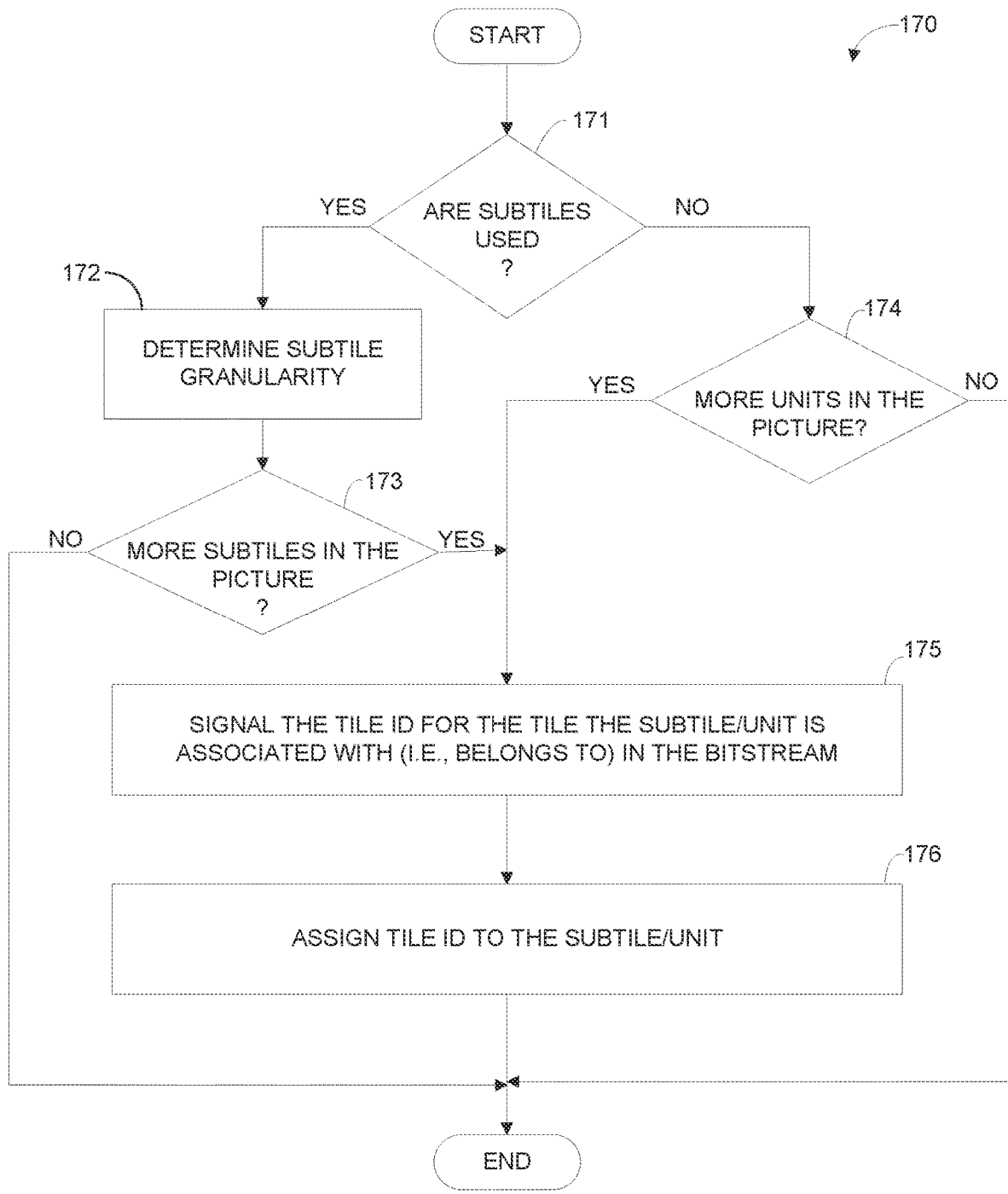
FIGS. 19A-19B are flow diagrams illustrating methods implemented by an encoder and a decoder, respectively, to construct and signal tiles according to one embodiment of the present disclosure.
Figure 19B:
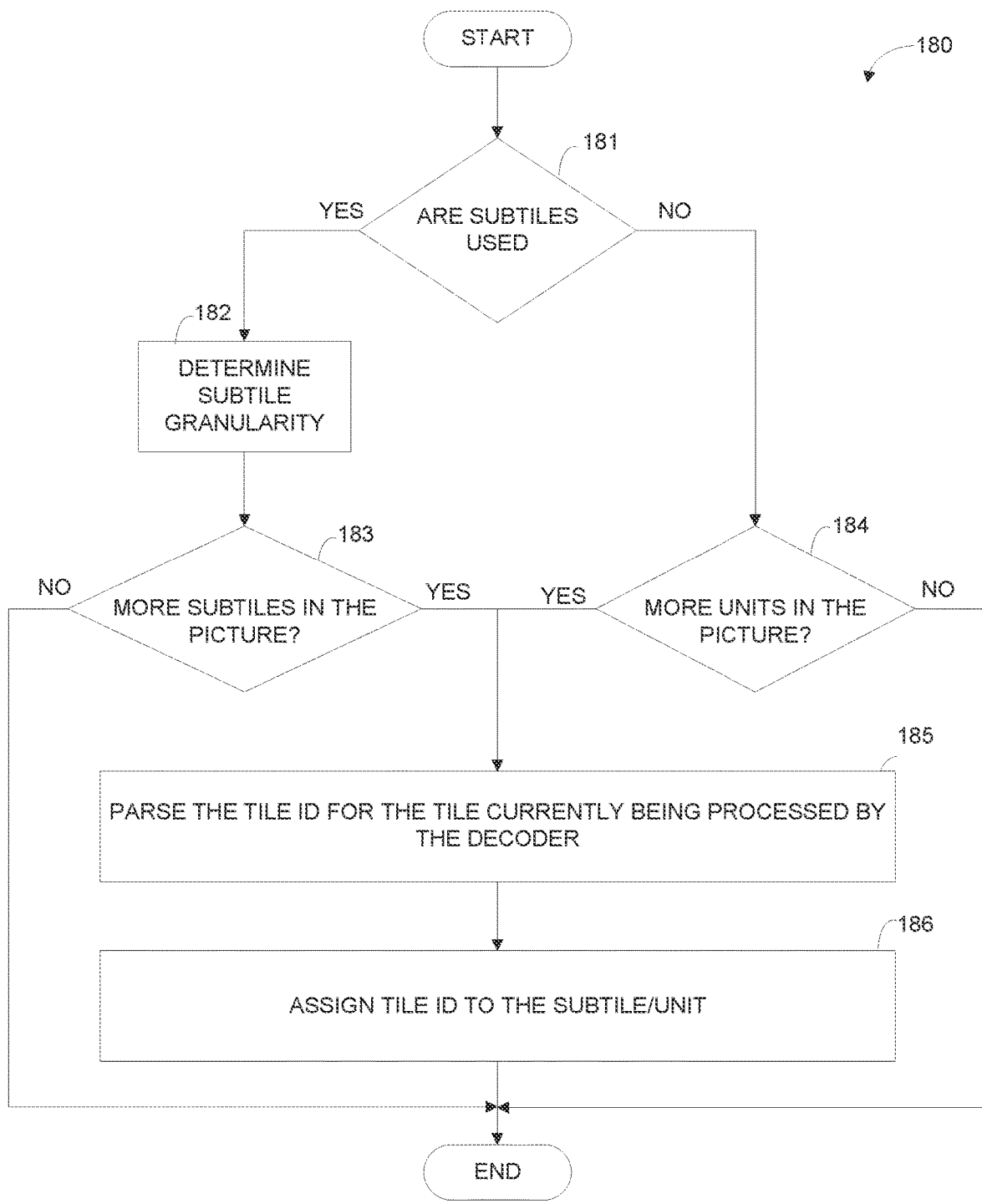

FIGS. 19A and 19B are flow diagrams illustrating methods implemented by an encoder and a decoder, respectively, to construct and signal tiles. Particularly, FIG. 19A provides a method 170 by which the encoder constructs and signals the tiles. As seen in method 170, the encoder can, in some embodiments, make an initial determination as to whether subtiles are used, or units are used (box 171). In one embodiment, the encoder makes this determination by checking whether a sub-tile size equals a CTU size, and signals the result in a flag in the bitstream 12. If subtiles are used, the granularity of the subtile can be determined (box 172) (e.g., signaling a sub-tile size that does not equal a CTU in the bitstream 12). Then, for each subtile in the picture (box 173), the encoder signals a tile ID for the subtile in the bitstream (box 175), and assigns the tile ID to the subtile (box 176).

If subtiles are not used, however (box 171), method 170 checks to see if there are more units U in picture 10 (box 175). If not, method 170 ends. As long as units remain in picture 10, however, method 170 assigns the tile IDs of tiles the units are associated with to the subtiles.

Method 180 seen in FIG. 19B is implemented at the decoder. Particularly, in some embodiments, the decoder may make an initial determination as to whether subtiles are used, or units are used (box 181). For instance, in one embodiment, the decoder makes the determination based on a flag included in bitstream 12 that indicates whether a sub-tile size equals a CTU size. If the flag indicates that subtiles are used, the decoder determines the granularity of the sub-tiles (box 182). For example, if the information in the bitstream 12 indicates that a sub-tile size does not equal a CTU size, the decoder parses a subtile size to determine the subtile granularity. Then, for each subtile in the picture (box 183), the encoder signals a tile ID for the subtile in the bitstream (box 185), and assigns the tile ID to the subtile (box 186).

If subtiles are not used, however (box 181), method 180 checks to see if there are more units U in picture 10 (box 184). If not, method 170 ends. However, as long as units remain in picture 10, method 180 calls for the encoder to assign the tile IDs of tiles the units are associated with to the subtiles.

An example syntax table and semantics description for embodiment 5 on top of the HEVC video coding specification may look as Table 9.

TABLE 9

Example Tile Syntax

|  | Descriptor |
|---|---|
| pic_parameter_set_rbsp( ) { | |
| ... | |
|   tiles_enabled_flag | u(1) |
|   if( tiles_enabled_flag ) { | |
|     sub_tile_size_equal_to_ctu_size_flag | u(1) |
|     if( !sub_tile_size_equal_to_ctu_size_flag ) { | |
|       sub_tile_width_minus1 | ue(v) |
|       sub_tile_height_minus1 | ue(v) |
|     } | |
|     for( x = 0; x < num_sub_tiles_horizontal; x ++ ) { | |
|       for( y = 0; y < num_ sub_tiles_vertical; y ++ ) { | |
|         tile_id[ y ][ x ] | ue(v) |
|       } | |
|     } | |
|   } | |
| } | |
| ... | |

Semantics for the Syntax Elements in Table 9 tiles_enabled_flag: When this flag is set to 1, it indicates that there are more than one tile in each picture referring to the PPS. When this flag is set to 0, it specifies that there is only one tile in each picture referring to the PPS.

sub_tile_size_equal_to_ctu_size_flag: When this flag is set to 1, it indicates that the height and width of the sub tiles are both equal to the height and width of the CTUs. sub_tile_size_equal_to_ctu_size_flag equal to 0 specifies that the height and width of the sub tiles are not both equal to the height and width of the CTUs.

When sub_tile_size_equal_to_ctu_size_flag is equal to 1, the values of num_sub_tiles_horizontal, num_sub_tiles_vertical, sub_tile_width_minus1, and sub_tile_height_minus1 are specified as follows:

num_sub_tiles_horizontal=PicWidthInCtbsY num_sub_tiles_vertical=PicHeightInCtbsY sub_tile_width_minus1=0 sub_tile_height_minus1=0 sub_tile_width_minus1 plus 1: This value specifies the sub-tile width in units of coding tree units. The variable num_sub_tiles_horizontal is set to PicWidthInCtbsY/(sub_tile_width_minus1+1).

sub_tile_height_minus1 plus 1: This value specifies the sub-tile height in units of coding tree units. The variable num_sub_tiles_vertical is set to PicHeightInCtbsY/(sub_tile_height_minus1+1).

tile_id[y][x] specifies the tile ID of the sub-tile with coordinates y and x. The value of CTU_tile_assignment: The value of CTU_tile_assignment is specified for example as follows:

```
for( yy = 0 ; yy < sub_tile_height_minus1+1 ; yy++ )
  for( xx = 0 ; xx < sub_tile_width_minus1+1 ; xx++ )
    CTU_tile_assignment [ y * (sub_tile_height_minus1 + 1) + yy ][
      x *
        (sub_tile_width_minus1+1) + xx ] = tile_id[ y ][ x ]
```

In an alternative version of the embodiment sub_tile_size_equal_to_ctu_size_flag is not present in the syntax and the sub_tile_width_minus1 and sub_tile_height_minus1 are always set. In yet another alternative version of the embodiment none of sub_tile_size_equal_to_ctu_size_flag, sub_tile_width_minus1 and sub_tile_height_minus1 are present in the syntax and the height and width of the sub tiles are set to the height and width of the CTUs, i.e. sub_tile_width_minus1 is set to 0, sub_tile_height_minus1 is set to 0, num_sub_tiles horizontal is set to PicWidthInCtbsY and num_sub_tiles_vertical is set to PicHeightInCtbsY.

Seventh Embodiment Tile IDs Using Subtiles with Code Value for Unique Subtiles

Aspects of this embodiment can be applied to other embodiments described herein (e.g., the Fifth Embodiment) to indicate unique or independent subsegments.

First, a flag is set to determine whether flexible tiles are enabled, or whether a traditional tile structure, such as the current HEVC tile structure, is deployed.

Second, this embodiment defines a method for coding independent tiles using a fixed code value, such as code value equal to 0. A tile is defined to be independent if it has the same size as the sub-tile (e.g., a unit or CTU, or plurality of units or CTUs). This feature beneficially saves bits in cases where a given picture comprises a plurality of independent tiles.

Third, this embodiment defines a method that allows for the optional encoding of tile ids with fixed length coding. In such cases, a flag is used to signal whether fixed length coding of tile ID values is used, or whether variable length coding of tile ID values is used.

Those of ordinary skill in the art will appreciate that the present disclosure is not limited to these features and embodiments. Rather, it is possible to vary these features and how they are combined in various embodiments. Further, not all features need to be implemented. For example, using a flag to indicate flexible tiles and the method of coding independent tiles could be used together even though the capability to encode tile ids with fixed length coding is not available.

Table 10 provides example syntax for use with this embodiment. The syntax shown in Table 10 could be implemented on top of the currently existing HEVC video coding specification.

TABLE 10

Example Tile Syntax

| | Descriptor |
|---|---|
| pic_parameter_set_rbsp( ) { | |
| ... | |
|   tiles_enabled_flag | u(1) |
|   if( tiles_enabled_flag ) { | |
|     flexible_tiles_enabled_flag | u(1) |
|     if( flexible_tiles_enabled_flag ) { | |
|       sub-tile_width | ue(v) |
|       sub-tile_height | ue(v) |
|       use_zero_to_indicate_independent_tile_flag | u(1) |
|       use_fixed_length_code_for_tile_id_flag | u(1) |
|       if(use_fixed_length_code_for_tile_id_flag) | |
|         number_of_unique_tile_id | ue(v) |
|       for( i = 0; i < num_ctu_horizontal_minus1; i += sub-tile_horizontal_granularity ) { | |
|         for( j = 0; j < num_ctu_vertical_minus1; j += sub-tile_vertical_granularity ) { | |
|           if(use_fixed_length_code_for_tile_id_flag) | |
|             tile_id | u(v) |
|           else | |
|             tile_id | ue(v) |
|         } | |
|       } | |
|     } else { | |
|       num_tile_columns_minus1 | ue(v) |
|       num_tile_rows_minus1 | ue(v) |
|       uniform_spacing_flag | u(1) |
|       if( !uniform_spacing_flag ) { | |
|         for( i = 0; i < num_tile_columns_minus1; i++ ) | |
|           column_width_minus1[ i ] | ue(v) |
|         for( i = 0; i < num_tile_rows_minus1; i++ ) | |
|           row_height_minus1[ i ] | ue(v) |
|       } | |
|     } | |
|     loop_filter_across_tiles_enabled_flag | u(1) |
|   } | |
| ... | |

Semantics for the Syntax Elements in Table 10 tiles_enabled_flag: When this flag is set to 1, it indicates that there is more than one tile in each picture referring to the PPS. When this flag is set to 0, it indicates that there is only one tile in each picture referring to the PPS.

flexible_tiles_enabled_flag: When this flag is set to 1, it indicates that flexible tiles are defined. When this flag is set to 0, it indicates that tiles are defined without using flexible tiles syntax.

sub-tile_width: This value specifies the sub-tile width in units of coding tree units.

sub-tile_height: This value specifies the sub-tile height in units of coding tree units.

use_zero_to_indicate_independent_tile_flag: When this flag is set to 1, it indicates that independent tiles are coded with tile_id equal to 0. An independent tile is a tile with a tile width equal to sub-tile width (e.g., a CTU), and a tile height equal to subtile height (e.g., a CTU). When this flag is set to 0, it indicates that independent tiles are coded in the same way as dependent tiles.

use_fixed_length_code_for_tile_id_flag: When this flag is set to 1, it indicates that tile ids are encoded using fixed length coding. When this flag is set to 0, it indicates that tile ids are encoded using fixed length coding.

number_of_unique_tile_id: This is the value to use for the tile ID to indicate that a tile depends from all other tiles.

tile_id[i][j]: This value specifies the tile ID of the subtile (e.g., a CTU) with coordinates i and j.

Eighth Embodiment 7-Divide into Tiles Using Quad Tree Split Flags and Flexible Split Flags In an eighth embodiment of the present disclosure, the picture is divided into tiles using quad trees and/or flexible tile splitting. This process for dividing using quad trees similar to the HEVC process for splitting CUs.

For simplicity in explaining this embodiment, the sub-tile is set to the CTU size. However, those of ordinary skill in the art should readily appreciate that for other embodiments of the present disclosure, the sub-tile size in one or more embodiments is predefined or explicitly signaled in a bitstream (e.g., signaling a rectangular set of CTUs).

Figure 20:
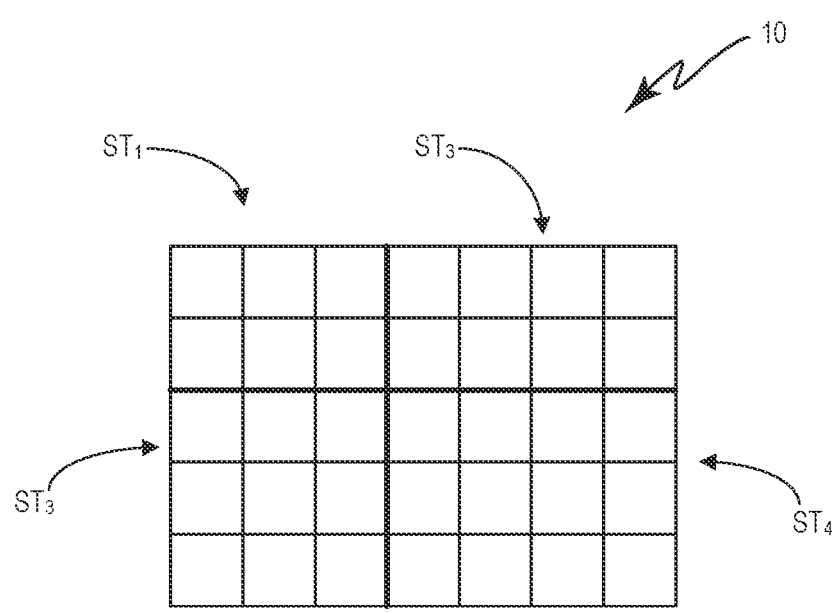
FIG. 20 illustrates the integer division of tiles according to one embodiment of the present disclosure.

Additionally, not all tiles have a width and height that are a factor of 2 in terms of CTUs. In one embodiment, the splits for the quad trees use integer division if the height and width are not a factor of 2. For example, as seen in FIG. 20, if the size of a given tile $T_A$ is 5×7 CTUs, a quad tree split would divide the tile into tiles $T_1$, $T_2$, $T_3$, $T_4$ of sizes 2×3, 2×4, 3×3 and 3×4, respectively. Similarly, a horizontal or vertical "midway" split also uses integer divisions.

A "midway" split is defined herein such that for a given tile A having length N CTUs, where N is a positive integer larger than 1, the resulting first split tile B has the length N/2 and the second split tile C has the length N/2+N %/02 where '/' indicates integer division and '%' denotes a modulo operator. The length of a tile could be either the width of the tile, the height of the tile or both.

For example, if a given tile has a size 1×5, that tile can be split, according to embodiments of the present disclosure, into two tiles—a first tile having a size of 1×2, and a second tile having a size of 1×3.

Figure 21A:
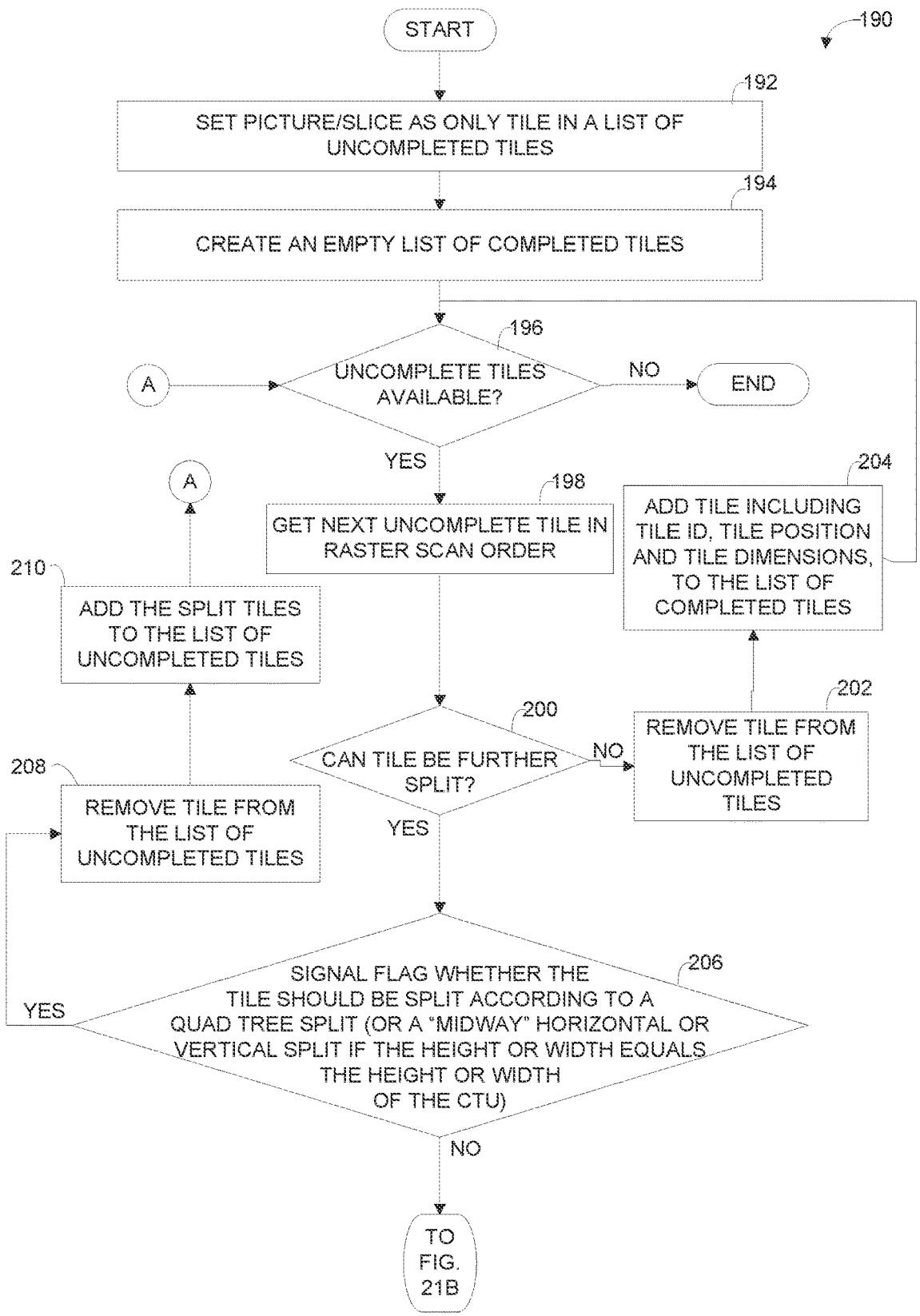
FIGS. 21A-21B illustrate a method implemented by an encoder to construct and signal tiles according to one embodiment of the present disclosure according to one embodiment of the present disclosure.
Figure 21B:
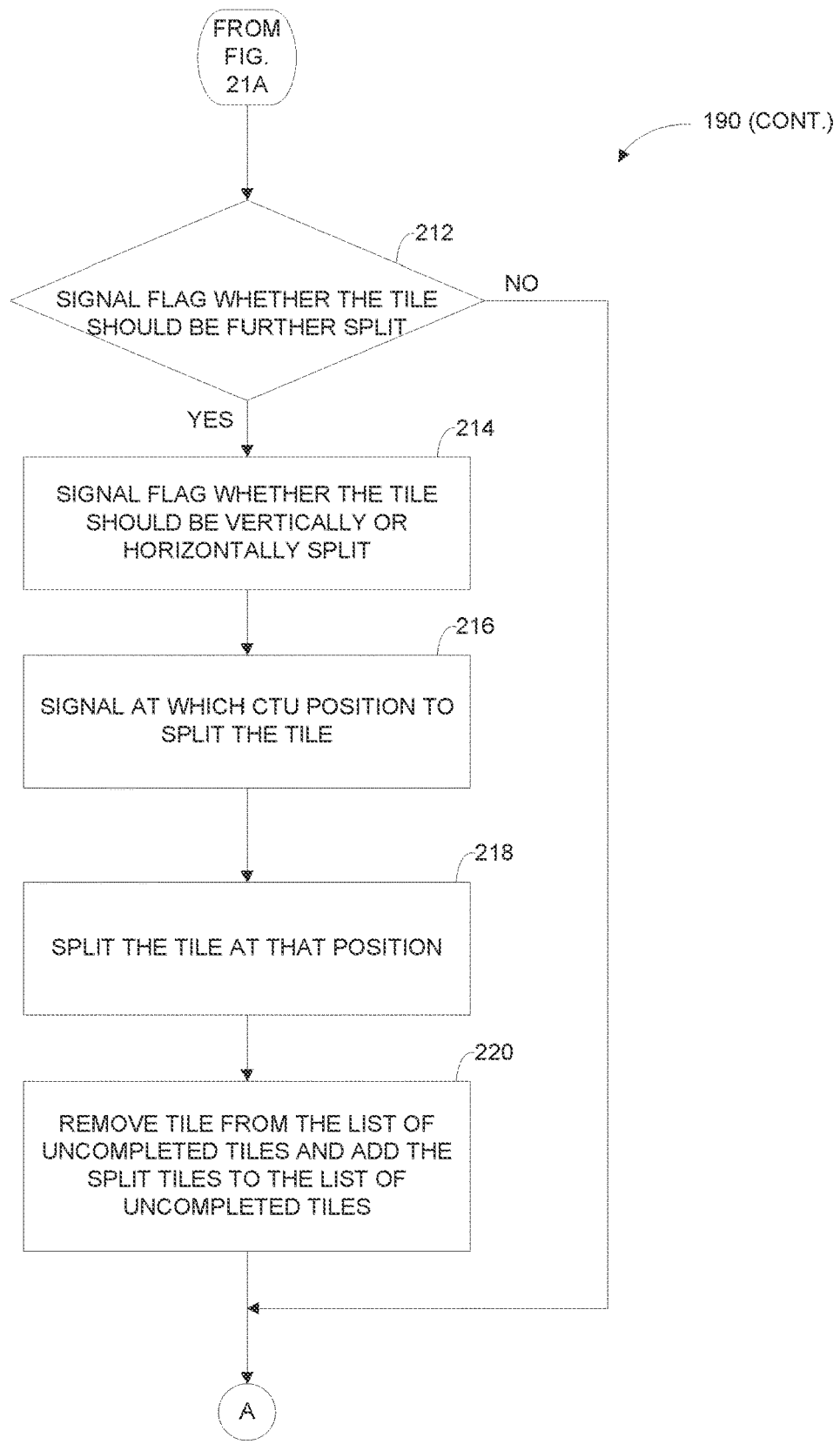

FIGS. 21A-21B illustrate a method 190 implemented by an encoder to construct and signal tiles. As seen in FIG. 21A, the encoder first sets a picture/slice as the only tile in a list of uncompleted tiles (box 192). The encoder then creates an empty list of completed tiles (box 194). The encoder then checks to determine whether any uncomplete tiles are available (box 196). If not, method 190 ends. Otherwise, the encoder obtains the next uncomplete tile in raster scan order (box 198). The encoder then determines whether the tile could be further split (box 200). If not, the encoder removes the tile from the list of uncompleted tiles (box 202), adds the tile including tile ID, tile position and tile dimensions to the list of completed tiles (box 204). The encoder then signals the flag indicating whether the tile should be split according to a quad tree split (or a "midway" horizontal or vertical split if the height or width equals the height or width of the CTU) (box 206). If the flag does indicate a split, the encoder removes the current tile from the list of uncompleted tiles (box 208), and adds the split tiles to the list of uncompleted tiles (box 210) before returning to determine whether any other uncompleted tiles are available (box 196).

As seen in FIG. 21B, if the flag does not indicate a split, the encoder signals a flag indicating whether the tile should be further split (box 212). If the tile is not to be split, the encoder again determines whether any other uncompleted tiles are available (box 196). If the tile should be further split, however, the encoder signals a flag indicating whether the tile should be split vertically or horizontally (box 214). Note, however, that the vertical/horizontal split indication is not necessary when the tile width equals the CTU width or the tile height equals the CTU height.

The encoder then signals the particular CTU position at which to split the tile (box 216) and splits the tile at that position (box 218). So split, the encoder removes the current tile from the list of uncompleted tiles, and adds the split tiles to the list of uncompleted tiles (box 220) before returning to determine whether any other uncompleted tiles are available (box 196).

Figure 21C:
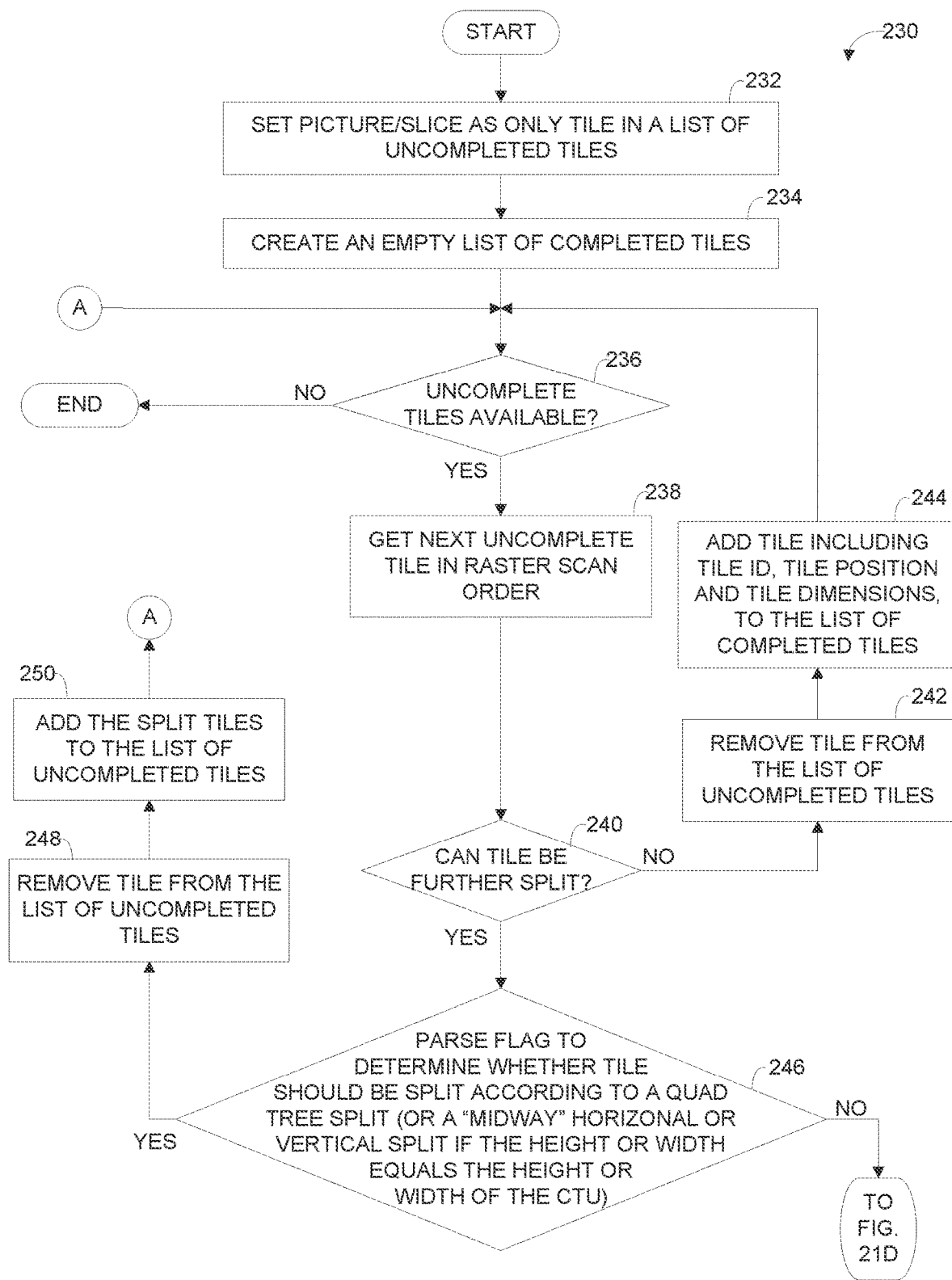
FIGS. 21C-21D illustrate a method implemented by a decoder to parse the tiles constructed and signaled by the encoder in FIGS. 21A-21B according to one embodiment of the present disclosure.
Figure 21D:
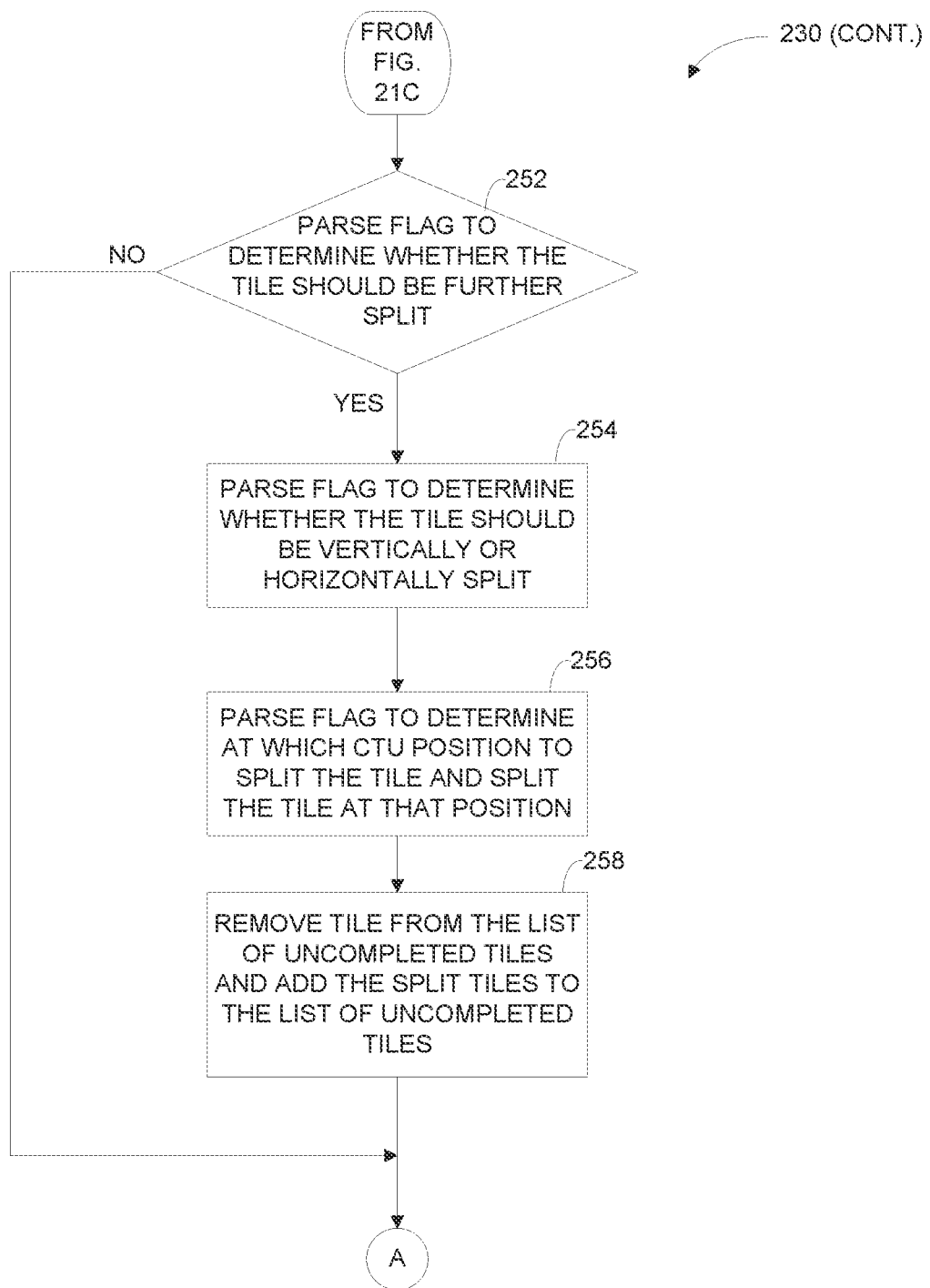

FIGS. 21C-21D illustrate a method 230 implemented by a decoder to parse the tiles constructed and signaled by the encoder in FIGS. 21A-21B. As seen in FIG. 21C, the decoder first sets a picture/slice as the only tile in a list of uncompleted tiles (box 232). The decoder then creates an empty list of completed tiles (box 234). The decoder then checks to determine whether any uncomplete tiles are available (box 236). If not, method 230 ends. Otherwise, the decoder obtains the next uncomplete tile in raster scan order (box 238). The decoder then determines whether the tile could be further split (box 240). If not, the decoder removes the tile from the list of uncompleted tiles (box 242), adds the tile including tile ID, tile position and tile dimensions to the list of completed tiles (box 244) and goes back to check whether any uncomplete tiles are available. If the tile could be further split, the decoder parses the flag indicating whether the tile should be split according to a quad tree split (or a "midway" horizontal or vertical split if the height or width equals the height or width of the CTU) (box 246). If the flag does indicate such a split, the decoder removes the current tile from the list of uncompleted tiles (box 248), and adds the split tiles to the list of uncompleted tiles (box 250) before returning to determine whether any other uncompleted tiles are available (box 236).

As seen in FIG. 21D, the decoder parses a flag signaled by the encoder to determine whether the tile should be further split (box 252). If the tile is not to be further split, the decoder returns to determine whether any other uncompleted tiles are available (box 236). If the tile should be further split, however, the decoder parses a flag indicating whether the tile should be split vertically or horizontally (box 254). Note, however, that parsing this flag to determine a vertical/horizontal split is not necessary when the tile width equals the CTU width or the tile height equals the CTU height.

The decoder then parses a code word to determine the particular CTU position at which to split the tile (box 256) and splits the tile at that position (box 258) before returning to determine whether any other uncompleted tiles are available (box 236).

Table 11 provides example syntax for use with this embodiment. The syntax shown in Table 11 could be implemented on top of the currently existing HEVC video coding specification.

TABLE 11

Example Tile Syntax

| | Descriptor |
|---|---|
| pic_parameter_set_rbsp( ) { | |
| ... | |
|   tiles_enabled_flag | u(1) |
|   if( tiles_enabled_flag ) { | |
|     while( read_next_tile( ) ) { | |
|       quadtree_split_flag | u(1) |
|       if( quadtree_split_flag ) { | |
|         if ( tile_width == ctu_width && tile_height > ctu_height ) { | |
|           split_tile_horizontally( ) | |
|         } else if ( tile_width > ctu_width && tile_height == ctu_height ) { | |
|           split_tile_vertically( ) | |
|         } else { | |
|           split_tile_using_quadtree( ) | |
|         } | |

TABLE 11-continued

Example Tile Syntax

| | Descriptor |
|---|---|
|       } else { | |
|         flexible_split_flag | u(1) |
|         if ( flexible_split_flag ) { | |
|           if (tile_width > ctu_width && tile_height > ctu_height) { | |
|             split_in_horizontal_direction_flag | u(1) |
|           } | |
|           split_position_minus1 | ue(v) |
|           split_tile_using_flexible_split( ) | |
|         } | |
|       } | |
|     } | |
|   } | |
| ... | |

Semantics for the Syntax Elements in Table 11 tiles_enabled_flag: This flag is set to 1 to indicate that there are more than one tile in each picture referring to the PPS. This flag is set to 0 to indicate that there is only one tile in each picture referring to the PPS.

quadtree_split_flag: This flag is set to 1 to indicate that the tile is split using quadtree if tile_width is larger than ctu_width and tile_height is larger than ctu_height, split horizontally if tile_width equals ctu_width and tile_height is larger than ctu_height or split vertically if tile_width is larger than ctu_width and tile_height equals ctu_height. This flag is set to 0 to indicate that the tile is not split using quadtree split. Note that bitstream conformance requires that the value of quadtree_split_flag shall be equal to 0 when tile_width is equal to ctu_width, and tile_height is equal to ctu_height.

flexible_split_flag: This flag is set to 1 to indicate that the tile is split using flexible tile split. This flag is set to 0 to indicate that the tile is no further split.

split_in_horizontal_direction_flag: This flag is set to 1 to indicate that the flexible split is made in horizontal direction. This flag is set to 0 to indicate that the flexible split is made in vertical direction. If the split_in_horizontal_direction_flag is not present, the flag value is inferred to be 1 if tile_width equals ctu_width and tile_height is larger than ctu_height, and inferred to be 0 if tile_width is larger than ctu_width, and tile_height equals ctu_height.

split_position_minus1: Specifies the split position for the flexible split in units of CTUs. split_position_minus1 should be in the range from 0 to tile_width minus 2 if split_in_horizontal_direction_flag is set to 1, or in the range from 0 to tile_height minus 2 if split_in_horizontal_direction_flag is equal to 0.

read_next_tile ( ): This function reads tiles recursively, and moves to the next tile in raster scan order if there is no more splits to be made for the current tile. No further split is required if either of the following cases apply.

1. The tile width equals the CTU width and the tile height equals the CTU height; and/or
2. The flexible_split_flag has been set to 0.

When it is determined that a tile is not to be split further, the tile including tile ID, its x and y positions, width and height, are added to a list of completed tiles.

split_tile_horizontally( ): This function splits the current tile horizontally into tileA and tileB at the position tile_height/2 in terms of CTU height where the division is an integer division.

split_tile_vertically( ): This function splits the current tile vertically into tileA and tileB at the position tile_width/2 in units of CTU width, where the division is an integer division.

split_tile_using_quadtree( ): This function splits the current tile horizontally and vertically into tileA, tileB, tileC, and tileD at the positions tile_height/2 in terms of CTU height and tile_width/2 in terms of CTU width where the divisions are integer division.

split_tile_using_flexible_split( ) This function splits the current tile horizontally if split_in_horizontal_direction equals 1, or vertically if split in horizontal_direction_flag equals 0 into tileA and tileB at position split_position_minus1 plus 1.

According to embodiments of the present disclosure, the same tile structure can be expressed with different variations of the syntax. That is, splits can be ordered differently but still achieve the same result.

Additionally, it is often possible to assign a split_position_minus1 value that is higher than the allowed value. For example, if the tile_width is 6, then 3 bits are needed to select any of the 5 split positions of the tile. Thus in this case, $2^3-5=3$ positions cannot be selected although it could be possible to select them without the constraint in the semantics. In one embodiment, where the number of positions is greater than 2, the additional positions are used to signal the next flags in the parsing. If at least 2 positions are available the next quadtree_split_flag, if available, is set to 0 if split_position_minus1+1=tile_width if split_in_ horizontal_direction equals 0 or split_position_minus1+ 1=tile_height if split_in_horizontal_direction equals 1. The next quadtree_split_flag is set to 1 if split_position_minus1+ 1=tile_width+1 if split_in_horizontal_direction equals 0 or split_position_minus1+1=tile_height+1 if split_in_horizontal_direction equals 1.

In this embodiment, the quadtree_split_flag is not set to 1 in the tile structure of a picture like that of FIG. 14, meaning that every tile split termination costs 2 bits. In some embodiments, the order of the syntax element could be different than what is provided in the proposed tile syntax. For example, the flexible_split_flag could be put before the quadtree_split_flag, where a quad_tree_split_flag equal to 0 would terminate further splitting of the tile. In this example the tile structure of FIG. 15 could be expressed using 19+10=29 bits and the tile structure of FIG. 14 could be expressed using 73−19=54 bits. In one embodiment an extra flag could be signaled before parsing the tile structure indicating whether quad_tree_split_flag or flexible_ split_flag should be parsed first. In yet another embodiment, the quadtree_split_flag is not used. Rather, only the flexible_split_flag is used. In this aspect, after the split_in_horizontal_direction_flag, a flag "split_midways_flag" could be used to specify whether the tile should be split midways or if position split_position_minus1 should be read to do the split at that position.

Ninth Embodiment 8-Divider Lines

In this embodiment, the tile structure is described by specifying the boundaries between the tiles. Within this disclosure, the boundaries between tiles are also referred to as "divider lines."

In one aspect of this embodiment, the divider lines are straight lines described by their start and end points. Since the start and end points are interchangeable without affecting the divider line, both are referred to hereafter as end points.

As the divider lines are either horizontal or vertical, three coordinates and a direction flag are sufficient with which to uniquely describe each line. Further, this embodiment uses one flag for signaling the group of horizontal divider lines, and one flag for signaling the group of vertical divider lines. This further reduces the total bit count.

Figure 22C:
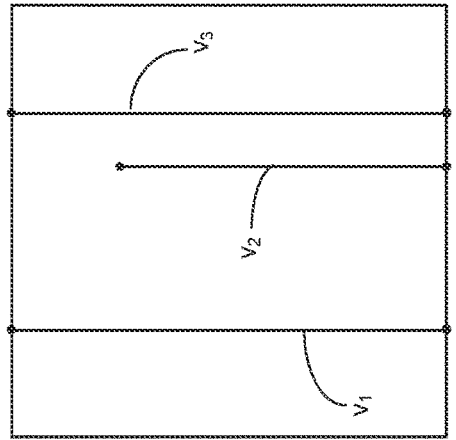
FIGS. 22A-22C illustrate horizontal and vertical divider lines corresponding to the tile structure of FIG. 14 according to one embodiment of the present disclosure.
Figure 22A:
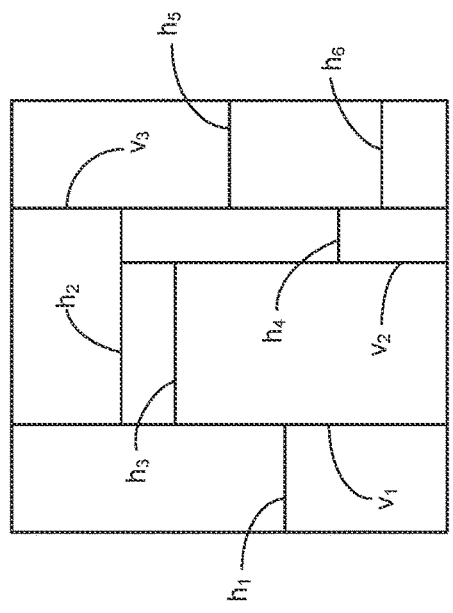
Figure 22B:
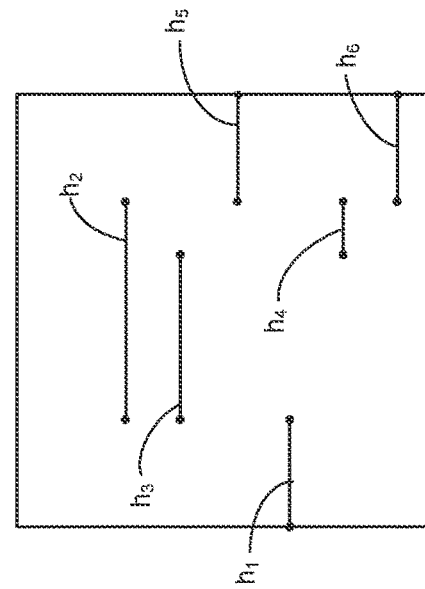

For example, the example tile structure S illustrated in FIG. 14 can be expressed using 9 horizontal and vertical divider lines, as illustrated in FIGS. 22A-22C. In particular, FIG. 22A illustrates an exemplary tiling structure having, in this embodiment, six (6) horizontal lines h1-h6, and three (3) vertical lines v1-v3. FIG. 22B illustrates the six (6) horizontal line components, and FIG. 22C illustrates the three (3) vertical line components. This equates to 3*9=36 code words for the coordinate of the end points, and 2 flags for the groups of horizontal and vertical divider lines, respectively.

Figure 23A:
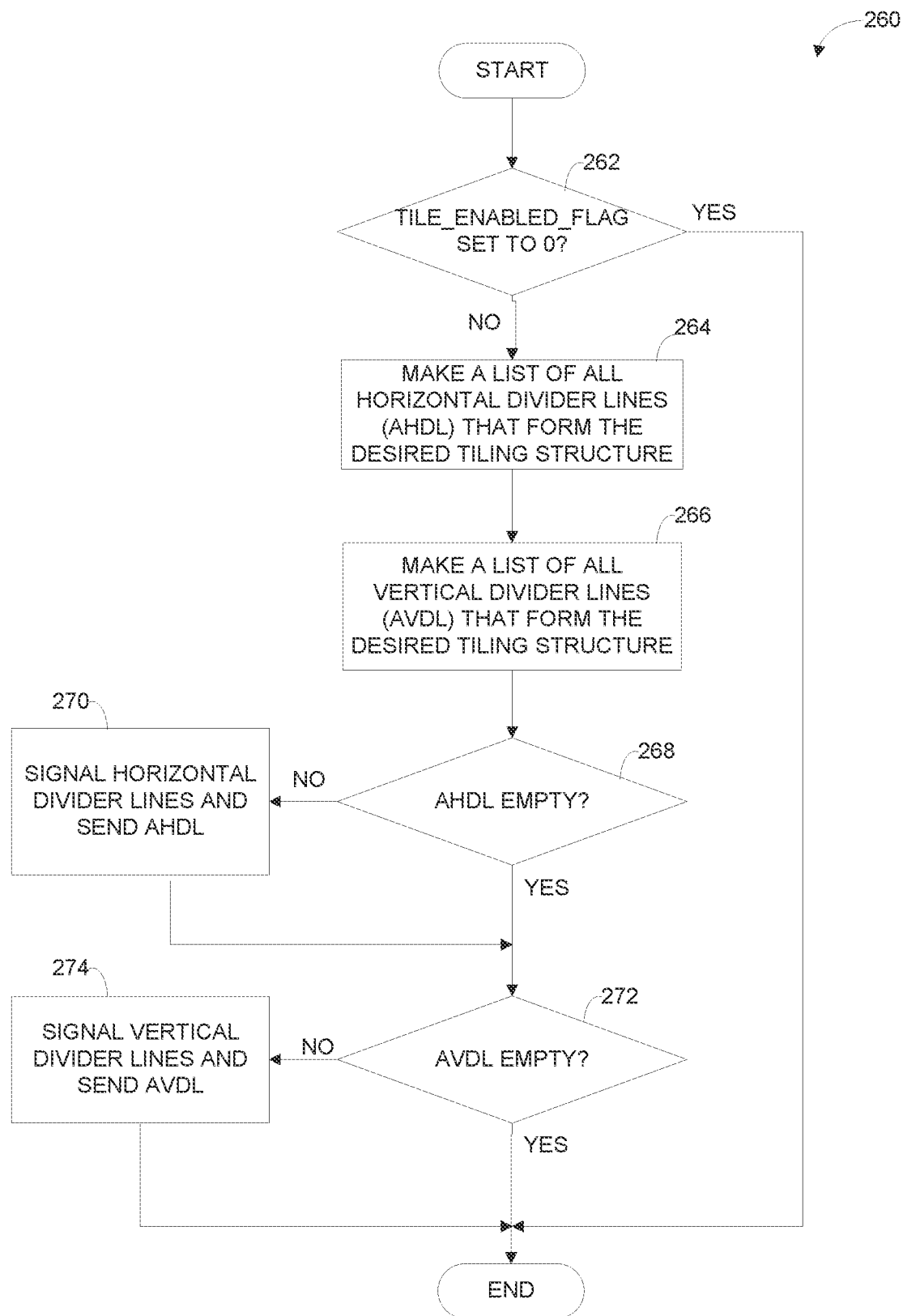
FIG. 23A is a flow diagram illustrating a method implemented at the encoder for determining the horizontal and vertical divider lines for a given tile structure according to one embodiment of the present disclosure.

FIG. 23A is a flow diagram illustrating a method 260 implemented at the encoder for determining the horizontal and vertical divider lines for a given tile structure. For illustrative purposes only, method 260 is described in the context of the tiling structure for the picture seen in FIG. 14.

As seen in FIG. 23A, the encoder determines the value of the tile_enabled_flag (box 262). If this flag is set to 0, it means that the picture comprises only one tile having the same width and height as the picture. Thus, the process ends.

If this flag is not set to 0, however, the encoder creates a list of all horizontal divider lines (AHDL) that form the desired tiling structure (box 264), as well as a list of all vertical divider lines (AVDL) that form the desired tiling structure (box 266). If the AHDL is not empty (box 268), the encoder signals horizontal divider lines and sends AHDL to the decoder (box 270). Similarly, if the AVDL is not empty (box 272), the encoder signals the vertical divider lines and sends the AVDL to the decoder (box 274). The order of creating and signaling AHDL and AVDL may be reversed without affecting the general aspects of the embodiment.

Figure 23B:
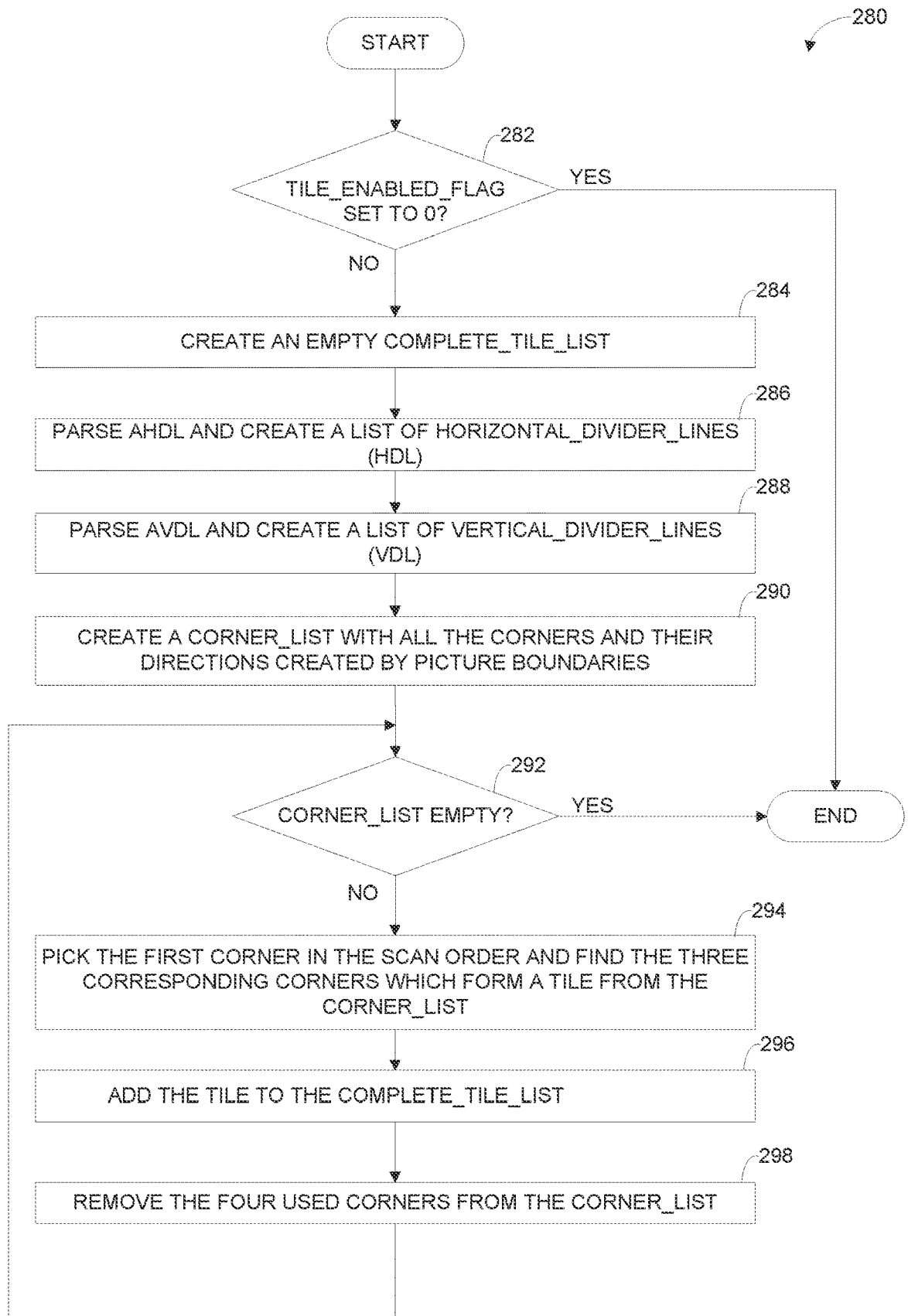
FIG. 23B is a flow diagram illustrating a method implemented at the decoder for processing tiles having a given tile structure described with corresponding horizontal and vertical divider lines according to one embodiment of the present disclosure.

FIG. 23B is a flow diagram illustrating a method 280 implemented at the decoder for processing tiles having a given tile structure described with corresponding horizontal and vertical divider lines. As above, this embodiment of the decoder functionality is described in the context of the tiling structure for the picture seen in FIG. 14. However, this is for ease of description only.

As seen in FIG. 23B, the decoder first determines whether the tile_enabled_flag is set to 0 (box 282). If this flag is set to 0, it means that the picture comprises only one tile having the same width and height as the picture. Thus, the process ends.

If the flag is not set to 0, however, the decoder creates an empty complete tile list (box 284), parses the AHDL, and creates a list of horizontal_divider_lines (HDL) (box 286). The decoder also parses the AVDL, and create a list of vertical_divider_lines (VDL) (box 288). The order of parsing AHDL and AVDL may be reversed without affecting the general aspects of the embodiment.

The decoder then creates a corner_list with all the corners and their directions created by picture boundaries, HDL and VDL (box 290). For example, referring to the illustration of FIG. 22, a cross point "+" specifies four separate corners in the corner_list, and a T-junction "⊢" or "⊣" or "⊤" or "⊥" specifies two separate corner points.

Once the corner_list has been created and populated, the decoder processes that list. Particularly, as long as corner_list is not empty (box 292), the decoder obtains one or more corners in the predefined scan order. In particular the decoder picks a first corner in the scan order and locates the three corresponding corners which form a tile from the corner_list (box 294). The decoder then adds the tile to the complete_tile_list (box 296) and removes the four used corners from the corner_list (box 298). This process continues until the corner_list is empty.

Table 12 provides example syntax for use with this embodiment. The syntax shown in Table 12 could be implemented on top of the currently existing HEVC video coding specification. Each end point in the horizontal/vertical list of divider lines, which is not located on the picture boundaries, should be located on the length of one divider line in the vertical/horizontal list (i.e., not another start or end point). This will help guaranty proper tile partitioning.

TABLE 12

Example Tile Syntax

| | Descriptor |
|---|---|
| pic_parameter_set_rbsp( ) { | |
| ... | |
|   tiles_enabled_flag | u(1) |
|   if( tiles_enabled_flag ) { | |
|     tile_divider_line_enabled_flag | u(1) |
|     if( tile_divider_line_enabled_flag ) { | |
|       horizontal_divider_lines_count | ue(v) |
|       vertical_divider_lines_count | ue(v) |
|       horizontal_divider_lines[ i ] | ue(v) |
|       vertical_divider_lines[ i ] | ue(v) |
|     } | |
|   } | |
| } | |
| ... | |

Semantics for the Syntax Elements in Table 12 tiles_enabled_flag: This flag is set to 1 to indicate that there are more than one tile in each picture referring to the PPS. This flag is set to 0 to indicate that there is only one tile in each picture referring to the PPS.

tile_divider_line_enabled_flag: This flag is set to 1 to indicate that divider lines are used to describe the tiling structure. This flag is set to 0 to indicate that divider lines are not used to describe the tiling structure.

horizontal_divider_lines_count: This value specifies the number of horizontal divider lines.

vertical_divider_lines_count: This value specifies the number of vertical divider lines.

horizontal_divider_lines[i]: This value lists all the horizontal divider lines. Divider lines is specified by the coordinates of their ends. Because every divider line in this list is horizontal, three coordinates are enough to describe each divider line uniquely—i.e., a single y value and two x values.

vertical_divider_lines[i]: This value lists all the vertical divider lines. Divider lines is specified by the coordinates of their ends. Because every divider line in this list is vertical, three coordinates are enough with which to describe each divider line uniquely. — i.e., two y values and one x value.

corner_list: This is the list of all corner points described by their position and direction (⌈, ⌉, ⌊, ⌋). This list considers all the picture borders and all the horizontal and vertical divider lines (including their crossings).

In one variant of this embodiment sub-tiles are used and the coordinates of the end points of the divider lines are given in sub-tile coordinates. The sub-tile size is predefined. Alternatively, the sub-tile size is explicitly signaled. Using the sub-tile coordinates saves bits as it creates a coarser grid where the coordinates of the end points can be expressed using smaller code words.

In yet another variant of this embodiment, a full grid is assumed. The start and end points of the divider lines that should be removed are then specified. To describe the tiling structure shown in FIG. 15, this embodiment describes 6 divider lines that should be removed, and thus, 3*6 code words plus two code words for the group of horizontal and vertical divider lines are required to describe the partition structure.

In yet another aspect, the divider lines have bending point(s) in addition to start and end points. Bend points represent "joints." According to the present disclosure, joints function as an end point to a previous point, and as a start point for the next point in the line description.

Multiple sets of divider lines can result in the same tiling structure. The coder optimizes for the minimum number of divider lines. In one aspect, the divider lines have parts in common. In another aspect, the divider lines do not have parts in common.

In yet another aspect, the divider lines are specified once and then copied to given position in the grid.

Tenth Embodiment—T-junctions

This embodiment of the present disclosure describes the tile structure using a set of points that are in the structure and that have specific properties. These points are referred to herein as "T-junctions."

As previously described, the tile structure comprises a set of internal lines, also referred to as "divider lines." Each divider line is a straight line with two end points where the divider line terminates (i.e., the divider line is not further continued). The so-called "T-junctions" are defined at the position of these end points of the divider lines. Because each divider line ends at the junction of that divider line with another perpendicular divider line (not an end point of another divider line because of rectangular tiling structure), or at the junction with a border of the picture perpendicular to the first divider line, each T-junction has one of the four possible shapes: ⊥, T, ⊣, and ⊢. Hence each T-junction can be fully described using the position of the junction and one of the 4 shapes ⊥, T, ⊣, and ⊢. The three directions pointed at by each T-junction are referred to herein as the "arms" of that T-junction.

The tiling structure S of a picture 10 can then be determined from the set of the T-junctions by extending all three arms of all T-junctions in the picture until each arm reaches either the border of the picture or another T-junction position.

Figure 24A:
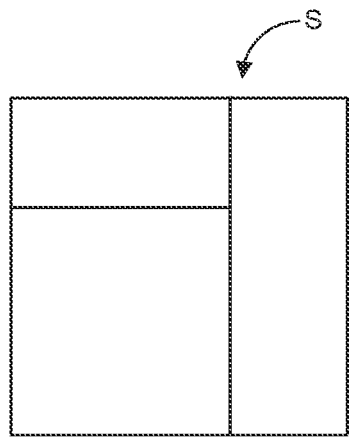
FIGS. 24A-24C illustrate an example tile structure and the corresponding set of T-junctions before and after removing redundant T-junctions according to one embodiment of the present disclosure.
Figure 24B:
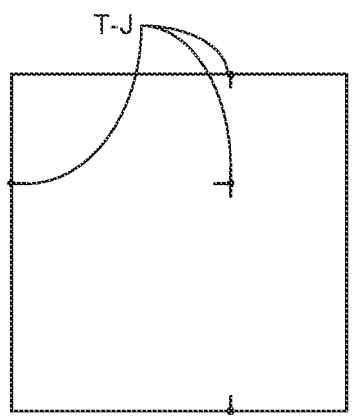
Figure 24C:
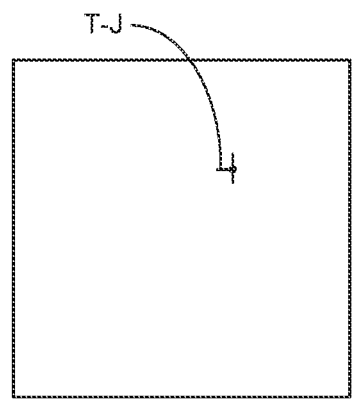

In one aspect of this embodiment, the set of T-junctions are shortened by removing redundant T-junctions. As described herein, redundant T-junctions are those which are located on the boundary of the picture and do not change the tiling structure if they are removed. An example of a tiling structure S with redundant T-junctions is seen in FIGS. 24A-24C. In particular, FIG. 24A illustrates an exemplary tiling structure S. FIG. 24B illustrates the set of all T-junctions, and FIG. 24B illustrates the set of T-junctions after removing redundant T-junctions. Redundancy is checked on a one by one basis. This means that if a T-junction is redundant, and thus, will be removed from the set, it should not be included in redundancy check for the rest of the T-junctions in the set.

Figure 25A:
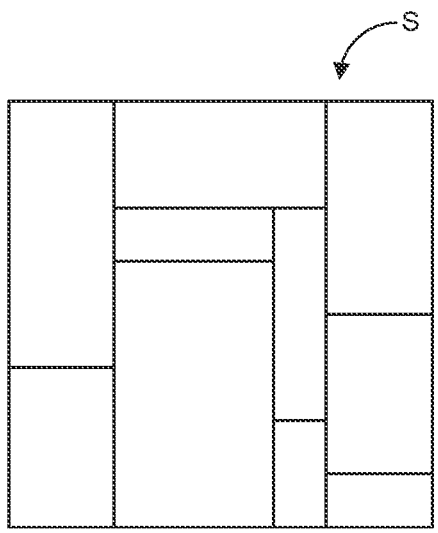
FIGS. 25A-25B illustrate an example tiling structure and a corresponding set of T-junctions according to one embodiment of the present disclosure.
Figure 25B:
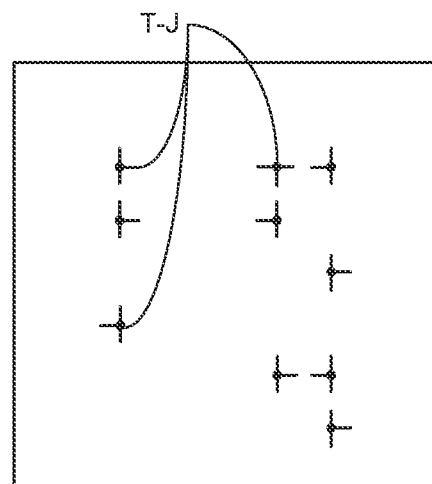

FIGS. 25A-25B illustrate the example tiling structure S (FIG. 25A) and a corresponding set of T-junctions that describes that specific tiling structure (FIG. 25B).

Figure 26A:
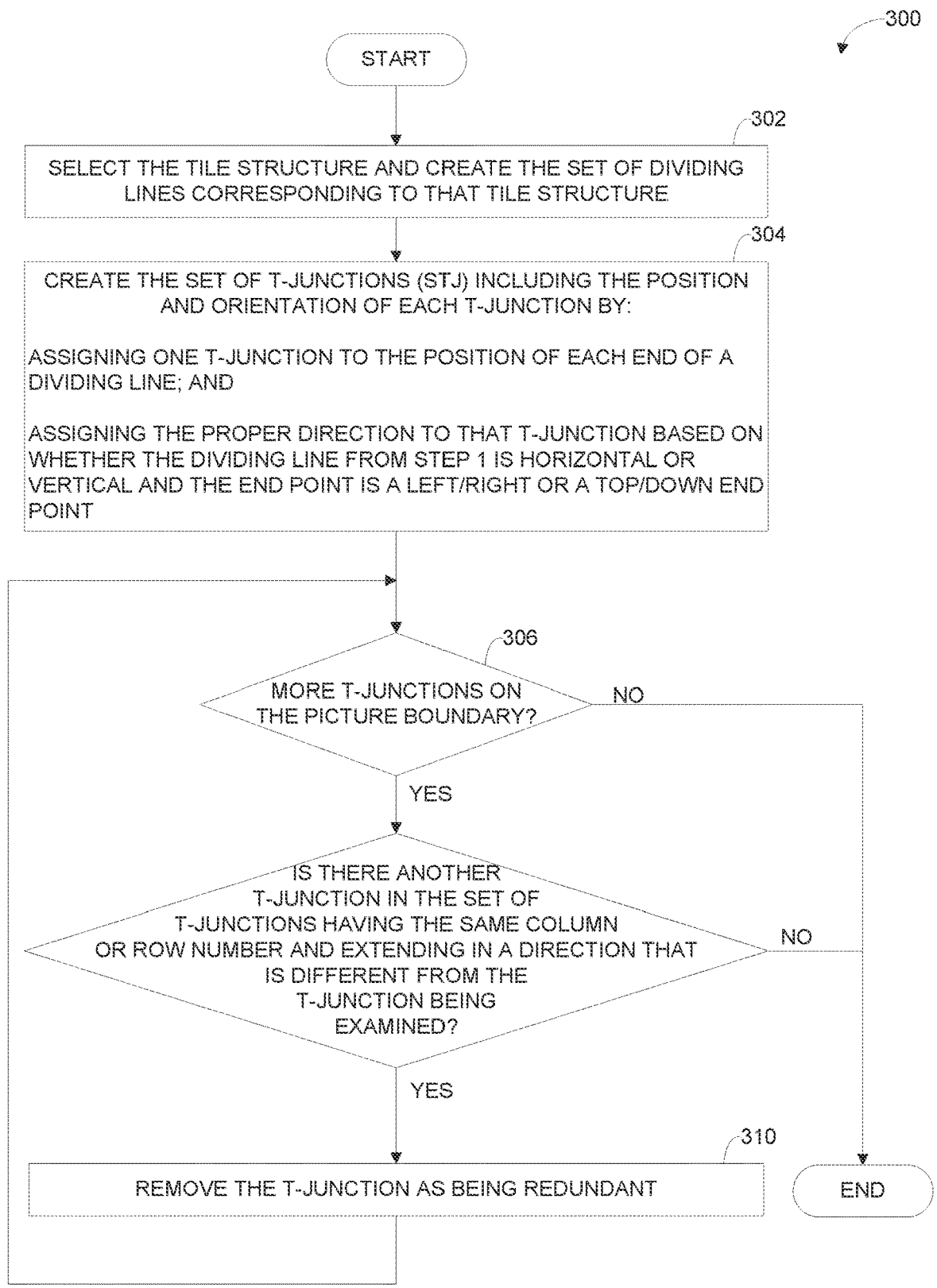
FIG. 26A is a flow diagram illustrating a method implemented at the encoder for creating the set of T-Junctions according to one embodiment of the present disclosure.

FIG. 26A is a flow diagram illustrating a method 300 implemented at the encoder for creating the set of T-Junctions as previously described. Method 300 begins with the encoder selecting a tile structure and creating a set of divider lines that correspond to that tile structure (box 302). The encoder then creates the set of T-junctions (STJ) (box 304). In this embodiment the STJ includes information regarding the position and orientation of each T-junction. This can be accomplished using a variety of processes, however, in this embodiment; the encoder assigns one T-junction to the position of each end of a divider line in the created set, and assigns the proper direction to that T-junction based on whether the divider line is horizontal or vertical, and whether the end point is a left/right or a top/down end point.

The encoder then removes redundant T-junctions. Particularly, for each T-junction on the picture boundary (box 306), the encoder determines whether there is another T-Junction in the STJ with the same column or row number, and if so, whether the direction different from the T-junction being examined (box 308). If so, the encoder removes that T-junction (box 310).

Figure 26B:
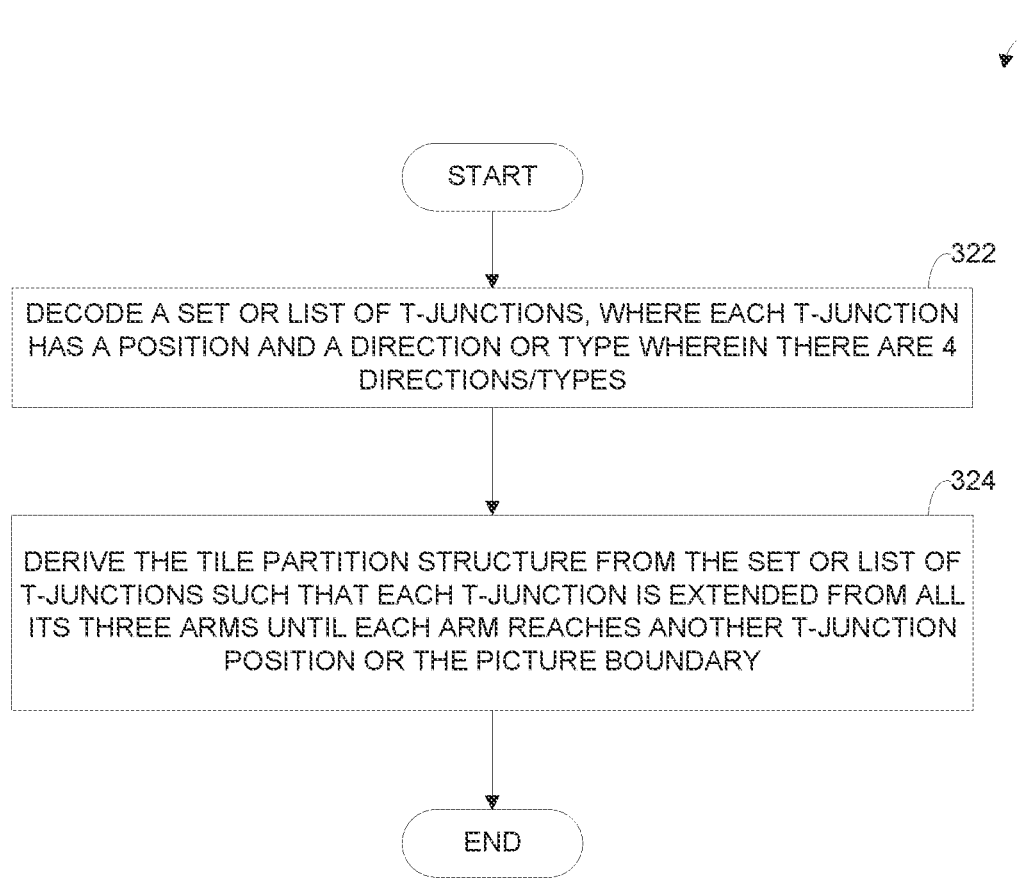
FIG. 26B is a flow diagram illustrating a method implemented at the decoder for creating the set of T-Junctions according to one embodiment of the present disclosure.

FIG. 26B is a flow diagram illustrating a method 320 implemented at the decoder for creating the set of T-Junctions as previously described. Method 300 begins with the decoder decoding a set or list of T-junctions (box 322). Each T-junction has a position and a direction or type. There are 4 directions/types. No two T-junctions should have the same position and no T-junction should have a position outside the picture. Derive the tile partition structure. Then, the decoder derives the tile partition from the set or list of T-junctions such that each T-junction is extended from all its three arms until each arm reaches another T-junction or the picture boundary (box 324).

Table 13 provides example syntax for use with this embodiment. The syntax shown in Table 13 could be implemented on top of the currently existing HEVC video coding specification.

TABLE 13

Example Tile Syntax

| | Descriptor |
|---|---|
| pic_parameter_set_rbsp( ) { | |
| ... | |
|   tiles_enabled_flag | u(1) |
|   if( tiles_enabled_flag ) { | |
|     tile_t_junction_enabled_flag | u(1) |
|     if( tile_t_junction_enabled_flag) { | |
|       t_junction_size_minus1 | ue(v) |
|       t_junction_new_row_seq | u(n) |
|       t_junction_list | ue(v) |
|       complete_tile_list | |
|       for (i = 0; i < size(t_junction_list); i++) { | |
|         update_complete_tile_list( ) | |
|       } | |
|     } | |
|   } | |
| ... | |

Semantics for the Syntax Elements in Table 13 tiles_enabled_flag: This flag is set to 1 to indicate that there are more than one tile in each picture referring to the PPS. This flag is set to 0 to indicate that there is only one tile in each picture referring to the PPS.

tiles_enabled_flag: This flag is set to 1 to indicate that there are more than one tile in each picture referring to the PPS. This flag is set to 0 to indicate that there is only one tile in each picture referring to the PPS.

tile_t_junction_enabled_flag: This flag is set to 1 to indicate that the T-junctions are used to describe the tiling structure.

t_junction_size_minus1 plus one: This value specifies the number of T-junctions being signaled.

t_junction_new_row_seq: This value is a bit sequence with the length equal to the number of T-junctions.

t_junction_new_row_seq: This value starts at 1 and toggles every time a T-junction changes the scan line. As an exemplary case, for the tile structure of 14, the t_junction_new_row_seq is set to: 1110010110. Using this, we do not need to signal both x and y for a T-junction as long as it is located at the same scan line as the previous T-junction.

t_junction_list: This is the list of all T-junctions (including their position and direction) in the defined scan order.

complete_tile_list: This is a list which keeps all the completed tiles. Completed tiles are specified with their four corners. complete_tile_list is initialized with one tile including all units in the picture.

update_complete_tile_listO: This is defined as a function that updates the list of completed tiles and it is described as follows:

update_complete_tile_list( ) {
- Using the position and direction of t_junction_list [i], extend all arms of the t_junction_list [i] until each arm reaches another T-junction or the picture boundary.
- if the units on the two sides of each arm are assigned to the same tile, update the complete tile list by adding the newly created tile(s).
}

In a variant of this embodiment sub-tiles are used and the coordinates of the T-junctions are given in sub-tile coordinates. The sub-tile size is predefined. Alternatively, the sub-tile size is explicitly signaled. Using the sub-tile coordinates saves bits as it creates a coarser grid where the coordinates of the T-junctions can be expressed using smaller code words.

Eleventh Embodiment—Sparse Matrix

This embodiment is based on the observation that the number of tiles is usually much lower than the number of blocks in the picture. This embodiment exploits this sparsity for coding the tiling structure.

In more detail, each tile can be uniquely specified with the position of its two opposite corners. For simplicity, the top left corner is considered as the start position of the tile, and the bottom right corner is considered as the end position of the tile. Corresponding start and end point coordinates of the tiles are marked in a matrix with the number of columns and rows equal to the picture width and height divided by the width and height of the picture units (e.g., sub-tiles, units or CTUs).

Figures 27A, 27B, 27C:
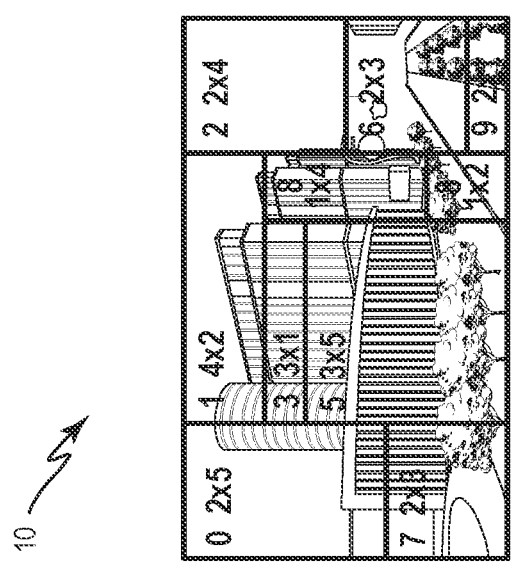
FIGS. 27A-27C illustrate an exemplary tiling structure and the corresponding matrix of start corners and matrix of end corners according to one embodiment of the present disclosure.

The matrix corresponding to start corner coordinates on the grid are considered to be a sparse matrix and are compressed using sparse matrix compression methods, such as compressed sparse column (CSC) or compressed sparse row (CSR), for example. The same applies to the end corner matrix. Another possible way to compress the sparse matrix is to compress the matrix in the same or similar way as it is done in HEVC for the matrices of coefficient significance or coefficient signs when compressing transform coefficients. FIGS. 27A-27C show how the tiling structure is related to the matrix of start corners and the matrix of end corners. In particular, FIG. 27A illustrates picture 10 partitioned into an exemplary tiling structure S. FIG. 27B is a matrix of the start corners, and FIG. 27C is a matrix of end corners.

One difference from the standard CSC and CSR is that the only non-zero values in the start corner matrix and end corner matrix are equal to 1. Therefore, what is sent in the bitstream is only the position of those non-zero values.

Figure 28A:
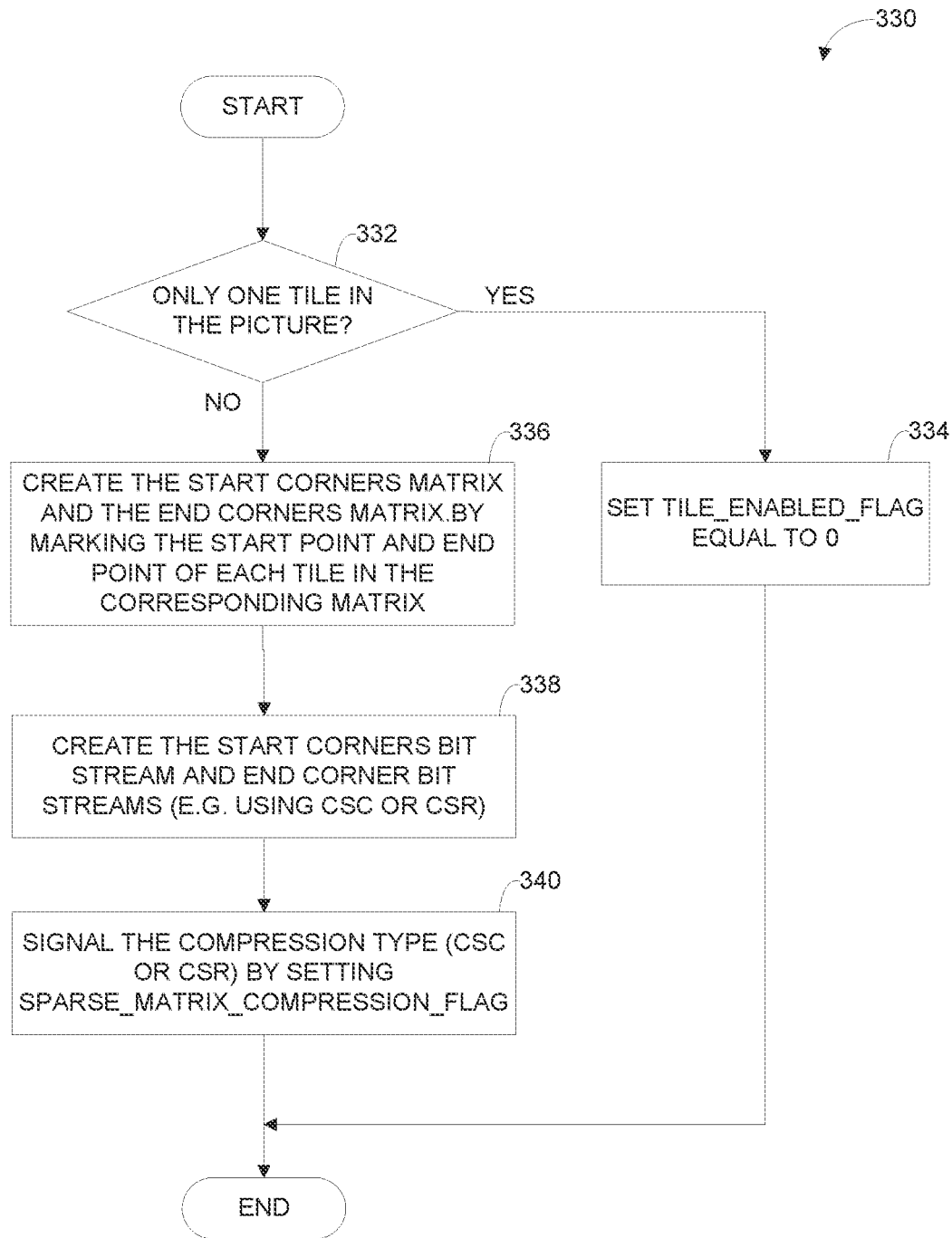
FIG. 28A is a flow diagram illustrating a method implemented at the encoder for creating the start and end corner matrices according to one embodiment of the present disclosure.

FIG. 28A is a flow diagram illustrating a method 330 implemented at the encoder for creating the start and end corner matrices, as previously described. As seen in FIG. 28A, method 330 begins with the encoder determining whether the picture has only one tile (box 332). If so, the encoder sets the tile_enabled_flag equal to 0 (box 334) and the process ends.

If the encoder determines that the picture has more than one tile, the encoder creates the start corners matrix and the end corners matrix by marking the start point and end point of each tile in the corresponding matrix (box 336). The encoder then creates the start corners bitstream and end corner bitstreams (e.g. using CSC or CSR) (box 338), and signals the compression type (CSC or CSR) by setting the sparse_matrix_compression_flag (box 340).

Figure 28B:
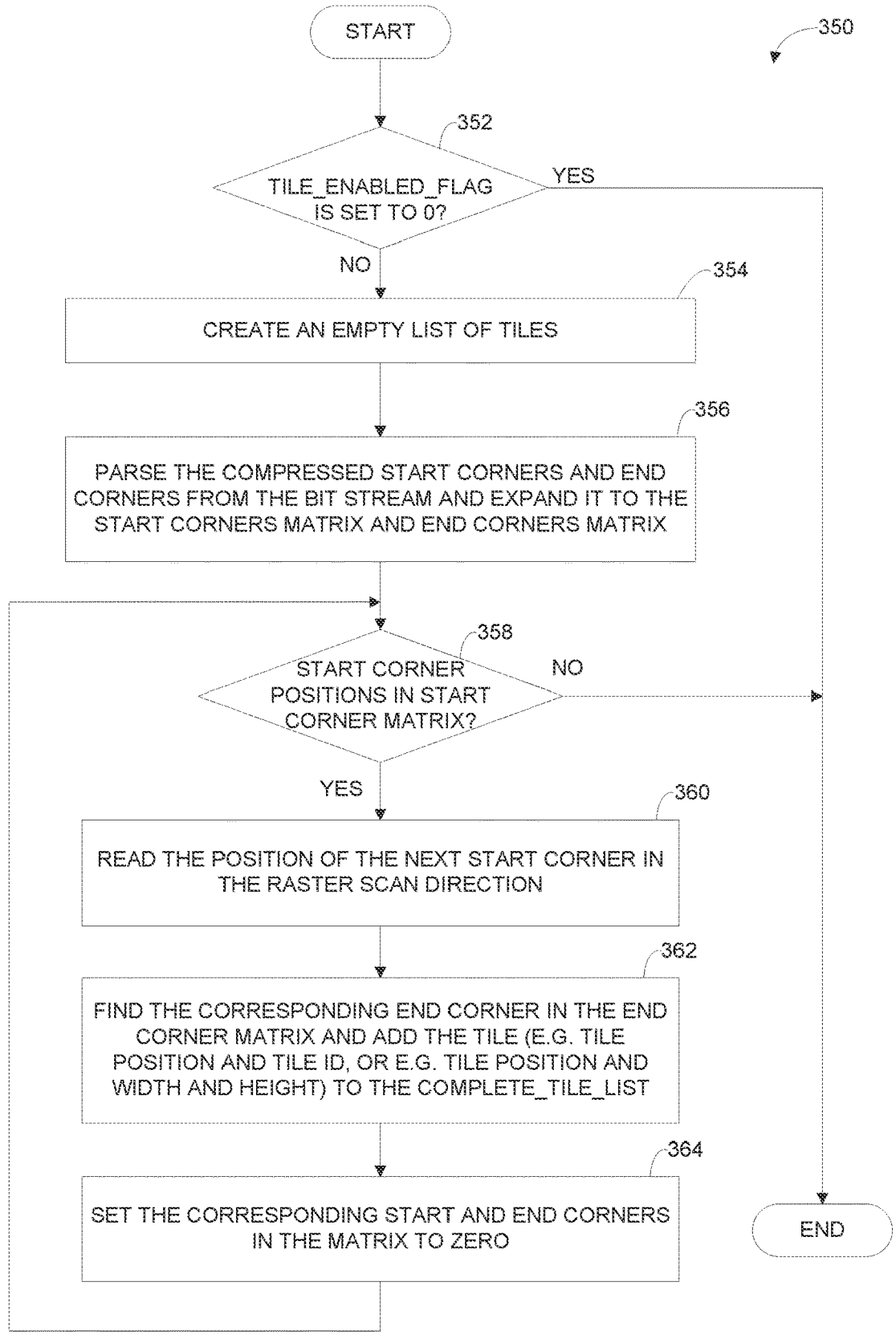
FIG. 28B is a flow diagram illustrating a method implemented at the decoder for processing the start and end corner matrices according to one embodiment of the present disclosure.

FIG. 28B is a flow diagram illustrating a method 350 implemented at the decoder for processing the start and end corner matrices, as previously described. As seen in FIG. 28B, method 350 begins with the decoder determining whether the tile_enabled_flag is set to 0 (box 352). If so, the process ends because the picture includes only a single tile, which has the same width and height as the picture.

If there is more than one tile in the picture, however, the decoder creates an empty list of tiles (box 354). The decoder then parses the compressed start corners and end corners from the bitstream, and expands them to the start corners matrix and end corners matrix (box 356). Then, provided that there are start corners defined in the start corner matrix (box 358), the decoder reads the position of the next start corner in the raster scan direction (box 360).

The decoder then locates the corresponding end corner in the end corner matrix, and adds the tile (e.g. tile position and tile id, or e.g. tile position and width and height) to the complete_tile_list (box 362). The decoder then sets the corresponding start and end corners in the matrix to zero and repeats the process.

As a sanity check, the decoder can determine:
A number of start corners (ones in the start corner matrix) is equal to the number of tiles.
A number of end corners (ones in the start corner matrix) is equal to the number of tiles.
A first element of the start corner matrix is always set to 1
A last element of the end corner matrix is always set to 1

Table 14 provides example syntax for use with this embodiment. The syntax shown in Table 14 could be implemented on top of the currently existing HEVC video coding specification.

TABLE 14

Example Tile Syntax

| | Descriptor |
|---|---|
| pic_parameter_set_rbsp( ) { | |
| ... | |
|   tiles_enabled_flag | u(1) |
|   if( tiles_enabled_flag ) { | |
|     sparse_matrix_compression_enabled_flag | u(1) |
|     if( sparse_matrix_compression_enabled_flag) { | |

TABLE 14-continued

Example Tile Syntax

| | Descriptor |
|---|---|
|       sparse_matrix_compression_mode | u(1) |
|       if( sparse_matrix_compression_mode = 0){ | |
|         tiles_count | ue(v) |
|         start_corners_stream_1 [i] | ue(v) |
|         start_corners_stream_2 [i] | u(n) |
|         end_corners_stream_1 [i] | ue(v) |
|         end_corners_stream_2 [i] | u(n) |
|       } | |
|       start_corners_matrix [i][j] | |
|       end_corners_matrix [i][j] | |
|       complete_tile_list | |
|       while(sum(start_corners_matrix) != 0) { | |
|         update_complete_tile_list( ) | |
|       } | |
|     } | |
|   } | |
| } | |
| ... | |

Semantics for the Syntax Elements in Table 14 tiles_enabled_flag: This flag is set to 1 to indicate that there is more than one tile in each picture referring to the PPS.: This flag is set to 0 to indicate that there is only one tile in each picture referring to the PPS.

sparse_matrix_compression_enabled_flag: This flag is set to 1 to indicate that the sparse matrix is used to describe the tiling structure.

sparse_matrix_compression_mode: This indicates which sparse matrix compression method is used for the start and end corner matrix. Setting this mode to 0 indicates that the compressed sparse row (CSR) method is used.

start_corners_stream_1 is the first array that is being used to build the start_corners_matrix. This array is constructed as: start_corners_stream_1 [i]=number of nonzero elements on the (i)-th row in the start_corners_matrix.

tiles_count: This value specifies the number of tiles. This also gives the number of non-zero values in the start_corner_matrix and end_corner_matrix.

start_corners_stream_2 is the second array that is being used to build the start_corners_matrix. This array contains the column index (0 to n−1) of each element of start_corners_matrix and hence is of length number of non-zero elements in the start_corners_matrix.

end_corners_stream_1 is the first array that is being used to build the end_corners_matrix. This array is constructed as: end_corners_stream_1 [i]=number of nonzero elements on the (i)-th row in the end_corners_matrix.

end_corners_stream_2 is the second array that is being used to build the end_corners_matrix. This array contains the column index (0 to n−1) of each element of end_corners_matrix and hence is of length number of non-zero elements in the end_corners_matrix.

start_corners_matrix is the matrix of start corners which is uniquely defined by two arrays start_corners_stream1 and start_corners_stream 2.

end_corners_matrix is the matrix of end corners which is uniquely defined by two arrays end_corners_stream1 and end_corners_stream 2.

complete_tile_list is the list of complete tiles, initialized as an empty list.

update_complete_tile_list( ) is a function that reads tiles from start_corners_matrix and end_corners_matrix and adds them to the complete_tile_list.

Assuming the raster scan direction left to right and top to bottom, the function is described as follows:

```
update_complete_tile_list( ) {
    Find the first 1 value in the start_corners_matrix in the raster scan
    direction
    Find the corresponding 1 value in the end_corners_matrix.
    Add the tile to the complete_tile_list using the coordinates of the start
    corner and end corner.
    Set the corresponding start corner to zero in the start_corners_matrix.
}
```

Figure 30:
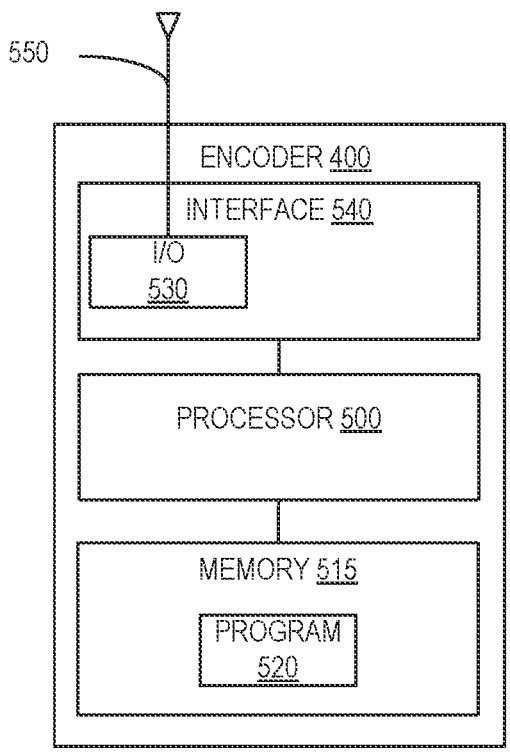
FIG. 30 is a block diagram illustrating components of an example encoder according to one embodiment of the present disclosure.

An encoder 400 and decoder 450 according to one or more embodiments described herein could be implemented using a suitable combination of hardware and/or software. Accordingly, an encoder comprising one or more processors and e.g. one or more memories is configured to carry out the methods according to the embodiments herein. FIG. 30 is a schematic diagram showing components of an encoder 400. The processor 500 could be any combination of one or more of a suitable central processing unit (CPU), multiprocessor, microcontroller, digital signal processor (DSP), application specific integrated circuit (ASIC) etc., capable of executing software instructions contained in a computer program 520 stored in one or more memories 515. The one or more memories 515 is for instance, a data buffer, Read-Write Memory (RWM), Read-Only memory (ROM), random-access memory (RAM), cache memory, flash memory devices, optical storage devices, etc. The encoder could comprise an interface 540 with an input and/or output circuit 530 configured to transmit a bitstream, e.g., via transmitter or transceiver 550.

Figure 31:
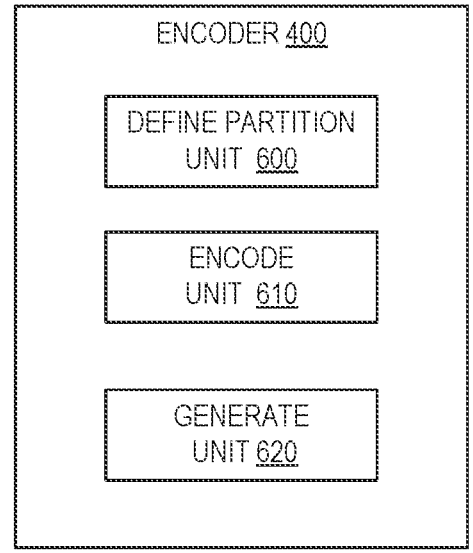
FIG. 31 is a block diagram illustrating functional components of an example encoder according to one embodiment of the present disclosure.

As shown in FIG. 31 an encoder 400 could have units, modules, or circuits configured to carry out methods described herein. For instance, the encoder 400 comprises a define partition unit 600 that defines a partition structure that divides a picture into picture segments as described herein. The encoder 400 also comprises an encode unit 610 that encodes picture segments in accordance with the partition structure to generate a plurality of coded segments, and a generate unit 620 that generates a bitstream comprising the plurality of coded segments and information indicating the partition structure used to divide the picture into the plurality of picture segments.

Figure 32:
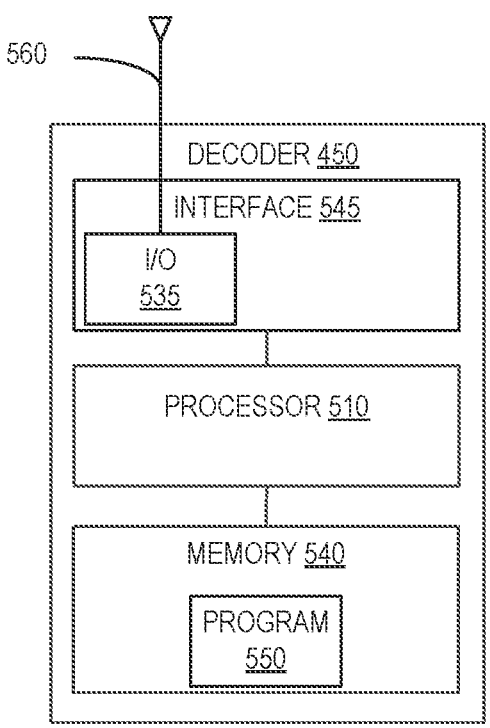
FIG. 32 is a block diagram illustrating components of an example decoder according to one embodiment of the present disclosure.

Further, a decoder 450 comprising one or more processors and e.g. one or more memories is configured to carry out the methods according to the embodiments herein. FIG. 32 is a schematic diagram showing components of decoder 450. The processor 510 could be any combination of one or more of a suitable central processing unit (CPU), multiprocessor, microcontroller, digital signal processor (DSP), application specific integrated circuit (ASIC) etc., capable of executing software instructions contained in a computer program 550 stored in one or more memories 540. The one or more memories 540 is for instance, a data buffer, Read-Write (RWM) Memory or Read-Only (ROM) memory. The decoder 450 comprises an interface 545 with an input and/or output circuit 535 configured to receive a bitstream, e.g., via receiver or transceiver 560.

Figure 33:
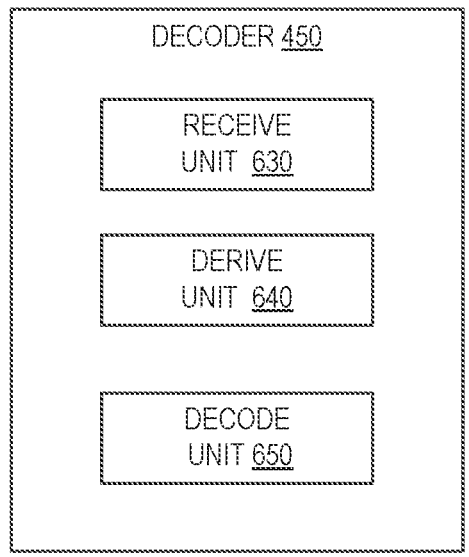
FIG. 33 is a block diagram illustrating functional components of an example decoder according to one embodiment of the present disclosure.

As shown in FIG. 33, a decoder 450 could have units, modules, or circuits configured to carry out methods described herein. For instance, the decoder 450 comprises a receive unit 630 configured to receive a bitstream. The decoder 450 also comprises a derive unit 640 configured to derive, from the information in the bitstream, one or more of a partition structure, the size of a subsegment of the partition structure, and the size of a unit of the partition structure, and a decode unit 650 configured to decode the coded segments received in the bitstream in accordance with the partition structure.

Figure 34A:
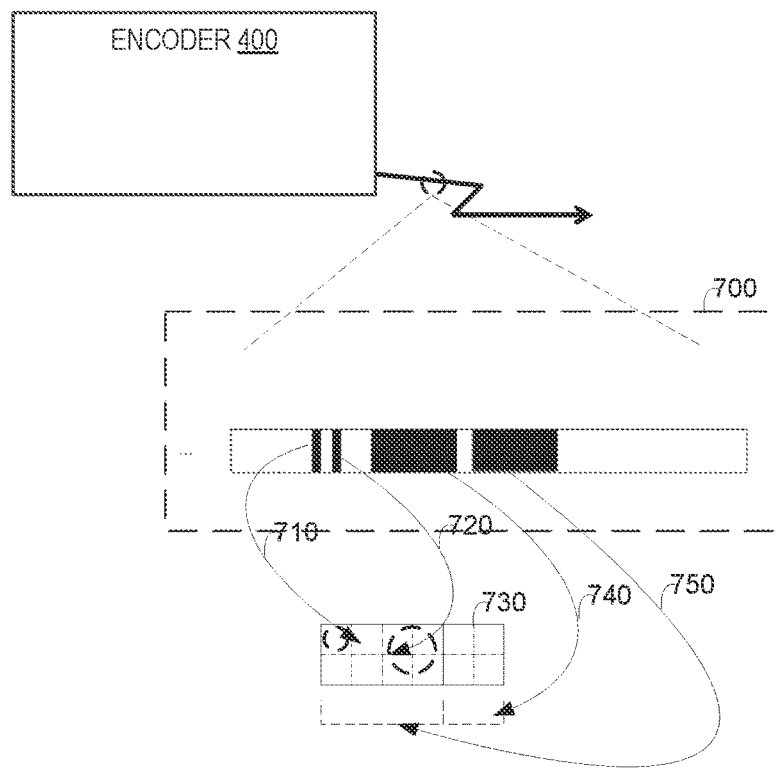
FIG. 34A illustrates an encoder encoding an image according to a partition structure according to one embodiment of the present disclosure.

Embodiments herein are described with reference to a single partition structure defined by an encoder or derived by a decoder, such as an encoder 400 and decoder 450 illustrated in FIGS. 34A and 34B. FIG. 34A shows an example encoder 400 transmitting a bitstream 700, with information indicating a single partition structure 730. The bitstream 700 comprises information indicating a size of a unit 710, information indicating a size of a subsegment 720, and information related to a segment 740 and another segment 750.

Figure 34B:
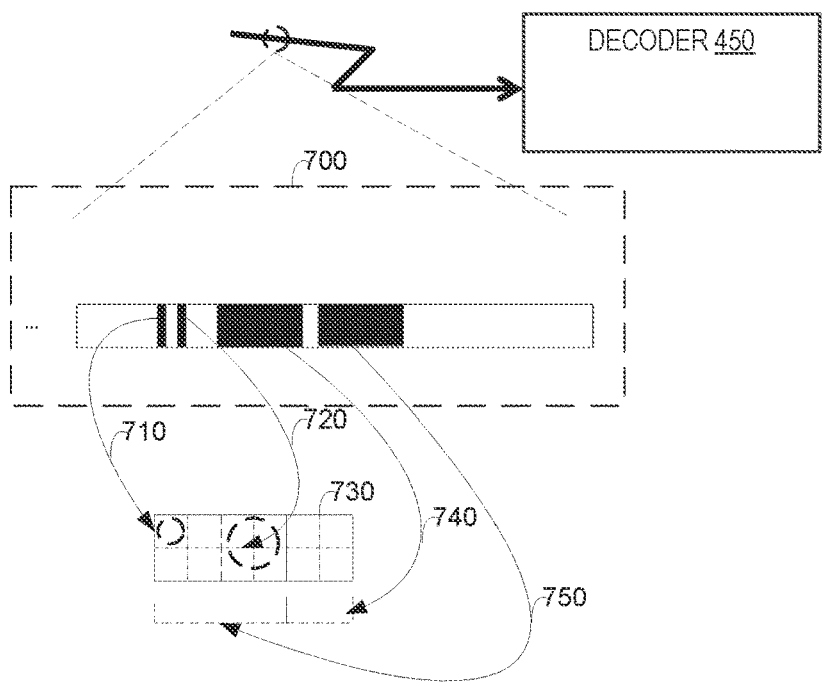
FIG. 34B illustrates a decoder decoding an image according to a partition structure according to one embodiment of the present disclosure.

FIG. 34B shows a corresponding example decoder receiving a bitstream 700, with information indicating a single partition structure 730. The bitstream 700 comprises information indicating a size of a unit 710, information indicating a size of a subsegment 720, and information related to a segment 740 and another segment 750.

Figure 29:
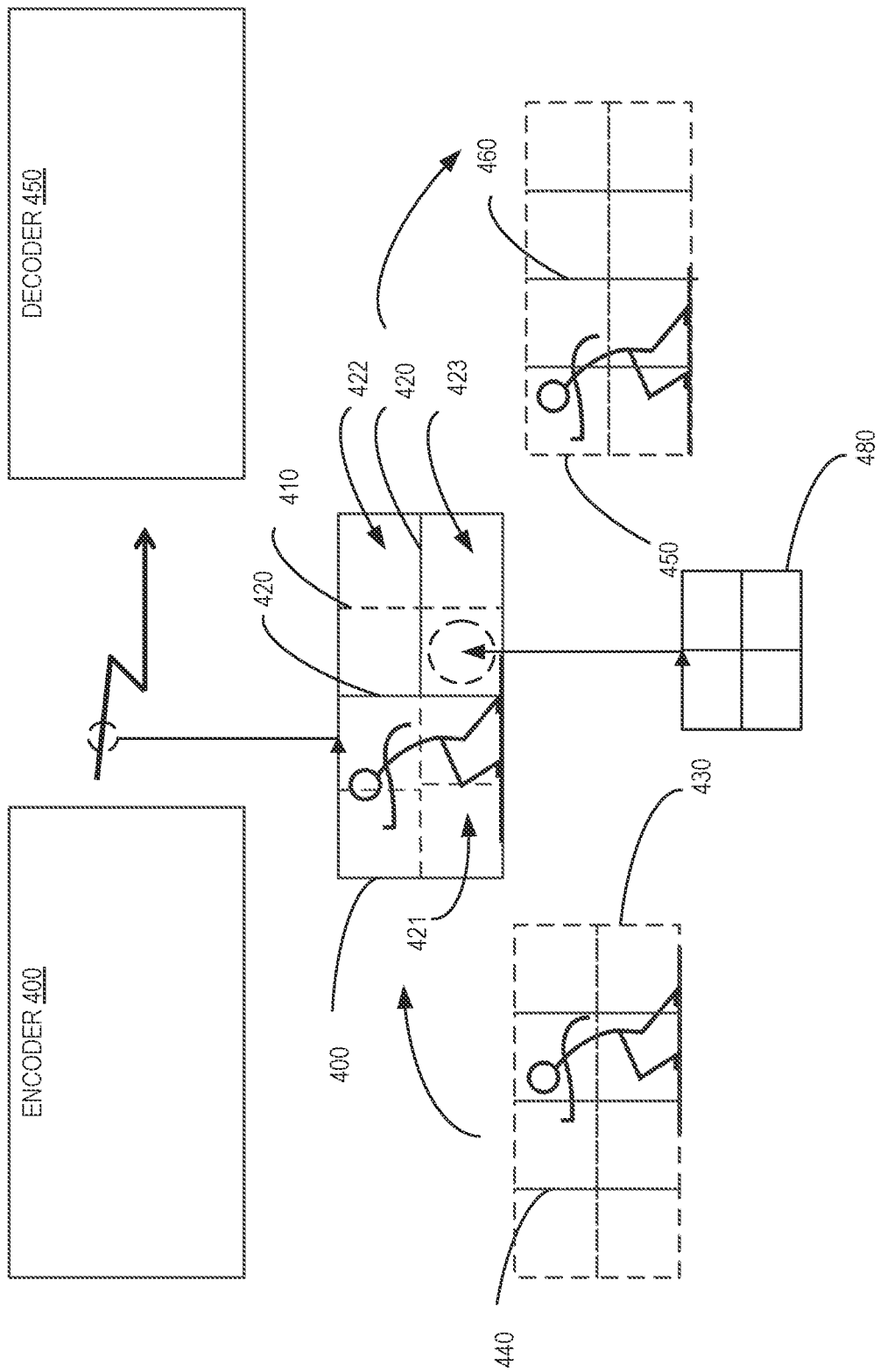
FIG. 29 is an example system diagram illustrating an encoder encoding and a decoder decoding a plurality of images of different partition structures according to one embodiment of the present disclosure.

Of course, one of ordinary skill in the art will appreciate that an encoder 400 and decoder 450 can be used separately as shown in FIGS. 34A-34B or in conjunction to exchange a series of images as shown in FIG. 29.

In such cases where a series of images are exchanged, the bitstream in one or more embodiments includes an indicator of the identity of the picture or otherwise associate a particular partition structure with a picture or multiple pictures. As shown in FIG. 29, partition structure 400 shows divider lines 420 for picture segments 421, 422, 423. A given picture segment of the partition structure comprises one or more subsegments, e.g., subsegments formed by a divider line 410 forming the border of a subsegment. A subsegment can comprise a plurality of units. For instance as shown in FIG. 29, subsegment 480 comprises 4 units. An edge of a first picture segment 421 borders corresponding edges of adjacent picture segments 422 and 423. As shown in FIG. 29, the encoder 400 and decoder 450 encode and decode respectively a plurality of images which have the same partition structure 400 or different partition structures 430 and 450. These different partition structures could be flexible partition structures as described herein. Alternatively or additionally as shown in FIG. 29, the different partition structures can include as well traditional partition structures with divider lines 440 and 460 that go across the image and no subsegments.

Figure 35:
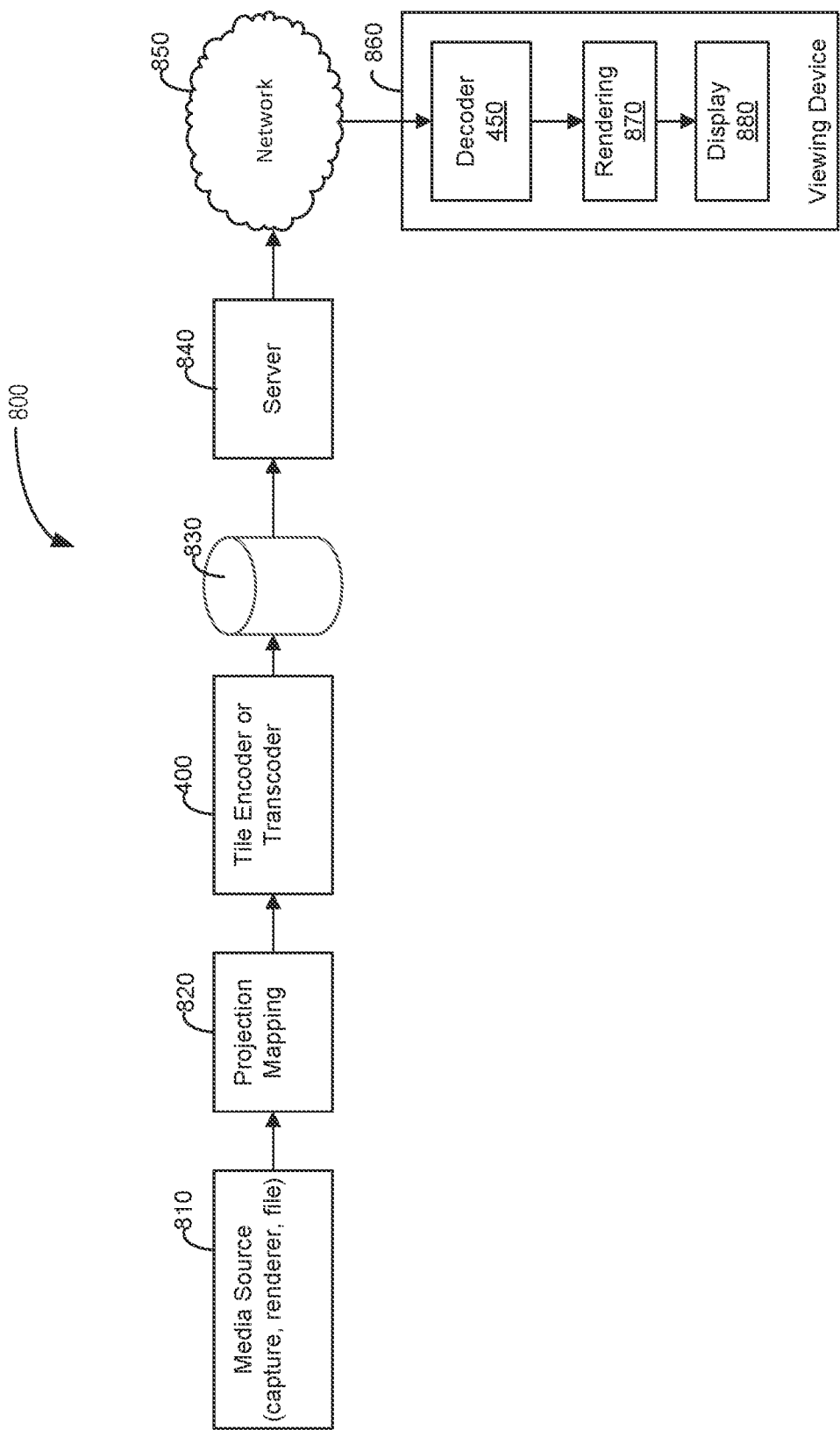
FIG. 35 illustrates a system comprising a decoder and encoder according to one embodiment of the present disclosure.

FIG. 35 shows an example system or method 800 in which an encoder 400 or decoder 450 described herein would be useful. The system comprises a media source 810 (e.g., a capture, renderer or file). The media source is fed to a projection mapping 820 and then to a tile encoder or transcoder, e.g. an encoder 400 for partitioning an image of the media source as described herein. The encoded information is stored in storage 830 and then fed to a server 840. It can be transmitted over a network 850 to a viewing device 860. For example the image is one of video, and the viewing device 860 has a decoder 450 as described herein for decoding the partitioned image, rendering 870 the image and displaying the image on a display 880 to a user of the viewing device 860. Such a viewing device can be, for example, a Head Mounted Display (HMD) device or any display device.

One or more embodiments are applicable to applications in which a viewing device 860 receives one or more images in connection with a particular gaze direction of the device. In one embodiment, the device has received information from the server 840 explaining what tile streams are available and information about each tile stream such as spatial coverage and bitrate. The gaze direction of the viewing device 860 is captured and the viewing device 860 requests a subset of tile streams from the server 840. The viewing device 860 receives tile streams and composes a single bitstream from the tiles streams and feeds the bitstream to the decoder 880. The viewing device 860 has the necessary information about the tile streams and knows how it composed the single bitstream. Therefore, the viewing device 860 is able to convert the decoded pictures into pictures that are suitable for rendering.

In another embodiment, the gaze direction of the viewing device 860 is captured and sent to the server 840. The server 840 composes a single bitstream from the stored tiles streams and sends the bitstream to the decoder 450. The necessary information how to convert the decoded pictures into pictures that are suitable for rendering is sent along with the bitstream. The viewing device 860 decodes the pictures using decoder 450, converts them and renders them. Optionally, the viewing device 860 or client continuously sends requests for what bitrate the stream should have.

It should be noted that the embodiments in this disclosure comprise segments or tiles having a rectangular shape, where each segment or tile has four sides or edges. Additionally, each side or edge borders either other segments or tiles or the picture boundary. That is, the picture can be extended to a size equal to an integer number of units. In this disclosure, a "tile" is a type of segment, and the terms "side" and "edge" can be used interchangeably.

It should also be noted that some embodiments are described with respect to a decoder, but one or ordinary skill in the art would appreciate a corresponding encoder. Similarly some embodiments are described with respect to an encoder, but one or ordinary skill in the art would appreciate a corresponding decoder.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method of decoding a picture, the picture being partitioned into a plurality of picture segments according to a spatial partition structure of the picture, the method comprising:
   receiving a bitstream comprising a plurality of coded segments, and parameter set
   information associated with the plurality of coded segments;
   deriving, using the parameter set information:
      the spatial partition structure of the picture, wherein:
         each of the plurality of picture segments of the spatial partition structure
            corresponds to one of the plurality of coded segments and comprises one or more subsegments; and
         and
         each subsegment comprises a plurality of units with each unit corresponding to a region of the picture of a spatial size corresponding to a unit size of the unit;
      a subsegment size of a subsegment of the spatial partition structure; and
      a unit size of the units of the spatial partition structure; and
   decoding the plurality of coded segments received in the bitstream in accordance with the spatial partition structure.

2. The method of claim 1, wherein the decoding comprises deriving a quantization parameter value for a second unit of a given one of the plurality of picture segments based on a quantization parameter value for a first unit of the given one of the plurality of picture segments, and independently of any quantization parameter value for units of other ones of the plurality of picture segments.

3. The method of claim 1, wherein deriving the spatial partition structure comprises deriving the spatial partition structure responsive to receiving an indication that an encoder sending the bitstream is using flexible partitioning to divide the picture into the plurality of picture segments.

4. The method of claim 1, wherein deriving the spatial partition structure comprises deriving the spatial partition structure responsive to receiving an indication that an encoder sending the bitstream is using subsegments.

5. The method of claim 1, wherein decoding the plurality of coded segments received in the bitstream comprises decoding each of the plurality of picture segments according to a predefined decoding order, wherein the predefined decoding order is a raster scan order.

6. The method of claim 1, wherein deriving a subsegment size comprises deriving a first subsegment size for a first subsegment and a second subsegment size for a second subsegment, wherein the first subsegment size and the second subsegment size are different sizes.

7. The method of claim 1, further comprising deriving a spatial size of a segment based on a subsegment size.

8. The method of claim 1, wherein an edge of a first of the plurality of picture segments borders edges of two or more adjacent ones of the plurality of picture segments.

9. The method of claim 1, wherein the parameter set information indicates a first subsegment size for a first subsegment of the spatial partition structure and a second subsegment size for a second subsegment of the spatial partition structure, and wherein the first subsegment size and the second subsegment size are different sizes.

10. The method of claim 1, wherein the parameter set information indicates one of a height, a width, and an area of a subsegment of the spatial partition structure as an integer multiple of a respective one of a height, a width, and an area of a unit of the spatial partition structure.

11. The method of claim 1, wherein the parameter set information indicates a single subsegment size for all the subsegments of the spatial partition structure.

12. The method of claim 1, wherein each subsegment of the spatial partition structure corresponds to one of a rectangular region of the picture and a square region of the picture.

13. The method of claim 1, wherein the spatial partition structure divides the picture segments by arranging corners of each of the plurality of picture segments on a grid that defines, for each of the plurality of picture segments, corresponding values for a start corner and an end corner.

14. A method of encoding a picture, the method comprising:
   defining a spatial partition structure that divides the picture into a plurality of picture segments, wherein:
      each of the plurality of picture segments comprises one or more subsegment; and
      each subsegment comprises a plurality of units with each unit corresponding to a region of the picture;
   encoding the plurality of picture segments in accordance with the spatial partition structure to generate a plurality of coded segments, wherein each of the plurality of coded segments corresponds to one of the plurality of picture segments of the spatial partition structure;

generating a bitstream comprising the plurality of coded segments, and parameter set information associated with the plurality of coded segments, the parameter set information indicating the spatial partition structure that divides the picture into the plurality of picture segments, a unit size of a unit of the spatial partition structure, and a subsegment size of a subsegment of the spatial partition structure; and outputting the bitstream.

15. The method of claim 14, wherein generating the bitstream further comprises generating the bitstream to comprise an indication that the spatial partition structure comprises subsegments.

16. The method of claim 14, wherein an edge of a first of the plurality of picture segments borders edges of two or more adjacent ones of the plurality of picture segments.

17. The method of claim 14, wherein the parameter set information indicates a first subsegment size for a first subsegment of the spatial partition structure and a second subsegment size for a second subsegment of the spatial partition structure, and wherein the first subsegment size and the second subsegment size are different sizes.

18. The method of claim 14, wherein the parameter set information indicates one of a height, a width, and an area of a subsegment of the spatial partition structure as an integer multiple of a respective one of a height, a width, and an area of a unit of the spatial partition structure.

19. The method of claim 14, wherein the parameter set information indicates a single subsegment size for all the subsegments of the spatial partition structure.

20. The method of claim 14, wherein each subsegment of the spatial partition structure corresponds to one of a rectangular region of the picture and a square region of the picture.

21. The method of claim 14, wherein the spatial partition structure divides the picture by arranging corners of each of the plurality of picture segments on a grid that defines, for each of the plurality of picture segments, corresponding values for a start corner and end corner.

22. The method of claim 21, wherein the grid is defined with respect to subsegments of the spatial partition structure.

23. A decoder for decoding a picture, the picture being partitioned into a plurality of picture segments according to a spatial partition structure of the picture, the decoder comprising:

an input for receiving a bitstream comprising a plurality of coded segments, and parameter set information associated with the plurality of coded segments;
a memory configured to store instructions; and
processing circuitry operatively connected to the memory and the input, and configured to execute the instructions stored in the memory whereby the decoder is configured to:
derive, using the parameter set information:
the spatial partition structure of the picture, wherein:
each of the plurality of picture segments of the spatial partition structure corresponds to one of the plurality of coded segments and comprises one or more subsegments; and
each subsegment comprises a plurality of units with each unit corresponding to a region of the picture of a spatial size corresponding to a unit size of the unit;
a subsegment size of a subsegment of the spatial partition structure; and
a unit size of the units of the spatial partition structure; and
decode the plurality of coded segments received in the bitstream in accordance with the spatial partition structure.

24. A non-transitory computer readable medium comprising executable instructions stored thereon that, when executed by a processing circuit in a decoder of a picture, causes the decoder to decode a picture partitioned into a plurality of picture segments according to a spatial partition structure, by:

receiving a bitstream comprising a plurality of coded segments, and parameter set information associated with the plurality of coded segments;
deriving, using the parameter set information:
the spatial partition structure, wherein:
each of the plurality of picture segments corresponds to one of the plurality of coded segments and comprises one or more subsegments; and
each subsegment comprises a plurality of units with each unit corresponding to a region of the picture of a spatial size corresponding to a unit size of the unit;
a subsegment size of a subsegment of the spatial partition structure; and
a unit size of the units of the spatial partition structure; and
decoding the plurality of coded segments received in the bitstream in accordance with the spatial partition structure.

25. An encoder of a picture, the encoder comprising:
a memory configured to store instructions; and
processing circuitry operatively connected to the memory, and configured to execute the instructions stored in the memory whereby the encoder is configured to:
define a spatial partition structure that divides the picture into a plurality of picture segments, wherein each of the plurality of picture segments comprises one or more subsegments, and wherein each subsegment of the spatial partition structure comprises a plurality of units, with each unit corresponding to a region of the picture;
encode the plurality of picture segments in accordance with the spatial partition structure to generate a plurality of coded segments, wherein each of the plurality of coded segments corresponds to one of the plurality of picture segments of the spatial partition structure;
generate a bitstream comprising the plurality of coded segments, and parameter set information associated with the plurality of coded segments, the parameter set information indicating the spatial partition structure used to divide the picture into the plurality of picture segments, a size of a unit of the spatial partition structure, and a size of a subsegment of the spatial partition structure; and
output the bitstream.

26. A non-transitory computer readable medium comprising executable instructions stored thereon that, when executed by a processing circuit in an encoder of a picture, causes the encoder to:
define a spatial partition structure that divides the picture into a plurality of picture segments, wherein each of the plurality of picture segments comprises one or more subsegments, and wherein each subsegment of the spatial partition structure comprises a plurality of units, with each unit corresponding to a region of the picture;

encode the plurality of picture segments in accordance with the spatial partition structure to generate a plurality of coded segments, wherein each of the plurality of coded segments corresponds to one of the plurality of picture segments of the spatial partition structure;

generate a bitstream comprising the plurality of coded segments, and parameter set information associated with the plurality of coded segments, the parameter set information indicating the spatial partition structure that divides the picture into the plurality of picture segments, a size of a unit of the spatial partition structure, and a size of a subsegment of the spatial partition structure; and output the bitstream.

\* \* \* \* \*

UNITED STATES PATENT AND TRADEMARK OFFICE
CERTIFICATE OF CORRECTION

PATENT NO. : 12,101,482 B2
APPLICATION NO. : 18/075686
DATED : September 24, 2024
INVENTOR(S) : Sjöberg et al.

It is certified that error appears in the above-identified patent and that said Letters Patent is hereby corrected as shown below:

In the Specification

In Column 1, Line 8, delete "2020," and insert -- 2020, now U.S. Pat. No. 11,553,180, --, therefor.

In Column 1, Line 52, delete "(VCC)." and insert -- (VVC). --, therefor.

In Column 8, Lines 6-7, delete "uniform spacing flag" and insert -- uniform_spacing_flag --, therefor.

In Column 8, Line 33, delete "row height minus1[ i ]" and insert -- row_height_minus1[ i ] --, therefor.

In Column 13, Line 61, delete "Sin" and insert -- S in --, therefor.

In Column 17, Line 38, delete "PicWidthlnCtbsY−1," and insert -- PicWidthInCtbsY−1, --, therefor.

In Column 17, Line 42, delete "PicHeightlnCtbsY−1," and insert -- PicHeightInCtbsY−1, --, therefor.

In Column 18, Line 3, delete "PicWidthlnCtbsY;" and insert -- PicWidthInCtbsY; --, therefor.

In Column 18, Line 18, delete "[tile_coordinate_y+y][tile_coordinate_x+x]=tile_id:" and insert -- [tile_coordinate_y+y][tile_coordinate_x+x]=tile_id: --, therefor.

In Column 18, Lines 19-20, delete "PicHeightlnCtbsY;" and insert -- PicHeightInCtbsY; --, therefor.

In Column 18, Lines 21-22, delete "PicWidthlnCtbsY;" and insert -- PicWidthInCtbsY; --, therefor.

In Column 18, Lines 23-24, delete "CTU_tile_assignment[tile_coordinate_y+y][tile_coordinate_x+x]" and insert -- CTU_tile_assignment[tile_coordinate_y+y][tile_coordinate_x+x] --, therefor.

In Column 18, Line 40, delete "IL" and insert -- $T_L$ --, therefor.

Signed and Sealed this
Twenty-second Day of April, 2025

Coke Morgan Stewart
*Acting Director of the United States Patent and Trademark Office*

In Column 18, Line 46, delete "IL" and insert -- $T_L$ --, therefor.

In Column 22, Lines 13-14, delete "PicSizelnCtbsY–2," and insert -- PicSizeInCtbsY–2, --, therefor.

In Column 22, Line 17, delete "PicWidthlnCtbsY–1," and insert -- PicWidthInCtbsY–1, --, therefor.

In Column 22, Line 20, delete "PicHeightlnCtbsY–1," and insert -- PicHeightInCtbsY–1, --, therefor.

In Column 22, Line 62, delete "PicHeightlnCtbsY;" and insert -- PicHeightInCtbsY; --, therefor.

In Column 22, Line 64, delete "PicWidthlnCtbsY;" and insert -- PicWidthInCtbsY; --, therefor.

In Column 23, Line 18, delete "PicWidthlnCtbsY–1" and insert -- PicWidthInCtbsY–1 --, therefor.

In Column 23, Line 19, delete "PicHeightlnCtbsY–1" and insert -- PicHeightInCtbsY–1 --, therefor.

In Column 27, Line 7, delete "tile flag2" and insert -- tile_flag2 --, therefor.

In Column 28, Line 30, delete "If copy_tile_size mode" and insert -- If copy_tile_size_mode --, therefor.

In Column 28, Line 35, delete "If copy_tile_size mode" and insert -- If copy_tile_size_mode --, therefor.

In Column 28, Line 40, delete "If copy_tile_size mode" and insert -- If copy_tile_size_mode --, therefor.

In Column 29, Line 61, delete "A copy_tile_size mode" and insert -- A copy_tile_size_mode --, therefor.

In Column 29, Line 63, delete "A copy_tile_size mode" and insert -- A copy_tile_size_mode --, therefor.

In Column 29, Line 65, delete "A copy_tile_size mode" and insert -- A copy_tile_size_mode --, therefor.

In Column 30, Line 1, delete "A copy_tile_size mode" and insert -- A copy_tile_size_mode --, therefor.

In Column 30, Line 3, delete "A copy_tile_size mode" and insert -- A copy_tile_size_mode --, therefor.

In Column 30, Line 5, delete "A copy_tile_size mode" and insert -- A copy_tile_size_mode --, therefor.

In Column 30, Line 8, delete "A copy_tile_size mode" and insert -- A copy_tile_size_mode --, therefor.

CERTIFICATE OF CORRECTION (continued)
U.S. Pat. No. 12,101,482 B2

In Column 31, Line 51, delete "num_sub_tiles_horizontal=PicWidthlnCtbsY" and insert -- num_sub_tiles_horizontal=PicWidthInCtbsY --, therefor.

In Column 31, Line 54, delete "num_sub_tiles_vertical=PicHeightlnCtbsY" and insert -- num_sub_tiles_vertical=PicHeightInCtbsY --, therefor.

In Column 31, Line 62, delete "num_sub_tiles horizontal" and insert -- num_sub_tiles_horizontal --, therefor.

In Column 31, Lines 62-63, delete "PicWidthlnCtbsY/(sub_tile_width_minus1+1)." and insert -- PicWidthInCtbsY/(sub_tile_width_minus1+1). --, therefor.

In Column 31, Line 66, delete "num_sub_tiles vertical" and insert -- num_sub_tiles_vertical --, therefor.

In Column 31, Lines 66-67, delete "PicHeightlnCtbsY/(sub_tile_height_minus1+1)." and insert -- PicHeightInCtbsY/(sub_tile_height_minus1+1). --, therefor.

In Column 32, Line 24, delete "num_sub_tiles horizontal" and insert -- num_sub_tiles_horizontal --, therefor.

In Column 32, Lines 24-25, delete "PicWidthlnCtbsY" and insert -- PicWidthInCtbsY --, therefor.

In Column 32, Lines 25-26, delete "PicHeightlnCtbsY." and insert -- PicHeightInCtbsY. --, therefor.

In Column 34, Line 25, delete "N/2+N %/02" and insert -- N/2+N%2 --, therefor.

In Column 36, Line 54, delete "read next_tile ( ):" and insert -- read_next_tile( ): --, therefor.

In Column 38, Line 11, delete "h1-h6," and insert -- $h_1$-$h_6$, --, therefor.

In Column 38, Line 12, delete "v1-v3." and insert -- $v_1$-$v_3$. --, therefor.

In Column 38, Line 51, delete "complete tile list" and insert -- complete_tile_list --, therefor.

In Column 38, Line 61, delete ""$_T$"" and insert -- "T" --, therefor.

In Column 40, Line 39, delete "T," and insert -- T, --, therefor.

In Column 40, Line 41, delete "T," and insert -- T, --, therefor.

In Column 42, Line 21, delete "update_complete_tile_listO:" and insert -- update_complete_tile_list( ): --, therefor.

CERTIFICATE OF CORRECTION (continued)
U.S. Pat. No. 12,101,482 B2

In Column 44, Line 59, delete "start_corners_stream 2." and insert -- start_corners_stream_2. --, therefor.

In Column 44, Line 62, delete "end_corners_stream 2." and insert -- end_corners_stream_2. --, therefor.

In the Claims

In Column 47, Lines 56-59, in Claim 1, delete "corresponds to one of the plurality of coded segments and comprises one or more subsegments; and and" and insert "corresponds to one of the plurality of coded segments and comprises one or more subsegments; and" on Line 55, after "structure", as a continuation point.

In Column 48, Line 63, in Claim 14, delete "subsegment; and" and insert -- subsegments; and --, therefor.